United States Patent
Choi et al.

(10) Patent No.: US 11,412,507 B2
(45) Date of Patent: Aug. 9, 2022

(54) METHOD, DEVICE AND SYSTEM FOR UPLINK TRANSMISSION AND DOWNLINK RECEPTION IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Seoul (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 129 days.

(21) Appl. No.: 16/814,856

(22) Filed: Mar. 10, 2020

(65) Prior Publication Data
US 2020/0214006 A1    Jul. 2, 2020

Related U.S. Application Data

(63) Continuation of application No. PCT/KR2018/010647, filed on Sep. 11, 2018.

(30) Foreign Application Priority Data

Sep. 11, 2017 (KR) .................. KR10-2017-0115928
Jan. 12, 2018 (KR) .................. KR10-2018-0004545
(Continued)

(51) Int. Cl.
*H04W 4/00* (2018.01)
*H04W 72/04* (2009.01)
(Continued)

(52) U.S. Cl.
CPC ....... *H04W 72/0446* (2013.01); *H04L 5/0048* (2013.01); *H04W 72/042* (2013.01); *H04W 72/0413* (2013.01); *H04W 74/0833* (2013.01)

(58) Field of Classification Search
CPC ......... H04W 72/0446; H04W 72/0413; H04W 72/042; H04W 74/0833; H04L 5/0048
(Continued)

(56) References Cited

U.S. PATENT DOCUMENTS

| | | | |
|---|---|---|---|
| 2007/0071025 A1 | 3/2007 | Bergstrom et al. | |
| 2014/0198733 A1* | 7/2014 | Yin | H04L 1/1812 370/329 |

(Continued)

FOREIGN PATENT DOCUMENTS

| | | |
|---|---|---|
| JP | 2019-528633 | 10/2019 |
| WO | 2017/146556 | 8/2017 |

(Continued)

OTHER PUBLICATIONS

Panasonic (R1-1713348, Discussion on support of long-duration NR-PUCCH over multiple slots, Prague, Czechia, Aug. 21-25, 2017) (Year: 2017).*

(Continued)

*Primary Examiner* — Maharishi V Khirodhar
(74) *Attorney, Agent, or Firm* — Ladas & Parry, LLP

(57) ABSTRACT

A transmission and reception method of a radio signal by a terminal in a wireless communication system comprises the steps of: determining whether or not transmission of an uplink radio signal or reception of a downlink radio signal allocated to a terminal is possible on a slot configured to comprise at least one of one or more downlink symbols for downlink transmission, one or more flexible symbols and one or more uplink symbols for uplink transmission; and controlling the transmission of the uplink radio signal or the (Continued)

reception of the downlink radio signal on the basis of the determination.

18 Claims, 25 Drawing Sheets

(30) Foreign Application Priority Data

Feb. 28, 2018 (KR) .................. KR10-2018-0024872
Aug. 10, 2018 (KR) .................. KR10-2018-0093529

(51) Int. Cl.
*H04L 5/00* (2006.01)
*H04W 74/08* (2009.01)

(58) Field of Classification Search
USPC .......................................................... 370/329
See application file for complete search history.

(56) References Cited

U.S. PATENT DOCUMENTS

| 2015/0358138 | A1* | 12/2015 | Hwang | ................. H04L 5/0055 370/280 |
| 2016/0134405 | A1* | 5/2016 | Luo | ......................... H04L 1/007 370/328 |
| 2019/0058516 | A1 | 2/2019 | Yang et al. | |
| 2019/0150143 | A1 | 5/2019 | Yin et al. | |
| 2019/0208550 | A1 | 7/2019 | Ko et al. | |

FOREIGN PATENT DOCUMENTS

| WO | 2017/213222 | 12/2017 |
| WO | 2018/222001 | 12/2018 |
| WO | 2019/050381 | 3/2019 |
| WO | 2019/214599 | 11/2019 |

OTHER PUBLICATIONS

Spreadtrum Communications (R1-1713058, Support of long-PUCCH transmission over multiple slots, Prague, Czech Republic, Aug. 21-25, 2017) (Year: 2017).*

Samsung (R1-1713618, "UE Behavior for UE-Group Common PDCCH Detection", Prague, Czech Republic, Aug. 21-25, 2017) (Year: 2017).*

CATT (R1-1712405, Design of multi-slot PUCCH transmission, Prague, Czechia, Aug. 21-25, 2017) (Year: 2017).*

International Preliminary Report on Patentability for PCT/KR2018/010647 dated Mar. 17, 2020 and its English translation from WIPO (now published as WO2019/050381).

Office Action dated Apr. 5, 2021 for Japanese Patent Application No. 2020-514495 and its English translation provided by Applicant's foreign counsel.

Extended European Search Report dated Apr. 26, 2021 for European Patent Application No. 18853836.7.

LG Electronics: "Discussion on UE Behavior for the group common PDCCH", R1-1713172, 3GPP TSG RAN WG1 Meeting#90, Prague, Czech Republic, Aug. 21-25, 2017, pp. 1-4.

Samsung, "Slot reconfiguration for low latency in TDD", R1-1713623, 3GPP TSG RAN WG1 Meeting #90, Prague, Czech Republic, Aug. 21-25, 2017, pp. 1-6.

Vivo, "UE behaviors related to SFI", R1-1712851, 3GPP TSG RAN WG1 Meeting #90, Prague, Czech Republic, Aug. 21-25, 2017, pp. 1-4.

CMCC, "UE behavior related to dynamic and demi-static configured resources", R1-1710781, 3GPP TSG RAN WG1 NR ad-Hoc#2, Qingdao, P.R. China, Jul. 27-30, 2017, pp. 1-3.

Samsung, "Resource Allocation for PUCCH", R1-1702983, 3GPP TSG RAN WG1 #88, Athens, Greece, Feb. 13-17, 2017, pp. 1-3.

International Search Report for PCT/KR2018/010647 dated Jan. 8, 2019 and its English translation from WIPO (now published as WO2019/050381).

Written Opinion of the International Searching Authority for PCT/KR2018/010647 dated Jan. 8, 2019 and its English machine translation by Google Translate (now published as WO2019/050381).

Wilus Inc., "Discussion on UE Behavior for Group-common PDCCH for NR", R1-1714389, 3GPP TSG RAN WG1 Meeting#90, Prague, Czech Republic, Aug. 12, 2017.

Qualcomm Inc., "[NRAH2-09] Email Discussion UE Processing Time", R1-1713449, 3GPP TSG-RAN WGI #90, Prague, Czech Republic:, Aug. 12, 2017.

Huawei et al., "Dynamic and Semi-static DL/UL Resource Partition", R1-1712189, 3GPP TSG RAN WGI Meeting #90, Prague, Czech Republic, Aug. 12, 2017.

CATT, "Contents of the Group-common PDCCH", R1-1712397, 3GPP TSG RAN WGI Meeting #90, Prague, Czechia, Aug. 12, 2017.

Office Action dated Feb. 11, 2022 for European Patent Application No. 18853836.7.

* cited by examiner

-Prior Art-

-Prior Art-

- Prior Art -

- Prior Art -

-Prior Art-

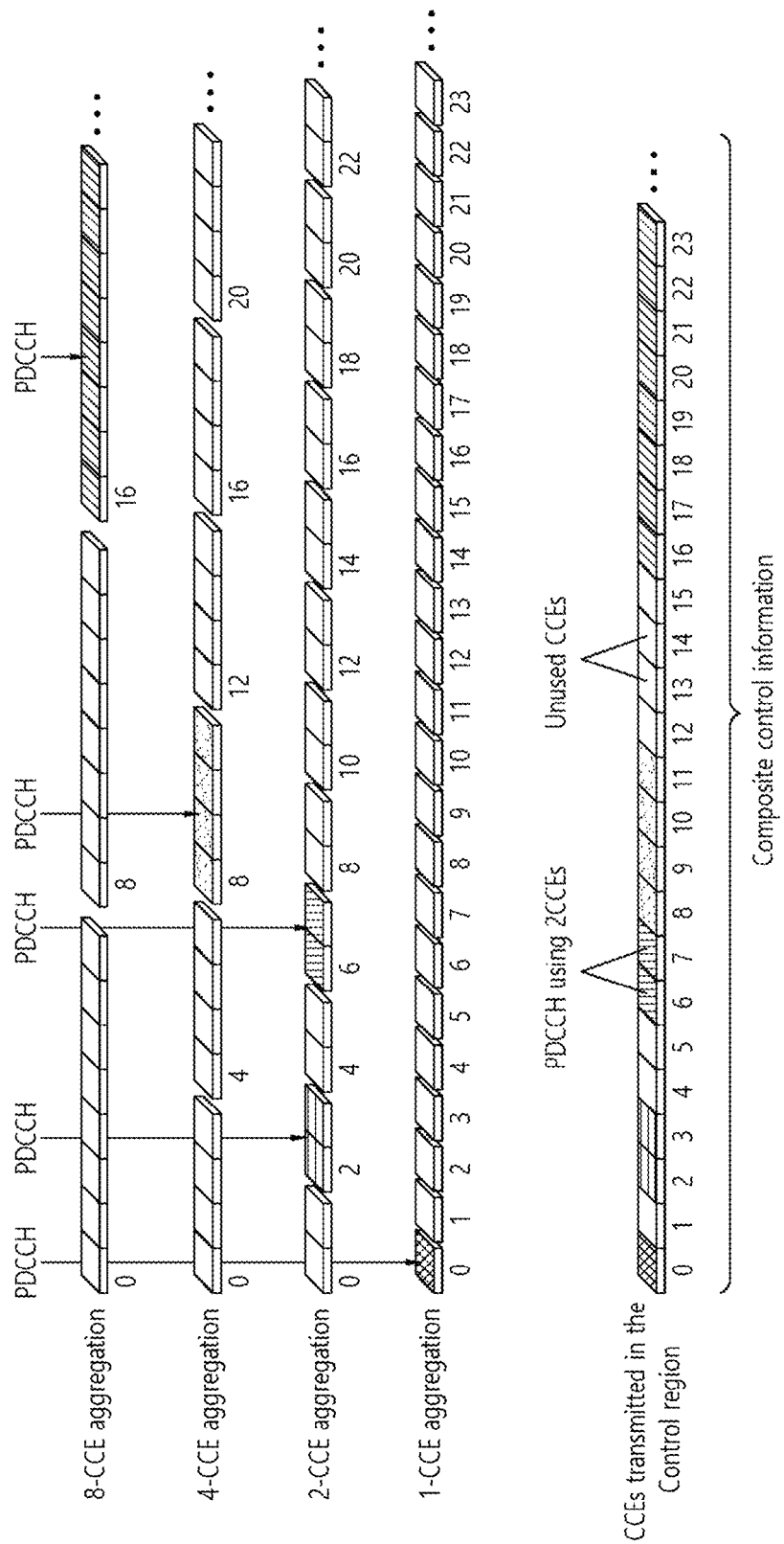

G=2 case

METHOD, DEVICE AND SYSTEM FOR UPLINK TRANSMISSION AND DOWNLINK RECEPTION IN WIRELESS COMMUNICATION SYSTEM

CROSS-REFERENCE TO RELATED APPLICATIONS

This application is the National Stage filing under 35 U.S.C. 371 of International Application No. PCT/KR2018/010647, filed on Sep. 11, 2018, which claims the benefit of U.S. Provisional Application No. 10-2017-0115928 filed on 11 Sep. 2017 in KR, No. 10-2018-0004545 filed on 12 Jan. 2018 in KR, No. 10-2018-0024872 filed on 28 Feb. 2018 in KR, and No. 10-2018-0093529 filed on 10 Aug. 2018 in KR the entire contents of which are hereby incorporated by reference in its entirety

BACKGROUND OF THE INVENTION

Field of the Invention

The present invention relates to wireless communication, and more particularly, to a method, device, and system for transmitting an uplink signal and a channel and receiving a downlink signal and a channel in a wireless communication system.

Description of Related Art

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In a 3GPP NR system, a dynamic time division duplex (TDD) scheme that can freely change the direction of OFDM symbols configuring a slot according to uplink downlink and downlink traffic of a small cell may be used. A base station delivers information related to the slot configuration to a terminal in order to support dynamic TDD. However, since there may be a problem in which the terminal does not receive the slot configuration information or there may be a problem in which the operation of the terminal cannot be performed due to the change in the slot configuration, a method for improving the problem is required.

BRIEF SUMMARY OF THE INVENTION

The present invention provides a method, device, and system for transmitting and receiving a control channel in a wireless communication system.

The present invention also provides a terminal for transmitting or receiving a control channel and a method of operating the same in a situation where a slot configuration including a TDD-based DL symbol, a flexible symbol, and a UL symbol is changed.

The present invention also provides a base station for receiving or transmitting a control channel and a method of operating the same in a situation where a slot configuration including a TDD-based DL symbol, a flexible symbol, and a UL symbol is changed.

The present invention also provides a terminal for efficiently transmitting or receiving a control channel in consideration of a switching gap in a slot configuration including a TDD-based DL symbol, a flexible symbol, and a UL symbol, and a method of operating the same.

The present invention also provides a base station for efficiently receiving or transmitting a control channel in consideration of a switching gap in a slot configuration including a TDD-based DL symbol, a flexible symbol, and a UL symbol, and a method of operating the same.

According to an exemplary embodiment of the present invention, a User Equipment (UE) for controlling uplink transmission and downlink reception in a wireless communication system is provided. The UE includes the communication module configured to transmit an uplink radio signal to a base station or to receive a downlink radio signal of the base station allocated to the terminal from the base station, a memory configured to store control programs and data used in the terminal, and a processor configured to determine whether transmission of an uplink radio signal allocated to the terminal or reception of the downlink radio signal is available in a slot configured to include at least one of at least one downlink symbol, and at least one flexible symbol for transmitting downlink transmission, and uplink symbol for uplink transmission, and control receiving the downlink radio signal and transmitting uplink radio signal according to the determination.

In one aspect, the uplink radio signal includes a physical uplink control channel (PUCCH), and when the number of uplink symbols is a predetermined number or more, or when the sum of the number of the uplink symbols and the number of the flexible symbols is a certain number or more, the processor may determine that transmission of the physical uplink control channel is available.

In another aspect, when the number of symbols required for transmission of the physical uplink control channel (hereinafter, symbol for PDCCH transmission) is larger than the number of the uplink symbols or the sum of the number of the uplink symbols and the number of the flexible symbols, the processor may control to drop the physical uplink control channel, convert the physical uplink control channel to another type of physical uplink control channel requiring fewer symbols, or transmit the physical uplink control channel over at least one slot after the slot.

In another aspect, the uplink radio signal includes a physical uplink control channel (PUCCH), and HARQ-ACK is mapped to the PUCCH, and when the downlink symbol overlaps the symbol for the PDCCH transmission, the processor may determine that transmission of the HARQ-ACK is unavailable or postpone transmission of the HARQ-ACK.

In another aspect, the downlink radio signal includes a physical downlink shared channel (PDSCH) or a physical downlink control channel (PDCCH), and when the number of the downlink symbols is a predetermined number or more, or when the sum of the number of the downlink symbols and the number of the flexible symbols is a certain number or more, the processor may determine that transmission of the physical downlink shared channel or the physical downlink control channel is available.

In another aspect, the downlink radio signal is downlink control information (DCI) included in a physical downlink control channel (PDCCH), and the type of the downlink control information includes HARQ-ACK, rank indicator (RI), and CSI, and the processor may determine whether reception of the downlink radio signal is available based on the priority according to the type of the downlink control information.

In another aspect, the downlink radio signal includes an SS/PBCH block, and the uplink radio signal may include at least one of a physical uplink control channel, a physical uplink common channel, and a physical random access channel (PRACH).

In another aspect, when the transmission of the uplink radio signal starts after a predetermined number of gap symbols from the last symbol of the symbol for the transmission of the downlink radio signal of the downlink symbol, the processor may perform transmission of the uplink radio signal.

In another aspect, when the transmission of the uplink radio signal overlaps at least one of a last symbol of a symbol for transmission of the downlink radio signal and a predetermined number of gap symbols among the downlink symbols, the processor may drop transmission of the uplink radio signal.

In another aspect, the slot is configured by the information on the slot configuration provided by the base station, and the slot configuration information may include at least one of a cell-specific RRC message generated in the RRC layer, a UE-specific RRC message, and dynamic slot format information generated in the physical layer.

According to another aspect of the present invention, a method for transmitting and receiving a radio signal by a terminal in a wireless communication system is provided. The method includes determining whether transmission of an uplink radio signal allocated to the terminal or reception of the downlink radio signal is available; and controlling the transmission of the uplink radio signal or the reception of the downlink radio signal according to the determination on a slot configured to include at least one of at least one downlink symbol for downlink transmission, at least one flexible symbol, and at least one uplink symbol for uplink transmission.

In one aspect, the uplink radio signal includes a physical uplink control channel (PUCCH), and the controlling may include, when the number of uplink symbols is a predetermined number or more, or when the sum of the number of the uplink symbols and the number of the flexible symbols is a certain number or more, transmitting the physical uplink control channel.

In another aspect, when the number of symbols required for transmission of the physical uplink control channel (hereinafter, symbol for PDCCH transmission) is larger than the number of the uplink symbols or the sum of the number of the uplink symbols and the number of the flexible symbols, the controlling may include dropping the physical uplink control channel, converting the physical uplink control channel to another type of physical uplink control channel requiring fewer symbols, or transmitting the physical uplink control channel over at least one slot after the slot.

In another aspect, the uplink radio signal includes a physical uplink control channel (PUCCH), and HARQ-ACK is mapped to the PUCCH, and the controlling may include, when the downlink symbol overlaps the symbol for the PDCCH transmission, determining that transmission of the HARQ-ACK is unavailable or postponing transmission of the HARQ-ACK.

In another aspect, the downlink radio signal includes a physical downlink shared channel (PDSCH) or a physical downlink control channel (PDCCH), and when the number of the downlink symbols is a predetermined number or more, or when the sum of the number of the downlink symbols and the number of the flexible symbols is a certain number or more, the controlling may include transmitting the physical downlink shared channel or the physical downlink control channel.

In another aspect, the downlink radio signal is downlink control information (DCI) included in a physical downlink control channel (PDCCH), and the type of the downlink control information includes HARQ-ACK, rank indicator (RI), and CSI, and the controlling may determine whether reception of the downlink radio signal is available based on the priority according to the type of the downlink control information.

In another aspect, the downlink radio signal includes an SS/PBCH block, and the uplink radio signal may include at least one of a physical uplink control channel, a physical uplink common channel, and a physical random access channel (PRACH).

In another aspect, when the transmission of the uplink radio signal starts after a predetermined number of gap symbols from the last symbol of the symbol for the transmission of the downlink radio signal of the downlink symbol, the controlling may include transmitting the uplink radio signal.

In another aspect, when the transmission of the uplink radio signal overlaps at least one of a last symbol of a symbol for transmission of the downlink radio signal and a predetermined number of gap symbols among the downlink symbols, the controlling may include dropping transmission of the uplink radio signal.

In another aspect, the slot is configured by the information on the slot configuration provided by the base station, and the slot configuration information may include at least one of a cell-specific RRC message generated in the RRC layer, a UE-specific RRC message, and dynamic slot format information generated in the physical layer.

According to an aspect of the present invention, a terminal for performing uplink transmission and downlink reception in a wireless communication system is provided. The terminal includes a communication module configured to transmit an uplink radio signal to a base station or to receive a downlink radio signal from a base station, and a processor configured to determine whether transmission of an uplink radio signal or reception of a downlink radio signal is valid in a slot in which at least one of a downlink symbol for downlink transmission, a flexible symbol, or an uplink symbol for uplink transmission is configured and perform transmission of the uplink radio signal or reception of the downlink radio signal according to the determination.

In one aspect, when the first symbol among symbols to which the uplink radio signal is allocated in the slot starts after a predetermined number of symbols from the downlink symbol or the last symbol among the symbols allocated for reception of the downlink radio signal, the processor may perform the transmission of the uplink radio signal.

In another aspect, when the first symbol among the symbols to which the uplink radio signal is allocated in the slot overlaps at least one of the downlink symbol, a symbol allocated for reception of the downlink radio signal, or a predetermined number of symbols after the last symbol of the symbol, the processor may not perform transmission of the uplink radio signal.

In another aspect, the uplink radio signal includes at least one of a physical uplink control channel, a physical uplink shared channel, a physical random access channel, and a sounding reference signal (SRS).

In another aspect, at least one of the symbols to which the uplink radio signal is allocated may be a flexible symbol.

In another aspect, the downlink radio signal may include at least one of a synchronization signal/physical broadcast channel (SS/PBCH) block, a physical downlink shared channel, a physical downlink control channel, or a channel state information reference signal (CSI-RS).

In another aspect, the uplink radio signal not performed is a physical uplink control channel, and the processor may convert the physical uplink control channel into another type of physical uplink control channel in which transmission is valid in the slot and transmit the other type of physical uplink control channel, or perform transmission in the first slot among slots in which transmission after the slot is valid.

In one aspect, when the last symbol among the symbols to which the downlink radio signal is allocated in the slot ends before a predetermined number of symbols from the first symbol among symbols allocated for transmission of the uplink symbol or the uplink radio signal, the processor may perform reception of the downlink radio signal In another aspect, when the last symbol among the symbols to which the downlink radio signal is allocated in the slot overlaps at least one of the uplink symbol, a symbol allocated for transmission of the uplink radio signal, or a predetermined number of symbols before the first symbol of the symbol, the processor may not perform the reception of the downlink radio signal.

In another aspect, the downlink radio signal may include at least one of a physical downlink shared channel, a physical downlink control channel, or a channel state information reference signal (CSI-RS).

In another aspect, at least one of the symbols to which the downlink radio signal is allocated may be a flexible symbol.

In another aspect, the uplink radio signal may be a physical random access channel.

In another aspect, the slot is configured by information on a slot configuration provided by the base station, and the information on the slot configuration may include at least one of a cell-specific RRC message generated in an RRC layer, a UE-specific RRC message, or dynamic slot format information generated in a physical layer.

According to another aspect of the present invention, a method of performing uplink transmission and downlink reception by a terminal in a wireless communication system is provided. The method includes determining whether transmission of an uplink radio signal or reception of a downlink radio signal is valid in a slot in which at least one of a downlink symbol for downlink transmission, a flexible symbol, and an uplink symbol for uplink transmission is configured, and performing transmission of the uplink radio signal or reception of the downlink radio signal according to the determination.

In one aspect, when the first symbol among symbols to which the uplink radio signal is allocated in the slot starts after a predetermined number of symbols from the downlink symbol or the last symbol among the symbols allocated for reception of the downlink radio signal, the transmission of the uplink radio signal may be performed.

In another aspect, when the first symbol among the symbols to which the uplink radio signal is allocated in the slot overlaps at least one of the downlink symbol, a symbol allocated for reception of the downlink radio signal, or a predetermined number of symbols after the last symbol of the symbol, transmission of the uplink radio signal may not be performed.

In another aspect, the uplink radio signal includes at least one of a physical uplink control channel, a physical uplink shared channel, a physical random access channel, and a sounding reference signal (SRS).

In another aspect, at least one of the symbols to which the uplink radio signal is allocated may be a flexible symbol.

In another aspect, the downlink radio signal may include at least one of a synchronization signal/physical broadcast channel (SS/PBCH) block, a physical downlink shared channel, a physical downlink control channel, or a channel state information reference signal (CSI-RS).

In another aspect, the uplink radio signal not performed is a physical uplink control channel, and the physical uplink control channel may be converted into another type of physical uplink control channel in which transmission is valid in the slot and may be transmitted, or may be transmitted in the first slot among slots in which transmission after the slot is valid.

In one aspect, when the last symbol among the symbols to which the downlink radio signal is allocated in the slot ends before a predetermined number of symbols from the first symbol among symbols allocated for transmission of the uplink symbol or the uplink radio signal, reception of the downlink radio signal may be performed.

In another aspect, when the last symbol among the symbols to which the downlink radio signal is allocated in the slot overlaps at least one of the uplink symbol, a symbol allocated for transmission of the uplink radio signal, or a predetermined number of symbols before the first symbol of the symbol, the reception of the downlink radio signal may not be performed.

In another aspect, the downlink radio signal may include at least one of a physical downlink shared channel, a physical downlink control channel, or a channel state information reference signal (CSI-RS).

In another aspect, at least one of the symbols to which the downlink radio signal is allocated may be a flexible symbol.

In another aspect, the uplink radio signal may be a physical random access channel.

In another aspect, the slot is configured by information on a slot configuration provided by the base station, and the information on the slot configuration may include at least one of a cell-specific RRC message generated in an RRC layer, a UE-specific RRC message, or dynamic slot format information generated in a physical layer.

According to the present invention, even if the configuration of a slot is changed, a terminal can transmit the PUCCH, thereby preventing the PUCCH transmission drop or unnecessary PUCCH retransmission. In addition, by defining an effective timing of an uplink signal such as a PRACH, it is available to increase frequency efficiency of a network and reduce energy consumption of a terminal.

Effects obtainable from various embodiments of the present disclosure are not limited to the above-mentioned effects, and other effects not mentioned above may be clearly derived and understood to those skilled in the art from the following description.

BRIEF DESCRIPTION OF THE SEVERAL VIEWS OF THE DRAWINGS

FIGS. 5A-5B illustrate a procedure for transmitting control information and a control channel in a 3GPP NR system;

DETAILED DESCRIPTION OF THE INVENTION

Figure 1:
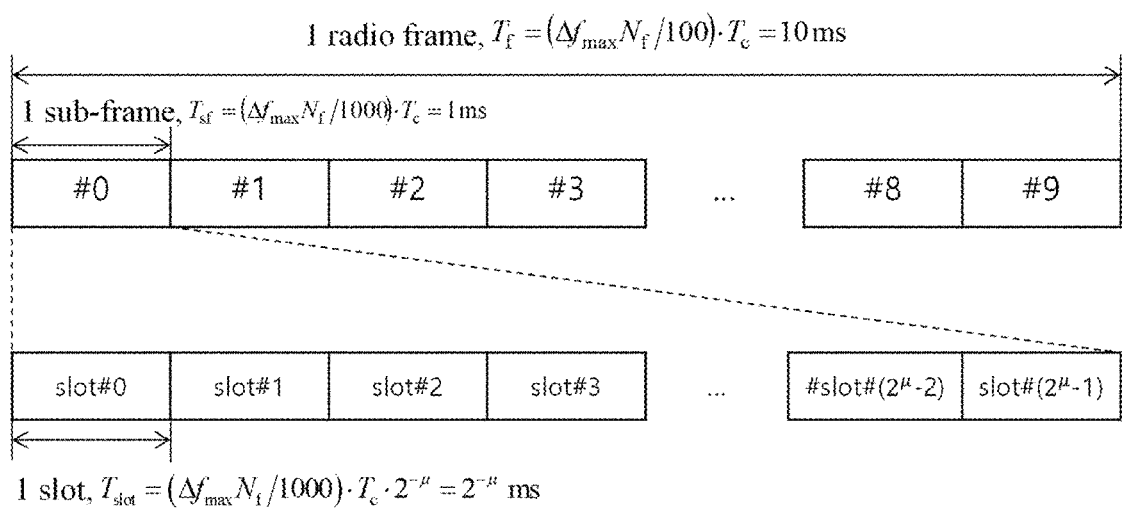
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

FIG. 1 illustrates an example of a wireless frame structure used in a wireless communication system. Referring to FIG. 1, the wireless frame (or radio frame) used in the 3GPP NR system may have a length of 10 ms ($\Delta f_{max} N_f/100$)*Tc). In addition, the wireless frame includes 10 subframes (SFs) having equal sizes. Herein, $\Delta f_{max}$=480*10^3 Hz, Nf=4096, Tc=1/($\Delta f_{ref}$*Nf,ref), $\Delta f_{ref}$=15*10^3 Hz, and Nf,ref=2048. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu$=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
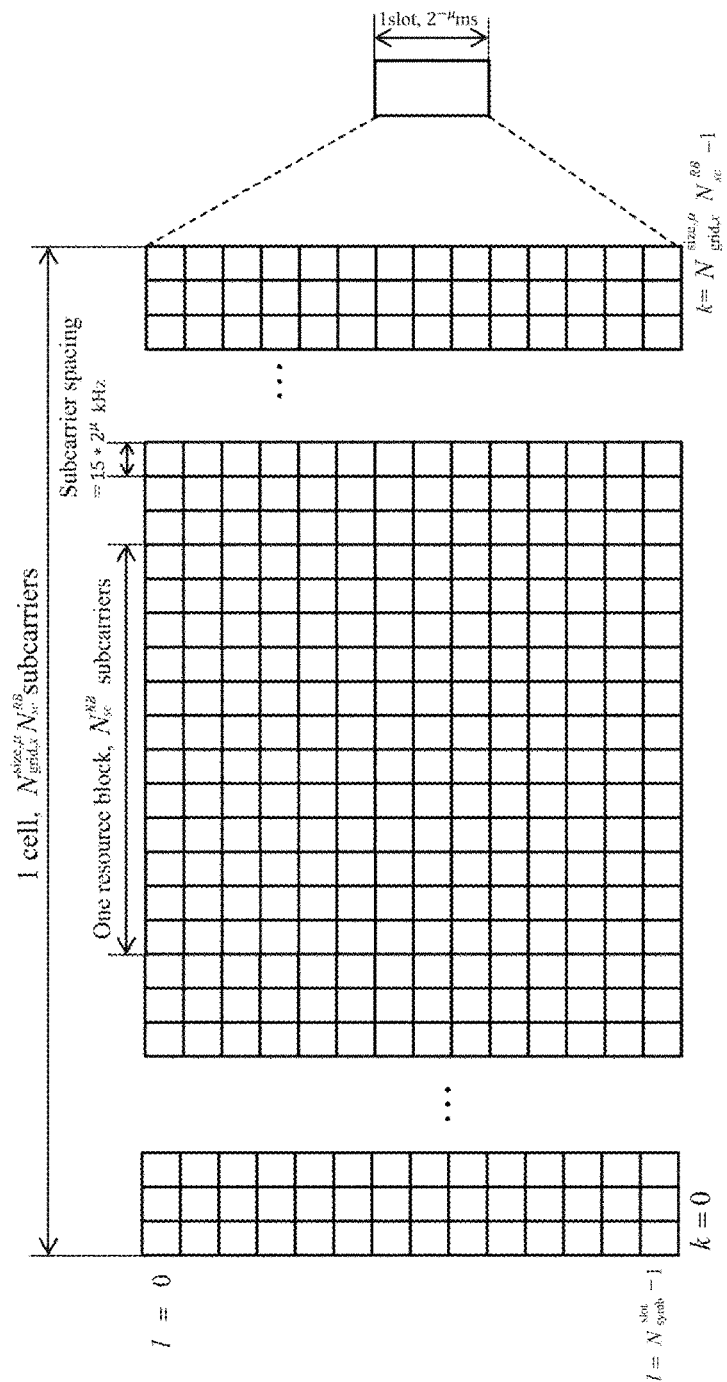
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system. There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. Hereinafter, in the present specification, a symbol includes an OFDM symbol, an SC-FDMA symbol, a DFTs-OFDM symbol, and the like.

Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}$=12. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined as $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated by a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | U | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56~255 | | | | | | Reserved | | | | | | | | |

In Table 1, D denotes a DL symbol, U denotes a UL symbol, and X denotes a flexible symbol. As shown in Table 1, up to two DL/UL switching in one slot may be allowed.

Figure 3:
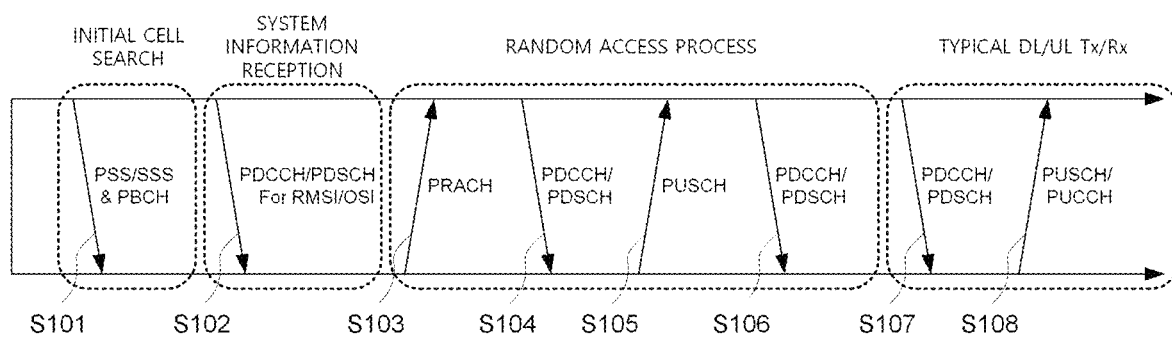
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel. If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102).

When the UE initially accesses the base station or does not have radio resources for signal transmission, the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Figure 4A:
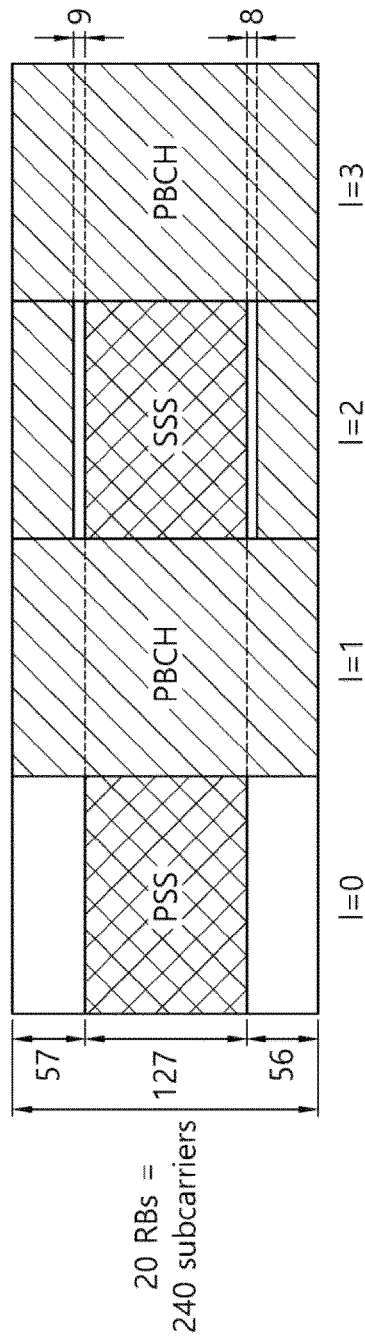
FIGS. 4A-4B illustrate an SS/PBCH block for initial cell access in a 3GPP NR system.

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is shown in Equation 1 below.

$$d_{PSS}(n)=1-2x(m)$$

$$m=(n+43N^{(2)}_{ID})\bmod 127 \quad \text{[equation 1]}$$

Here, $0 \le n < 127$, and x (m) is as shown in Equations 2 and 3 below.

$$x(i+7)=(x(i+4)+x(i))\bmod 2 \quad \text{[equation 2]}$$

$$[x(6)\ x(5)\ x(4)\ x(3)\ x(2)\ x(1)\ x(0)]=[1\ 1\ 1\ 0\ 1\ 1\ 0] \quad \text{[equation 3]}$$

Further, the sequence $d_{SSS}(n)$ of the SSS is as shown in Equation 4.

$$d_{sss}(n) = [1 - 2x_0((n + m_0)\bmod 127)]$$
$$[1 - 2x_1((n + m_1)\bmod 127)] \quad \text{[equation 4]}$$

$$m_0 = 15\left\lfloor \frac{N^{(1)}_{ID}}{112} \right\rfloor + 5N^{(2)}_{ID}$$

Here, $0 \le n < 127$, and $x_0(m)$, $x_1(m)$ are as shown in Equations 5 and 6 below.

$$x_0(i+7)=(x_0(i+4)+x_0(i))\bmod 2$$

$$x_1(i+7)=(x_1(i+4)+x_1(i))\bmod 2 \quad \text{[equation 5]}$$

$$[x_0(6)\ x_0(5)\ x_0(4)\ x_0(3)\ x_0(2)\ x_0(1)\ x_0(0)]=[0\ 0\ 0\ 0\ 0\ 0\ 1]$$

$$[x_1(6)\ x_1(5)\ x_1(4)\ x_1(3)\ x_1(2)\ x_1(1)\ x_1(0)]=[0\ 0\ 0\ 0\ 0\ 0\ 1]. \quad \text{[equation 6]}$$

Figure 4B:
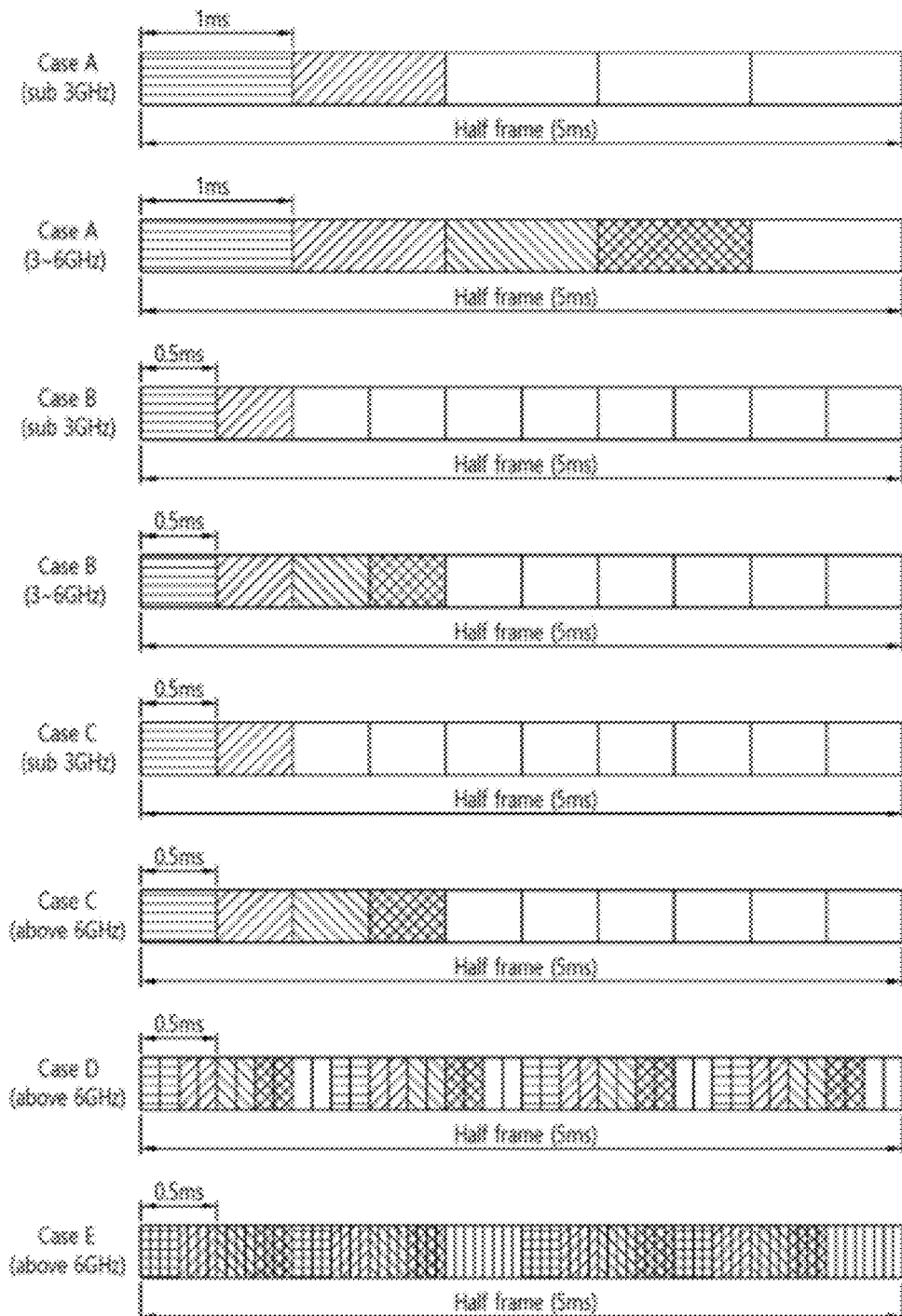

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
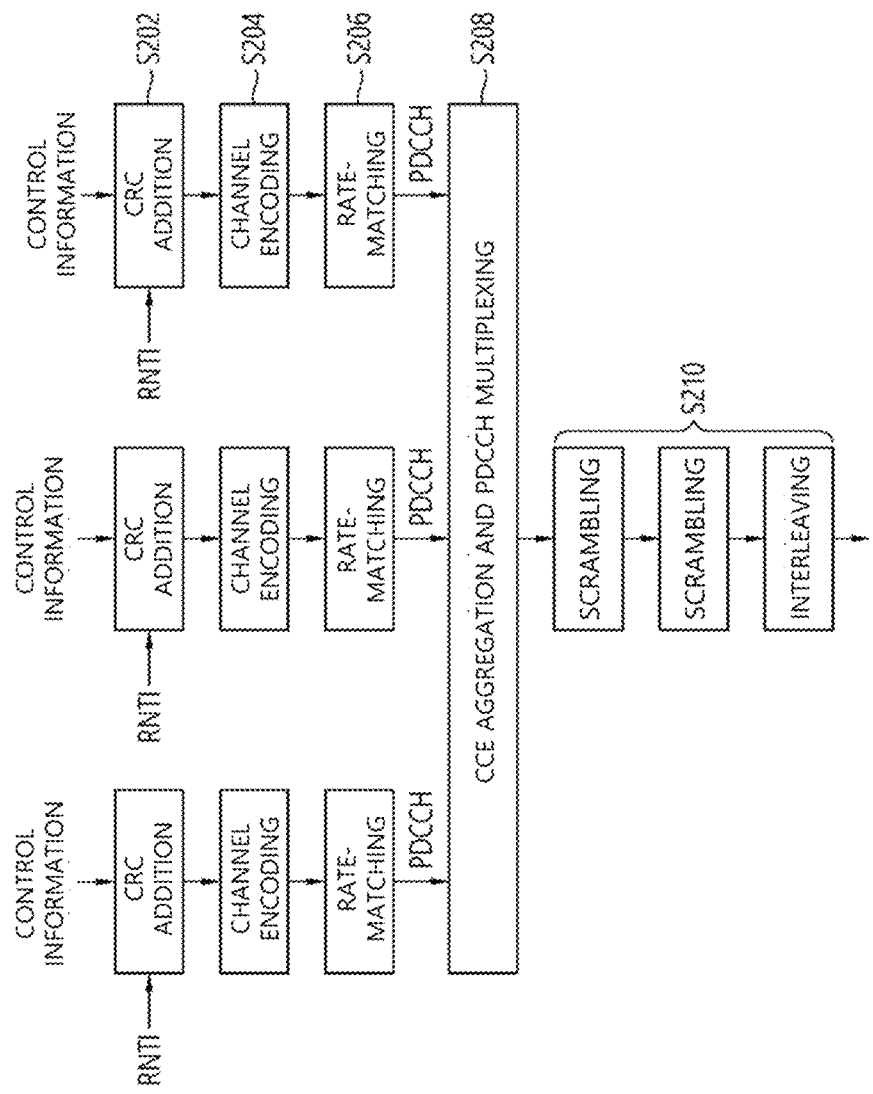

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), the CS-RNTI or MCS-C-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
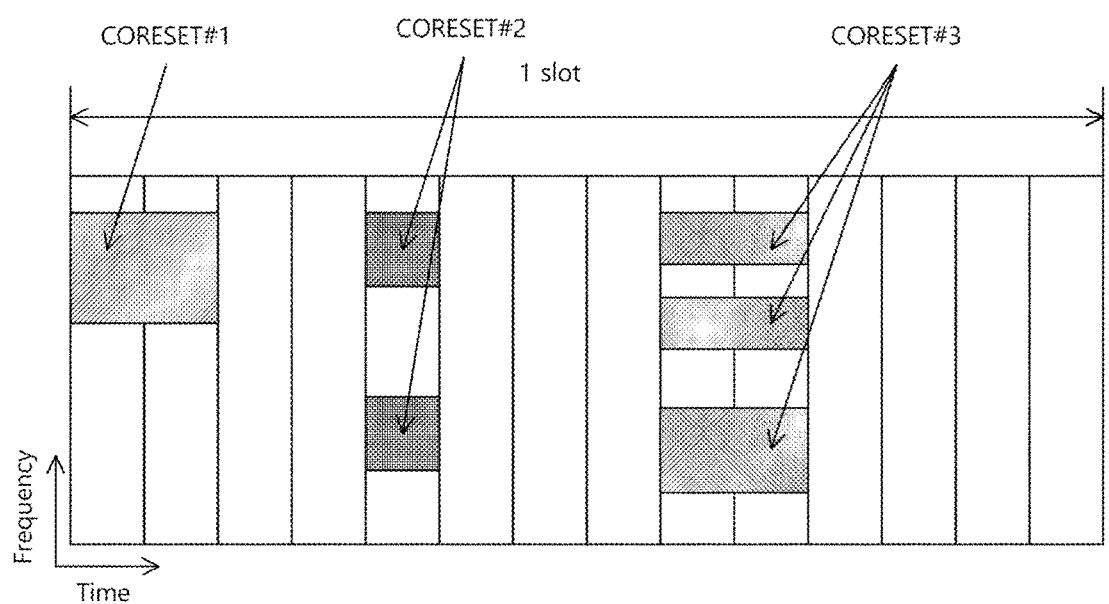
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system. The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 6, CORESET #1 starts at the first symbol of the slot, CORESET #2 starts at the fifth symbol of the slot, and CORESET #3 starts at the ninth symbol of the slot.

Figure 7:
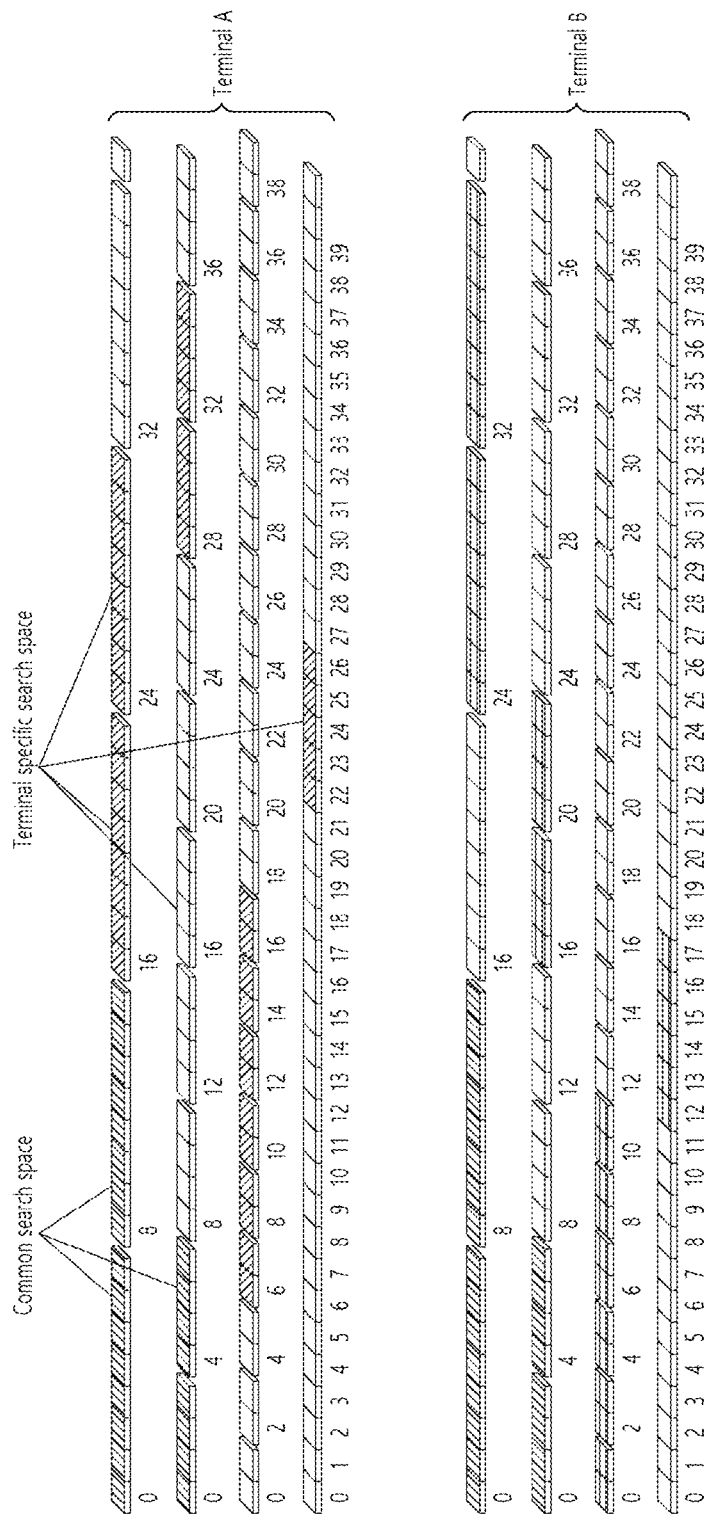
FIG. 7 illustrates a method for configuring a PDCCH search space in a 3GPP NR system.

FIG. 7 illustrates a method for setting a PUCCH search space in a 3GPP NR system. In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a UL-SCH and a hybrid automatic repeat request (HARD). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted to a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH with the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one RB on the frequency axis. When PUCCH format 0 is transmitted in two OFDM symbols, the same sequence on the two symbols may be transmitted through different RBs. Through this, the UE may obtain a frequency diversity gain. In more detail, the UE may determine a value $m_{cs}$ of a cyclic shift according to $M_{bit}$ bit UCI ($M_{bit}$=1 or 2), and may transmit may transmit a sequence in which the base sequence of length 12 is cyclically shifted to a predetermined value $m_{cs}$ by mapping the sequence to one OFDM symbol and 12 REs of one PRB. When the number of cyclic shifts available to the terminal is 12 and $M_{bit}=1$, 1 bit UCI 0 and 1 may be represented by a sequence corresponding to two cyclic shifts having a difference of 6 in the cyclic shift value. In addition, in the case of $M_{bit}=2$, 2 bit UCI 00, 01, 11, 10 may be represented by a sequence corresponding to four cyclic shifts in which the difference in the cyclic shift values is three.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates Mbit bits UCI (Mbit>2) with it/2-Binary Phase Shift Keying (BPSK) or QPSK to generate a complex valued symbol d(0) to d(Msymb−1). Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP in downlink control information (DCI) among the BWPs configured by the UE. The BWP indicated by the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
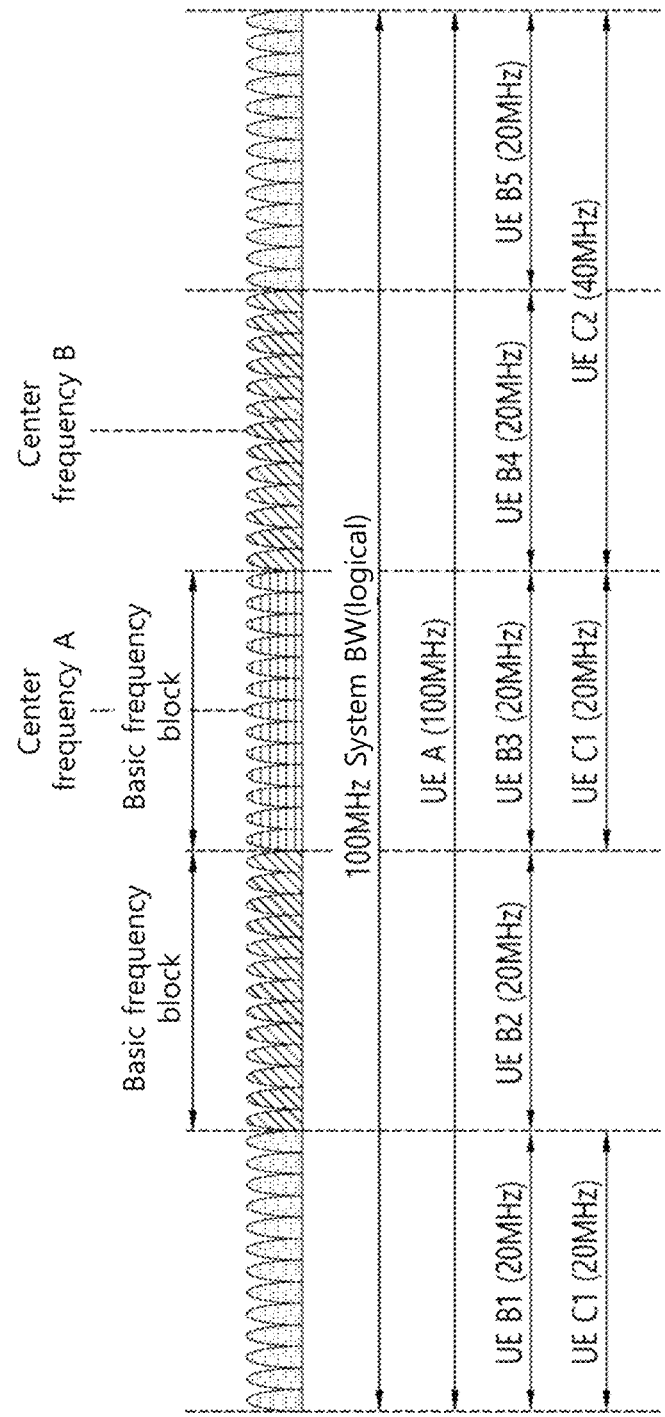
FIG. 8 is a conceptual diagram illustrating carrier aggregation.

FIG. 8 is a conceptual diagram illustrating carrier aggregation. The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
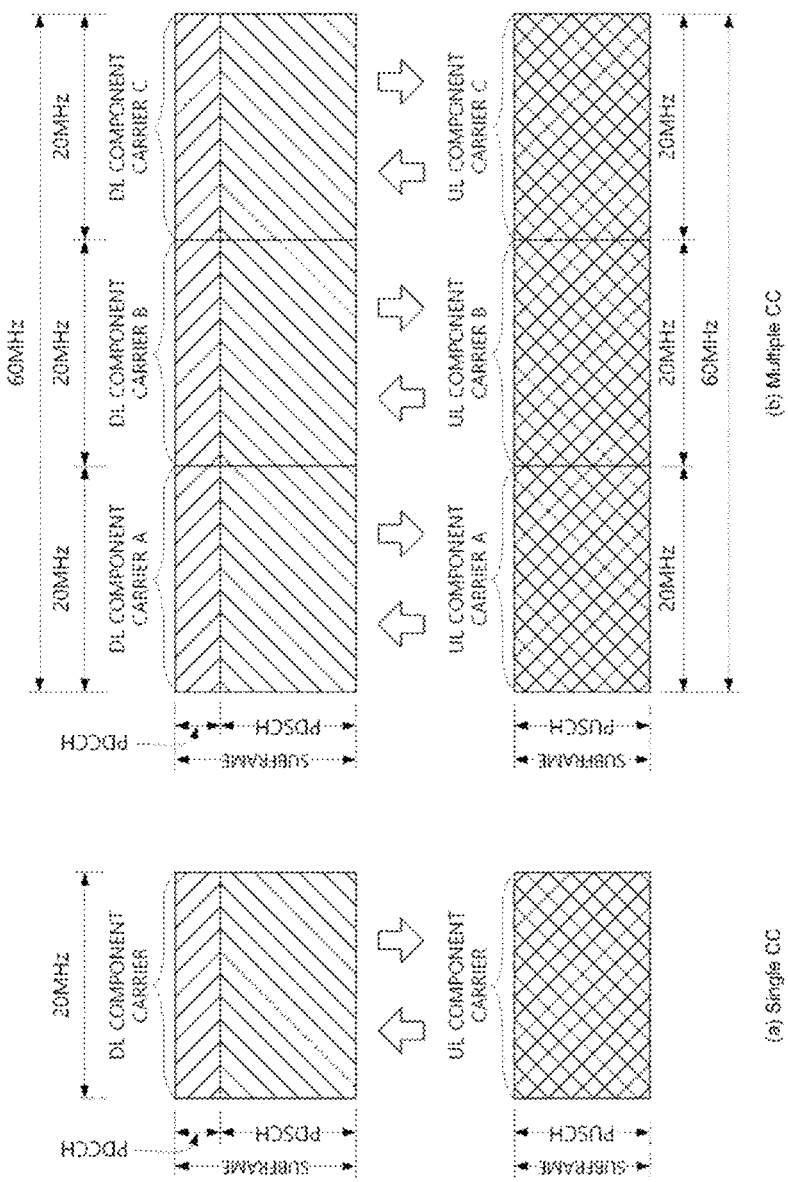
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
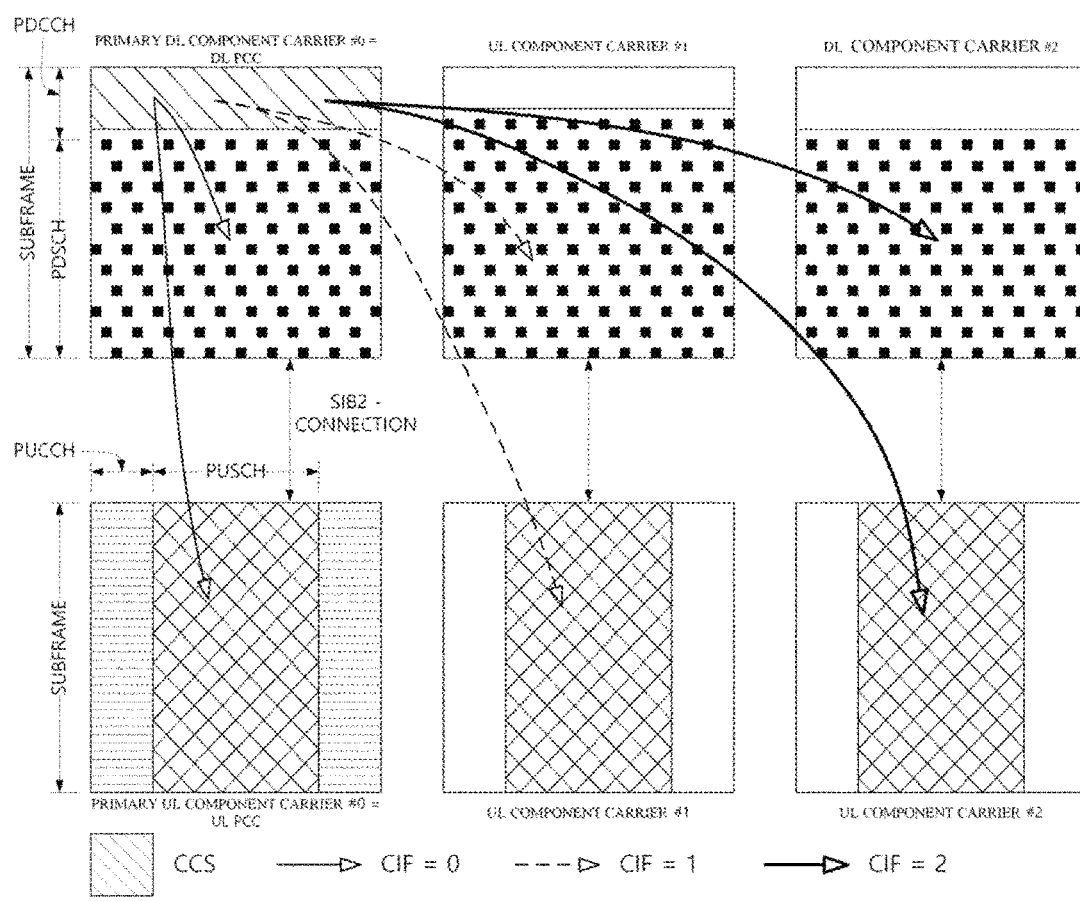
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

In the present invention, the number of symbols included in one slot is 14 in the case of a cell configured with a normal cyclic prefix (CP), and the number of symbols included in one slot is 12 in the case of a cell configured with an extended CP but for convenience of description, seven symbols are assumed and described.

Figure 11:
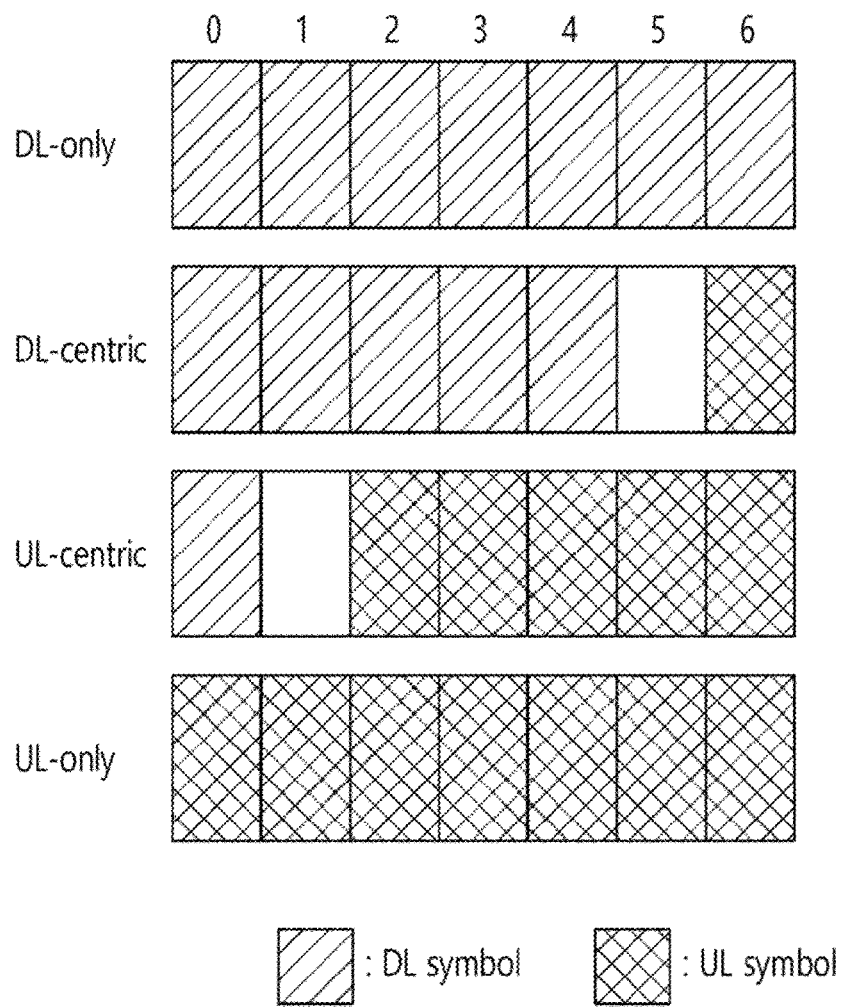
FIG. 11 is a diagram illustrating a slot configuration of a TDD-based mobile communication system.

FIG. 11 is a diagram illustrating a slot configuration of a TDD-based mobile communication system.

Referring to FIG. 11, four slot configurations such as a slot including only a DL symbol DL-only, a DL symbol centric slot DL-centric, a UL symbol centric slot UL-centric, and a slot including only a UL symbol UL-only can be defined.

One slot may include seven symbols. When changing from downlink to uplink, or when changing from uplink to downlink, a gap may exist. That is, a gap may be inserted between the downlink and the uplink or between the uplink and the downlink. One symbol may be used to transmit downlink control information. Hereinafter, a symbol constituting a gap is referred to as a gap symbol.

A slot including only a DL symbol DL-only literally includes only a DL symbol. For example, the slot including only a DL symbol includes seven DL symbols as shown in DL-only of FIG. 11.

The DL symbol centric slot DL-centric includes a plurality of DL symbols, at least one gap symbol, and at least one UL symbol. For example, the DL symbol centric slot may sequentially include five DL symbols, one gap symbol, and one UL symbol as shown in DL-centric of FIG. 11.

The UL symbol centric slot UL-centric includes at least one DL symbol, at least one gap symbol, and a plurality of UL symbols. For example, the UL symbol centric slot may sequentially include one DL symbol, one gap symbol, and five UL symbols as shown in UL-centric of FIG. 11.

A slot including only UL symbol UL-only literally includes only a UL symbol. For example, a slot including only UL symbol includes seven UL symbols as shown in UL-only of FIG. 11.

The network may inform the terminal of the default slot configuration, for which RRC signaling may be used. Information on the default slot configuration set by the RRC signaling may be referred to as semi-static DL/UL allocation information. The default slot configuration is a slot configuration that the terminal can assume that the network uses when the base station does not transmit signaling for a separate slot configuration change to the terminal. The 3GPP NR system supports dynamic TDD that changes the slot configuration according to various traffic conditions of terminals. For this, the base station may inform the terminal of the slot configuration of current or future slots every slot or every several slots or each time the base station changes the slot configuration. Two methods can be used in the NR system to inform the slot configuration.

The first method is to use a group common PDCCH. The group common PDCCH is a PDCCH broadcast to a plurality of terminals and may be transmitted every slot, every several slots, or only when a base station is needed. The group common PDCCH may include a (dynamic) Slot Format information indicator (SFI) to transmit information on slot configuration, and the slot format information indicator may inform the current slot configuration in which the group common PDCCH is transmitted or several future slot configurations including the current slot configuration. When receiving the group common PDCCH, the terminal may know the current slot configuration or the future slot configuration including the current slot through the slot configuration information indicator included in the group common PDCCH. If the reception of the group common PDCCH fails, the terminal cannot determine whether the base station transmits the group common PDCCH.

The second method is a method of transmitting information on slot configuration in a UE-specific PDCCH for scheduling a PDSCH or a PUSCH. The UE-specific PDCCH may be transmitted in unicast only to a specific user who needs scheduling. The UE-specific PDCCH may transmit the same slot format information indicator as that transmitted in the group common PDCCH as slot configuration information of the scheduled slot. Alternatively, the UE-specific PDCCH may include information that can infer the configuration of the scheduled slot. For example, the terminal may know the slot to which the PDSCH or the PUSCH is allocated and the position of the OFDM symbol within the slot by receiving the UE-specific PDCCH allocated to the terminal, and infer the configuration of the slot therefrom. In addition, the UE-specific PDCCH scheduling the PDSCH may indicate the slot in which the PUCCH including the HARQ-ACK feedback information is transmitted and the position of the OFDM symbol in the slot, from which the configuration of the slot in which the PUCCH is transmitted can be inferred.

Hereinafter, a downlink signal used in the present specification is a radio signal transmitted from a base station to a terminal and may include physical downlink channels generated and processed in the physical layer, sequences, reference signals (DM-RS, CSI-RS, TRS, PT-RS, etc.), MAC messages each generated and processed in the MAC and RRC layers, and RRC messages (or RRC signaling). The MAC message and the RRC message may be referred to as higher layer signaling as being distinguished from signals of the physical layer constituting the lower layer of the OSI. Here, the downlink physical channel may further include a downlink physical shared channel (PDSCH), a downlink physical control channel (PDCCH), and a physical broadcast channel (PBCH).

In addition, the uplink signal used in the present specification is a radio signal transmitted by the terminal to the base station, and may include physical uplink channels generated and processed at the physical layer, sequences, reference signals (SRS, etc.), and MAC messages and RRC messages (or RRC signaling) generated and processed in the MAC layer and the RRC layer, respectively. Here, the uplink physical channel may again include an uplink physical shared channel (PUSCH), an uplink physical uplink control channel (PUCCH), and a physical random access channel (PRACH).

FIG. 12 is a diagram illustrating a physical uplink control channel (PUCCH) used in a wireless communication system according to an example.

Referring to FIG. 12, the 3GPP NR system may use two types of PUCCHs according to the size (i.e., number of symbols) of a time resource used for transmission of the PUCCH.

The first type PUCCH may be called a long PUCCH, and may be transmitted by being mapped to four or more consecutive symbols of a slot. The first type PUCCH is mainly used to transmit a large amount of uplink control information (UCI) or is allocated to users with low signal strength so that it is available to increase the coverage of the PUCCH. In addition, the first type PUCCH may be repeatedly transmitted in a plurality of slots to increase the coverage of the PUCCH. The first type PUCCH may include PUCCH format 1 that transmits 1 or 2 bit UCI, PUCCH format 3 that does not support multiplexing between users while transmitting more than 2 bits of UCI, and PUCCH format 4 that supports multiplexing between users while transmitting more than 2 bits of UCI.

The second type PUCCH may be called a short PUCCH, may be mapped to one or two symbols of a slot and transmitted and may be used to transmit a small amount of UCI, or may be allocated to users with high signal strength, and also may be used to support services that require low latency. The second type PUCCH may include PUCCH format 0 for transmitting 1 or 2 bits of UCI and PUCCH format 2 for transmitting UCI exceeding 2 bits.

In one slot, there may be a time-frequency resource available for the first type PUCCH and a time-frequency resource available for the second type PUCCH, and which may be allocated to different terminals, respectively, or to one terminal. When allocated to one terminal, the first type PUCCH and the second type PUCCH may be transmitted in different time resources (i.e., different OFDM symbols). That is, when allocated to one terminal, the first type PUCCH and the second type PUCCH may be transmitted through time division multiplexing (TDM).

The UCI mapped to the PUCCH may include a scheduling grant (SR), HARQ-ACK, rank information (RI), CSI, and beam-related information (BI). The SR is information that informs the base station that there is uplink transmission. HARQ-ACK is information that informs whether reception of a physical downlink shared channel (PDSCH) transmitted by a base station is successful. The RI is information that informs a rank that can be transmitted through a radio channel when using multiple antennas. The CSI is information that informs a value of measuring a channel situation between the base station and the terminal. The BI is information that informs information on beamforming of a transmitter and a receiver.

Figure 12A:
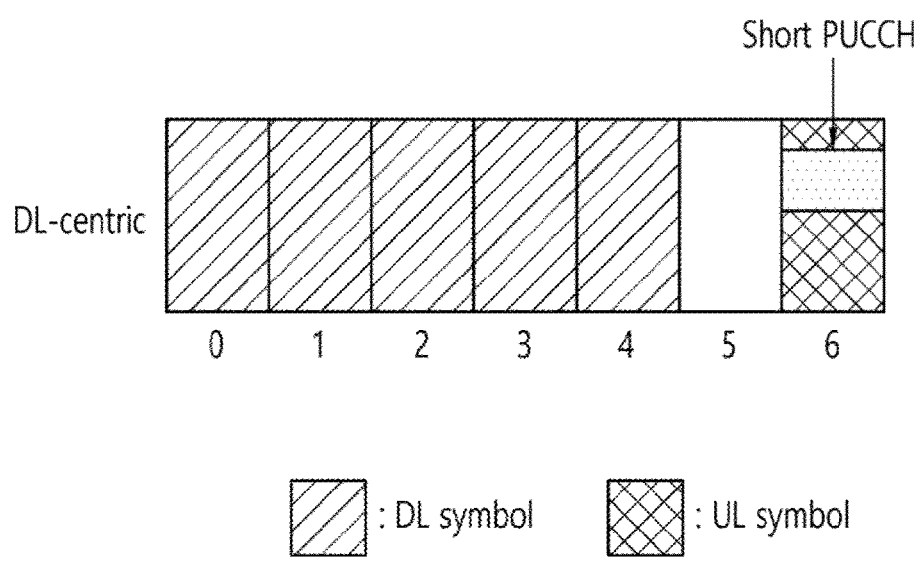
FIGS. 12A-12C are diagrams illustrating a physical uplink control channel (PUCCH) used in a wireless communication system according to an example.

Referring to FIG. 12(a), a DL symbol centric (DL-centric) slot may be configured and indicated by five DL symbols, one flexible symbol, and one UL symbol. A second type PUCCH having the first symbol length may be allocated to the DL symbol centric slot. The second type PUCCH may be located in the last symbol of the slot.

Figure 12B:
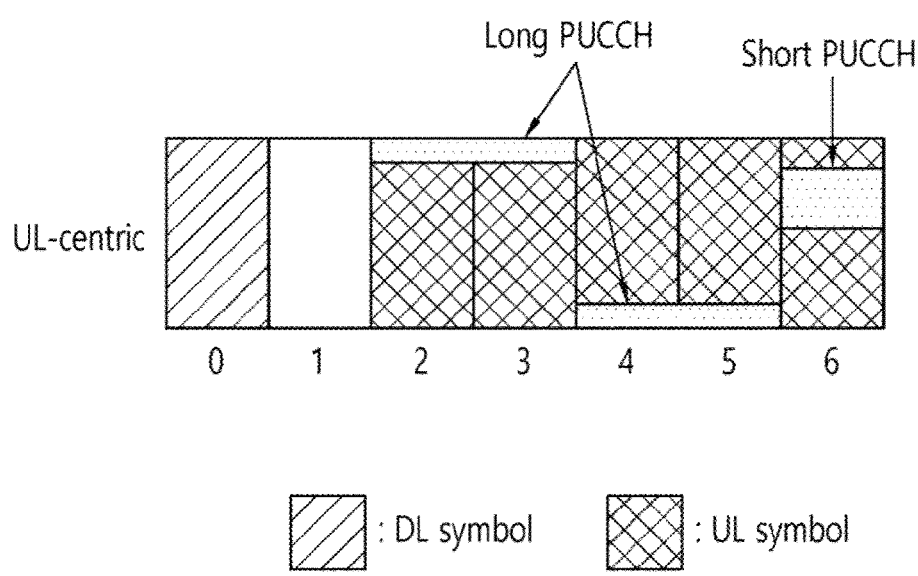

Referring to FIG. 12(b), the illustrated UL symbol-centric (UL-centric) slot may be configured and indicated by one DL symbol, one flexible symbol, and five UL symbols. A first type PUCCH or/and a second type PUCCH may be allocated to the UL symbol centric slot. The first type PUCCH may be mapped to four symbols and the second type PUCCH may be mapped to the last symbol of the slot.

Figure 12C:
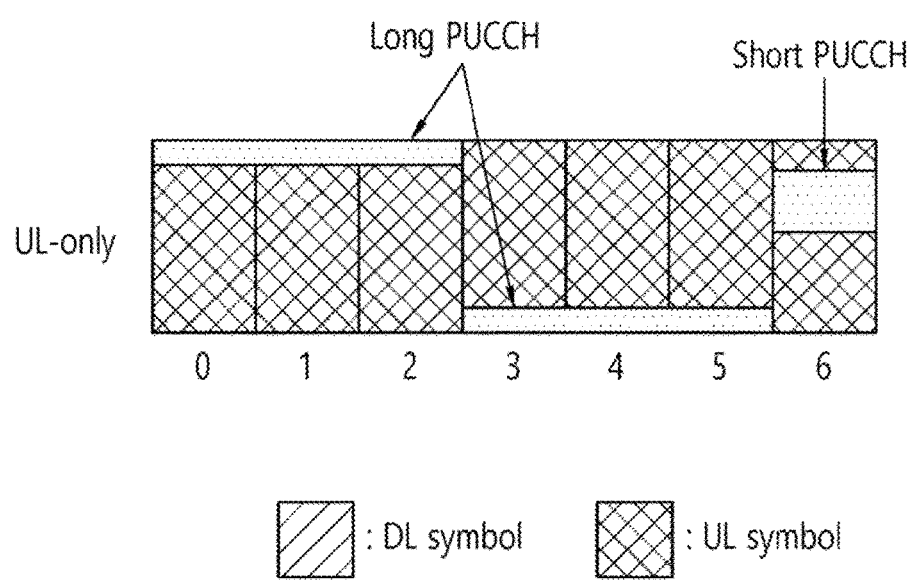

Referring to FIG. 12(c), a first type PUCCH and/or a second type PUCCH may be allocated to a slot in which only UL symbols exist (UL only). For example, the first type PUCCH may be mapped to six symbols and the second type PUCCH may be mapped to the last one symbol of the slot.

Referring to FIGS. 11 and 12, a slot configuration that can transmit a second type PUCCH is a slot including a DL symbol centric slot, a UL symbol centric slot, and only a UL symbol, and a slot configuration that can transmit a first type PUCCH is a UL symbol centric slot and a slot including only a UL symbol. In addition, a slot that can transmit the first type PUCCH and the second type PUCCH through TDM is a slot including a UL symbol centric slot and only a UL symbol. For reference, since there is only one symbol allocated to uplink in the DL symbol centric slot, the second type PUCCH can be transmitted but the first type PUCCH cannot be transmitted. Accordingly, the PDCCH scheduling the PUCCH may allocate the first type PUCCH to a UL symbol centric slot or a slot including only a UL symbol. In addition, the PDCCH scheduling the PUCCH may allocate the second type PUCCH to a DL symbol centric slot, a UL symbol centric slot, or a slot including only a UL symbol.

As described above, the base station (or network) may change the slot configuration according to the traffic of the terminal and various situations, and may inform the terminal of the change of the corresponding slot configuration. As the slot configuration may be changed as described above, the terminal should receive the slot configuration information indicator or the information on the slot configuration by monitoring the group common PDCCH and the UE-specific PDCCH. However, due to problems such as radio channel conditions and interference between the base station and the terminal, the terminal may fail to receive the group common PDCCH and the UE-specific PDCCH.

When the terminal fails to receive the group common PDCCH and/or UE-specific PDCCH, the terminal may not recognize whether the base station changes the slot configuration or not. However, in a case where the base station changes the slot configuration and PUCCH transmission scheduled by the terminal is not suitable for the changed slot configuration, if the terminal enforces PUCCH transmission as scheduled, failure to transmit PUCCH may cause problems such as temporary loss of communication or deferral. Therefore, in this case, a clear procedure or a preliminary protocol between the terminal and the base station, which is on whether the terminal transmits or drops the indicated PUCCH, and if so, how to perform transmission, is required.

An embodiment for this defines an operation method of the terminal and the base station, which is to solve the case where the terminal fails to receive the group common PDCCH and/or UE-specific PDCCH including the slot configuration information indicator and slot configuration related information.

In another embodiment, even though the terminal succeeds in receiving a group common PDCCH and/or UE-specific PDCCH including the slot configuration information indicator and the slot configuration related information, if the configuration of the slot to which the PUCCH is allocated (or the scheduled transmission of the PUCCH) is changed and the allocated PUCCH cannot be transmitted, a terminal for processing the transmission of the PUCCH, an operation method thereof, and a base station for processing the reception of the allocated PUCCH and an operation method thereof are defined.

Embodiment

First, a method of operating a terminal and a base station according to the present embodiment will be described. The present embodiment implements a predictable communication situation between the terminal and the base station by placing a certain restriction on the slot configuration change of the base station. In this case, the PUCCH transmission of the terminal may be performed regardless of the success or failure of reception of the group common PDCCH and the UE-specific PDCCH.

Embodiments: The Slot Configuration of the Slot Including the Symbol in which PUCCH is Allocated (or to be Transmitted) Remains the Same without a Change.

This embodiment may be divided into detailed examples according to whether the PUCCH allocated (or to be transmitted) is a first type PUCCH or a second type PUCCH.

As an example, the slot configuration of the symbol in which the first type PUCCH is allocated (or to be transmitted) remains the same without a change. That is, the base station does not change the slot configuration of the OFDM symbol to which the first type PUCCH is allocated, and the terminal also assumes (or promises or expects) that the slot configuration of the OFDM symbol to which the first type PUCCH is allocated is not changed. Accordingly, the terminal may transmit the first type PUCCH regardless of receiving the slot configuration information indicator and the slot configuration related information transmitted in the group common PDCCH and the UE-specific PDCCH.

As another example, the slot configuration of the symbol in which the second type PUCCH is allocated (or to be transmitted) remains the same without a change. That is, the base station does not change the slot configuration of the symbol in which the first type PUCCH is allocated (or to be transmitted), and the terminal also assumes (or promises or expects) that the slot configuration of the symbol in which the second type PUCCH is allocated (to be transmitted) is not changed. Accordingly, the terminal may transmit the second type PUCCH regardless of receiving the slot configuration information indicator and the slot configuration related information transmitted in the group common PDCCH and the UE-specific PDCCH.

As described above, an embodiment of prohibiting a slot configuration change of a base station may be a limitation in flexible scheduling. In order to supplement this aspect, an embodiment of another aspect that allows a slot configuration change of a base station within a certain range is disclosed below.

The Slot Configuration of a Symbol in which PUCCH is Allocated (or to be Transmitted) can be Changed Only within a Certain Range.

Even if the slot configuration of a symbol in which a PUCCH is allocated (or to be transmitted) is changed, the slot configuration may be changed to a slot configuration that can transmit the PUCCH and may not be changed to a slot configuration in which the PUCCH cannot be transmitted. Therefore, the terminal does not expect to change to a slot in which the PUCCH transmission is unavailable with respect to the slot indicated with PUCCH transmission by the base station. This embodiment according to this aspect may be divided into detailed embodiments according to whether the PUCCH allocated (or to be transmitted) is a first type PUCCH or a second type PUCCH again.

For example, even if the slot configuration of a symbol in which a first type PUCCH is allocated is changed, the base station may change the slot configuration to a slot configuration that can transmit the first type PUCCH and cannot change the slot configuration to a slot configuration in which transmission of the first type PUCCH is unavailable. Therefore, the terminal does not expect to change to a slot in which the first type PUCCH transmission is unavailable with respect to the slot indicated with the first type PUCCH transmission by the base station. Even if the terminal fails to receive the group common PDCCH including the slot configuration information indicator of the slot for transmitting the first type PUCCH, the terminal may always transmit the first type PUCCH to the allocated resource.

For example, referring to FIG. 12, the base station may change the UL symbol centric slot to which the first type PUCCH of the fourth OFDM symbol length is allocated to a slot including only UL symbols but cannot change the UL symbol centric slot to a slot including only a DL symbol having one UL symbol or a DL symbol centric slot. On the other hand, the terminal may expect that the UL symbol centric slot to which the first type PUCCH having 4 OFDM symbol lengths indicated with transmission from the base station can be changed into a slot including only UL symbols but does not expect a change to a slot including only DL symbols or to a DL symbol centric slot. In addition, the terminal does not expect a change in the slot configuration in which the UL symbol(s) indicated by the base station to transmit the first type PUCCH is changed to the DL symbol(s).

As another example, even if the slot configuration of a symbol in which a second type PUCCH is allocated is changed, the base station may change the slot configuration to a slot configuration that can transmit the second type PUCCH and cannot change the slot configuration to a slot configuration in which transmission of the second type PUCCH is unavailable. Therefore, the terminal does not expect to change to a slot in which the second type PUCCH transmission is unavailable with respect to the slot indicated with the first type PUCCH transmission by the base station. Even if the terminal fails to receive the group common PDCCH including the slot configuration information indicator of the slot for transmitting the second type PUCCH, the terminal may always transmit the second type PUCCH to the allocated resource. More specifically, the base station may change the UL symbol centric slot to which the second type PUCCH is allocated to a DL symbol centric slot that can transmit the second type PUCCH or a slot including only a UL symbol but cannot change the slot to a slot including only a DL symbol, in which the second type PUCCH transmission is unavailable. In addition, the terminal does not expect the base station to change to a slot in which transmission of the second type PUCCH is unavailable with respect to the slot indicated to transmit the second type PUCCH.

For example, the terminal may expect (or predict) that a UL symbol centric slot to which the second type PUCCH of the first or second symbol length indicated with transmission by a base station can be changed to a DL symbol centric slot including the second type PUCCH or a slot including only a UL symbol but does not expect (or predict) that the UL symbol centric slot can be changed to a slot including only a DL symbol in which the second type PUCCH cannot be included. In addition, the terminal does not expect a change in the slot configuration in which the UL symbol(s) indicated by the base station to transmit the second type PUCCH is changed to the DL symbol(s).

As described above, an embodiment of another aspect for increasing scheduling flexibility is disclosed as compared with an embodiment that allows a slot configuration change of a base station to be within a certain range.

It is Available to Freely Change the Slot Configuration of a Symbol in which a PUCCH is Allocated (or to be Transmitted)

The base station can freely change the configuration of the slot to which the PUCCH is allocated.

In the example where the PUCCH is a first type PUCCH, if the terminal fails to receive the group common PDCCH including the slot configuration information indicator of the slot for transmitting the first type PUCCH, the terminal may not transmit the first type PUCCH to the allocated resource.

In the example where the PUCCH is a second type PUCCH, if the terminal fails to receive the group common PDCCH including the slot configuration information indicator of the slot for transmitting the second type PUCCH, the terminal may not transmit the second type PUCCH to the allocated resource.

According to the above embodiment, even if the terminal fails to receive the group common PDCCH and/or UE-specific PDCCH from the base station, since transmission and a transmission procedure of scheduled PUCCH are clearly defined, communication error or deferral problem can be solved.

Another Embodiment

Another embodiment of the present disclosure relates to an operation procedure of a terminal and a base station when the slot configuration of the base station is free to change and the terminal succeeds in receiving at least one of the group common PDCCH and the UE-specific PDCCH including the slot configuration information indicator and the slot configuration related information.

More specifically, when the configuration of a slot to which PUCCH is allocated (or scheduled to transmit PUCCH) is changed, and the changed slot configuration is contradicted with PUCCH (i.e., when the symbol to which the PUCCH is allocated in the slot to which the PUCCH is allocated overlaps the DL symbol by the changed slot configuration), a terminal for processing the transmission of the PUCCH and an operation method thereof, and a base station for processing the reception of the PUCCH and an operation method thereof are disclosed.

In the modified slot configuration, transmission of the allocated PUCCH may or may not be available (or valid, or suitable) or may not be available (so-called contradicted slot configuration). Here, the slot that can transmit the PUCCH, for example, with reference to FIG. 12, includes a UL symbol centric slot to which a first type PUCCH is allocated or a slot including only a UL symbol, and a DL symbol centric slot to which a second type PUCCH is allocated or a UL symbol centric slot or a slot including only a UL symbol. In addition, a slot in which PUCCH cannot be transmitted includes, for example, a case where the slot to which the first type PUCCH is allocated is changed to a DL symbol centric slot or a slot configuration including only a DL symbol, or a case where the slot to which the second type PUCCH is allocated is changed to a slot configuration including only a DL symbol.

When the configuration of the slot indicated to transmit the PUCCH is changed, the terminal may perform the transmission of the PUCCH as scheduled in the indicated slot if the allocated PUCCH transmission is available (or valid or suitable) in the changed slot configuration. However, even if the indicated slot is contradicted with the transmission of the PUCCH due to the change of configuration, in order to transmit the PUCCH as scheduled, a special protocol is required between the terminal and the base station. Hereinafter, a method of processing a PUCCH under a contradicted slot configuration will be described. Since the information transmitted to the base station through the PUCCH is UCI, the present invention may include an embodiment in which the term PUCCH is replaced with UCI in all embodiments of the present specification. For example, the processing method of the PUCCH under the contradicted slot configuration corresponds to the processing method of the UCI (HARQ-ACK, RI, etc.) under the contradicted slot configuration from a UCI perspective.

Method of Processing PUCCH in Indicated Slot

First, when the allocated PUCCH is the first type PUCCH, the PUCCH processing method under the contradicted slot configuration will be described. UCI (HARQ-ACK, RI, CSI, etc.) described with reference to FIG. 3 is mapped to the first type PUCCH.

In one aspect, the method of processing PUCCH may include receiving, by the terminal, a group common PDCCH including a slot configuration information indicator of a slot indicated to transmit the first type PUCCH, and performing transmission of the first type PUCCH or the second type PUCCH in the indicated slot based on a condition according to the following examples.

As an example, the terminal may transmit a first type PUCCH in the indicated slot based on a result of comparing a UL symbol according to a slot configuration in a slot indicated to transmit the first type PUCCH and a UL symbol allocated to transmission of the first type PUCCH. For example, if the UL symbol according to the slot configuration in the slot indicated to transmit the first type PUCCH is larger than (or greater than or equal to) the UL symbol required for the transmission of the first type PUCCH, the terminal transmits the first type PUCCH to the allocated resource in the slot.

As another example, the terminal may transmit the first type PUCCH or drop or suspend the transmission based on a result of comparing a UL symbol according to a slot configuration in a slot indicated to transmit a first type PUCCH and a UL symbol required for transmitting the first type PUCCH. For example, if the UL symbol according to the slot configuration in the slot indicated to transmit the first type PUCCH is less than the UL symbol required for the transmission of the first type PUCCH, the terminal may drop transmission of the first type PUCCH in the indicated slot. For example, if the slot indicated to transmit PUCCH is multiple slots, instead of the first slot in which the first type PUCCH transmission is scheduled, the terminal may transmit the first type PUCCH by deferring to a second slot that provides a UL symbol required for transmitting the first type PUCCH. On the other hand, if the slot indicated to transmit the PUCCH is a single slot, the terminal may drop or suspend the scheduled first type PUCCH transmission.

As another example, the terminal may transmit a first type PUCCH based on a result of comparing a UL symbol according to a slot configuration in a slot indicated to transmit the first type PUCCH, a flexible symbol, and a UL symbol allocated to transmission of the first type PUCCH. For example, if a symbol including the UL symbol according to the slot configuration in the slot indicated to transmit the first type PUCCH and a flexible symbol is larger than (or greater than or equal to) the UL symbol required for the transmission of the first type PUCCH, the terminal transmits the first type PUCCH to the allocated resource in the slot.

As another example, the terminal may transmit the first type PUCCH or drop or suspend the transmission based on a result of comparing a UL symbol according to a slot configuration in a slot indicated to transmit a first type PUCCH, a flexible symbol, and a UL symbol allocated for transmitting the first type PUCCH. For example, if a symbol including the UL symbol according to the slot configuration in the slot indicated to transmit the first type PUCCH and a flexible symbol is less than the UL symbol required for the transmission of the first type PUCCH, it is available to drop transmission of the first type PUCCH in the indicated slot. For example, if the slot indicated to transmit PUCCH is multiple slots, the terminal may transmit the first type PUCCH in a slot that satisfies the number of UL symbols allocated to the transmission of the first type PUCCH among the multiple slots. On the other hand, if the slot indicated to transmit the PUCCH is a single slot, the terminal may drop or suspend the scheduled first type PUCCH transmission.

In another aspect, the method of processing PUCCH may include receiving, by the terminal, a group common PDCCH and a UE-specific PDCCH indicating a slot configuration of a slot indicated to transmit a first type PUCCH and transmitting the first type PUCCH or the second type PUCCH according to a condition. In this case, the terminal may determine whether to transmit the first type PUCCH in the indicated slot based on a condition according to the following examples.

As an example, i) the base station may change the configuration of the slot to which the first type PUCCH is allocated, ii) the terminal successfully receive a group common PDCCH and a UE-specific PDCCH indicating the configuration of the slot to which the first type PUCCH is allocated. iii) if the configuration of the slot is a slot that can transmit the first type PUCCH, the terminal may transmit the first type PUCCH to the allocated resource of the slot.

Figure 13:
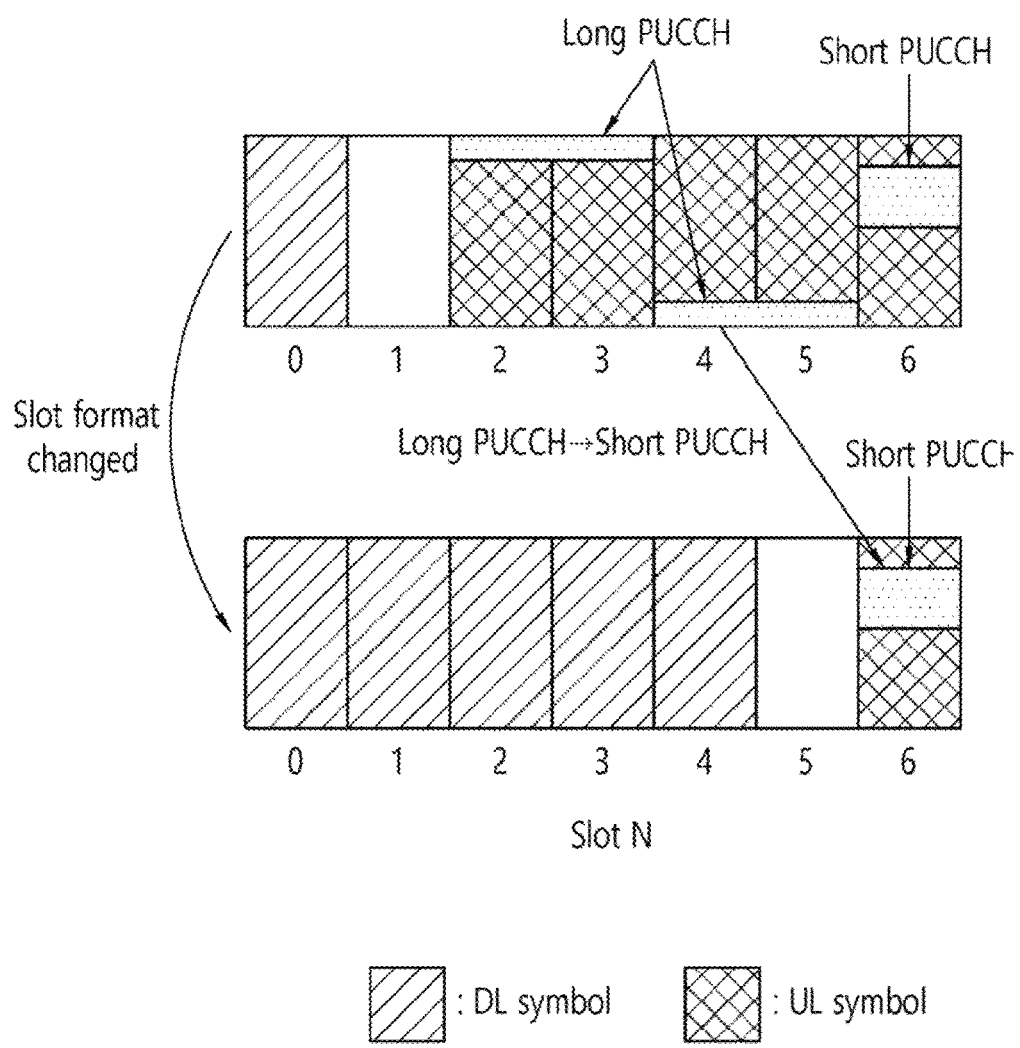
FIG. 13 is a diagram illustrating a method of transmitting a PUCCH in a slot.

As another example, i) the base station may change the configuration of the slot to which the first type PUCCH is allocated, ii) the terminal successfully receives the group common PDCCH and UE-specific PDCCH indicating the configuration of the slot to which the first type PUCCH is allocated, but iii) if the configuration of the slot is a slot that cannot transmit the first type PUCCH, the terminal may not perform the transmission of the first type PUCCH in the slot, or transmit the first type PUCCH corresponding to the changed slot configuration, or transmit a second type PUCCH in the slot instead of the first type PUCCH as shown in FIG. 13. The specific operation of the terminal is shown in Table 4 below.

TABLE 4

| Operation |
| --- |
| The terminal does not transmit the allocated first type PUCCH. |
| In the case of a slot configuration (or format) basically having a length (e.g., 4 to 12 symbols) of a symbol that can configure the first type PUCCH, when the UL symbol that can configure the first type PUCCH in the corresponding slot is smaller than the preset first type PUCCH symbol to be transmitted, the terminal transmits a first type PUCCH that matches a UL symbol that can be transmitted in the changed slot configuration (or format) or matches the minimum four symbol lengths even if it is less than a UL symbol. |
| Alternatively, the transmission of the UCI intended for the terminal may be configured such that the terminal transmits the first type PUCCH that matches a fixed symbol length (i.e. 4 symbol lengths) regardless of the UL symbol that can be transmitted in the corresponding slot. Although the configuration of the slot cannot transmit the first type PUCCH, when the slot can transmit the second type PUCCH, the terminal may transmit the second type PUCCH in the slot instead of transmitting the allocated first type PUCCH. However, the amount of UCI that can be transmitted through the second type PUCCH in the slot may be limited. In this case, the terminal may transmit the UCI based on at least one of the following several methods. In one aspect, the terminal may transmit some information according to the importance of the UCI to be transmitted through the first type PUCCH. As an example, the importance or priority of the information that can be transmitted in the first type PUCCH may be defined in the order of HARQ-ACK, Rank information (RI), Channel state information (CSI), beam-related information (BRI) (e.g., beam recovery request) (HARQ-ACK > RI > CSI > BRI). As another example, the importance or priority of information that can be transmitted in the first type PUCCH may be defined in the order of HARQ-ACK, beam related information, RI, and CSI (HARQ-ACK > BRI > RI > CSI). As another example, the importance or priority of information that can be transmitted in the first type PUCCH may be defined in the order of beam related information, HARQ-ACK, RI, and CSI (BRI > HARQ-ACK > RI > CSI). In another aspect, the terminal may transmit some information of high importance through the second type PUCCH according to the amount of UCI that can be transmitted through the second type PUCCH. In another aspect, when information to be transmitted in a first type PUCCH includes information of a primary cell PCell and a secondary cell SCell, the terminal may transmit some information according to the importance or priority between the primary cell and the secondary cell. As an example, the terminal may transmit only information related to the primary cell through the second type PUCCH. - As another example, when the information to be transmitted in the first type PUCCH includes information of a primary cell or a primary secondary cell PSCell, the terminal may transmit only information related to the primary cell or the primary secondary cell through the second type PUCCH. In another aspect, the terminal may preferentially transmit UCIs for DL associated with a PUCCH transmittable cell (e.g., SIB linked DL Cell) on each PUCCH group through the second type PUCCH. In another aspect, the terminal may transmit the second type PUCCH based on the importance between the primary cell and the secondary cell and the importance of the UCI. As an example, the terminal may transmit a type of UCI having a high priority among UCIs (HARQ-ACK, beam related information, RI, CSI, etc.) related to the primary cell through the second type PUCCH. This primarily considers a type of serving cell than a type of UCI to be transmitted through the second type PUCCH. Of course, a type of UCI to be transmitted through the second type PUCCH may be considered in preference to a type of serving cell. The priority between the serving cell and the UCI may be transmitted by the base station to the terminal by being included in configuration information such as RRC signaling or may be individually defined according to the payload size of the second type PUCCH. In another aspect, the terminal may transmit only UCI up to a predetermined bit through the second type PUCCH according to the payload size of the UCI. For example, the terminal may be configured to transmit UCI up to X bits (where X is $\{2 <= X <= $ tens of bits$\}$) through the second type PUCCH. In another aspect, the terminal may be configured to transmit HARQ-ACK or BRI up to X bits (where X is $\{2 <= X <= $ tens of bits$\}$) through the second type PUCCH based on a particular type of UCI (i.e., the number of bits of HARQ-ACK or BRI) |

As another example, i) the base station may change the configuration of the slot to which the first type PUCCH is allocated, ii) the terminal successfully receives the group common PDCCH and UE-specific PDCCH indicating the configuration of the slot to which the first type PUCCH is allocated, iii) the configuration of the slot is a slot that can transmit a first type PUCCH, and iv) a PUSCH is allocated to the slot (or scheduled to be transmitted), and is configured for simultaneous transmission of PUCCH and PUSCH, v) if the inter-modulation distortion (IMD) may occur due to frequency separation between the PUCCH and the PUSCH, and is configured to not transmit the first type PUCCH, the terminal performs at least one of the operations according to Table 4 above.

Next, the case where the allocated PUCCH is the second type PUCCH will be described. UCI (HARQ-ACK, RI, CSI, etc.) described with reference to FIG. 3 is mapped to the second type PUCCH.

In one aspect, the method of processing PUCCH may include receiving, by the terminal, a group common PDCCH including a slot configuration information indicator of a slot indicated to transmit the second type PUCCH, and performing transmission of the second type PUCCH according to a condition. In this case, the terminal may determine whether to transmit the second type PUCCH based on a condition according to the following examples.

As an example, the terminal may transmit a second type PUCCH based on a result of comparing a UL symbol according to a slot configuration in a slot indicated to transmit the second type PUCCH and a UL symbol allocated to transmission of the second type PUCCH. For example, if the UL symbol according to the slot configuration in the slot indicated to transmit the second type PUCCH is larger than (or greater than or equal to) the UL symbol required for the transmission of the second type PUCCH, the terminal transmits the second type PUCCH to the allocated resource in the slot.

As another example, the terminal may transmit the second type PUCCH or drop or suspend the transmission based on a result of comparing a UL symbol according to a slot configuration in a slot indicated to transmit a second type PUCCH and a UL symbol required for transmitting the second type PUCCH. For example, if the UL symbol according to the slot configuration in the slot indicated to transmit the second type PUCCH is less than the UL symbol allocated to the transmission of the second type PUCCH, it is available to drop transmission of the first type PUCCH in the indicated slot. For example, if the slot indicated to transmit PUCCH is multiple slots, the terminal may transmit the second type PUCCH in a second slot that satisfies the number of UL symbols required for the transmission of the second type PUCCH among the multiple slots. On the other hand, if the slot indicated to transmit the PUCCH is a single slot, the terminal may drop or suspend the scheduled second type PUCCH transmission.

As another example, the terminal may transmit a second type PUCCH based on a result of comparing a UL symbol according to a slot configuration in a slot indicated to transmit the second type PUCCH, a flexible symbol, and a UL symbol allocated to transmission of the second type PUCCH. For example, if a symbol including the UL symbol according to the slot configuration in the slot indicated to transmit the second type PUCCH and a flexible symbol is larger than (or greater than or equal to) the UL symbol required for the transmission of the second type PUCCH, the terminal transmits the second type PUCCH to the allocated resource in the slot.

As another example, the terminal may transmit the second type PUCCH or drop or suspend the transmission based on a result of comparing a UL symbol according to a slot configuration in a slot indicated to transmit a second type PUCCH, a flexible symbol, and a UL symbol required for transmitting the second type PUCCH. For example, if a symbol including the UL symbol according to the slot configuration in the slot indicated to transmit the second type PUCCH and a flexible symbol is less than the UL symbol required for the transmission of the second type PUCCH, it is available to drop transmission of the second type PUCCH in the indicated slot. For example, if the slot indicated to transmit PUCCH is multiple slots, the terminal may transmit the second type PUCCH in a second slot that satisfies the number of UL symbols required for the transmission of the second type PUCCH among the multiple slots. On the other hand, if the slot indicated to transmit the PUCCH is a single slot, the terminal may drop or suspend the scheduled second type PUCCH transmission.

Method of Processing PUCCH in Slot Different from Indicated Slot

The PUCCH processing method according to the present embodiment may include, when the configuration of the slot indicated to transmit PUCCH is changed, performing, by the terminal, transmission in another slot after the indicated slot. That is, when a UL symbol carrying the PUCCH in a slot to which a PUCCH is allocated overlaps a DL symbol in the slot by a changed slot configuration, the terminal may postpone or defer transmission of the PUCCH to another slot that can transmit the PUCCH instead of the indicated slot.

In the other deferred slot, a PUCCH has the same type as the allocated specific type of PUCCH may be transmitted, or a PUCCH of a type different from the allocated specific type of PUCCH may be transmitted. In the other deferred slot, a PUCCH having the same type as the allocated specific type of PUCCH may be transmitted, and the time domain allocation for PUCCH transmission may be different from the allocated specific type of PUCCH.

First, when the allocated PUCCH is the first type PUCCH, the PUCCH processing method under the contradicted slot configuration will be described. Here, the first type PUCCH may include the UCI described above with reference to FIG. 3, in particular, HARQ-ACK, RI, CSI, and the like. Since the information mapped to the first type PUCCH is UCI, the present invention may include an embodiment in which the term first type PUCCH is replaced with UCI in all embodiments of the present specification.

Figure 14A:
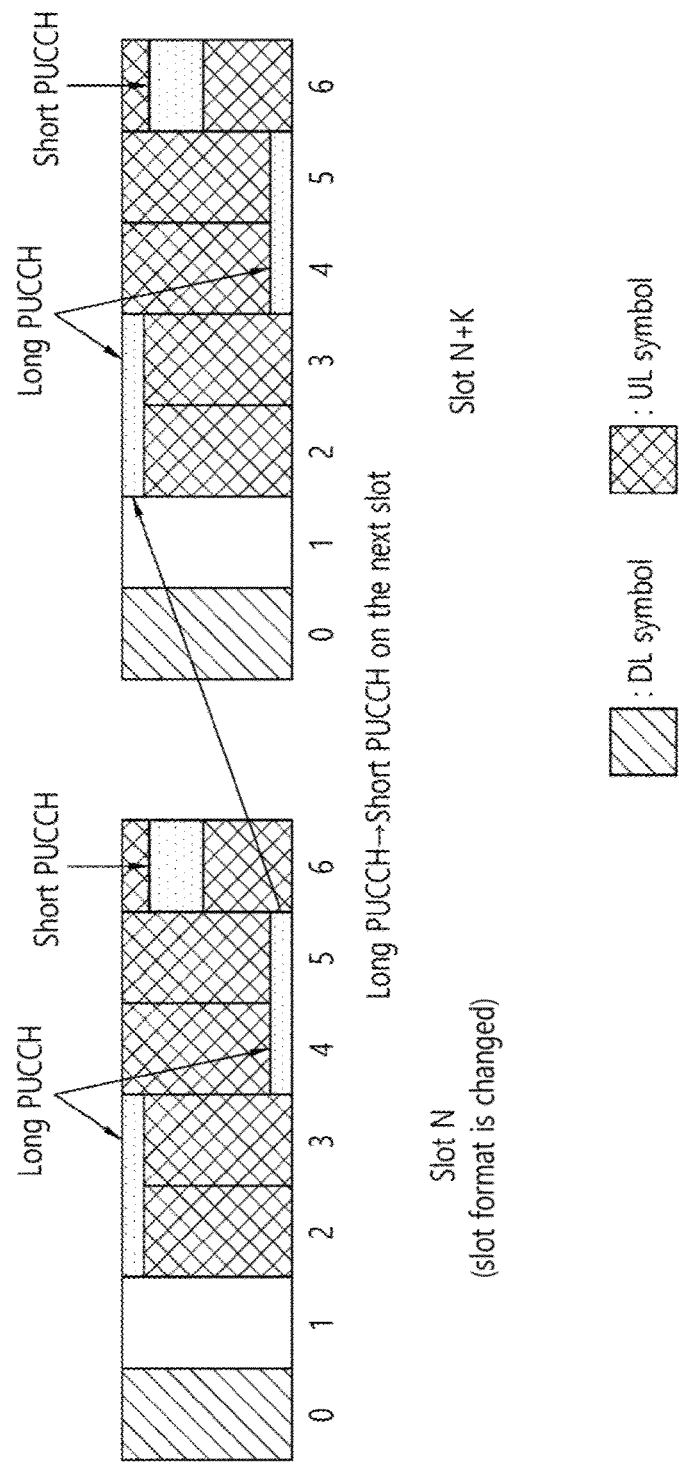
FIGS. 14A-14B are diagrams illustrating an example of transmitting a PUCCH to another slot as a slot configuration is changed.

FIG. 14 is a diagram illustrating an example of transmitting a PUCCH to another slot as a slot configuration is changed.

Referring to FIG. 14(*a*), the terminal may recognize that a UL symbol centric slot N to which a first type PUCCH (Long PUCCH) is allocated is changed to a DL symbol centric slot configuration in which the first type PUCCH cannot be transmitted by a base station through reception of a group common PDCCH and/or UE-specific PDCCH indicating a slot configuration change. In this case, the terminal may transmit the first type PUCCH in the deferred slot N+K without transmitting the first type PUCCH in the slot N. That is, in the deferred slot N+K, a first type PUCCH having the same type as the allocated first type PUCCH is transmitted. Here, the slot N+K may be a UL symbol centric slot as the closest slot that can transmit the allocated first type PUCCH.

In other words, although the base station changes the configuration of the slot to which the first type PUCCH is allocated and the terminal succeeds in receiving the group common PDCCH and the UE-specific PDCCH including the slot configuration information, if the configuration of the slot is a slot that can not transmit the first type PUCCH, the terminal may not transmit the first type PUCCH in the slot and thereafter, may transmit the first type PUCCH in the closest slot that can transmit the first type PUCCH among the slots.

Figure 14B:
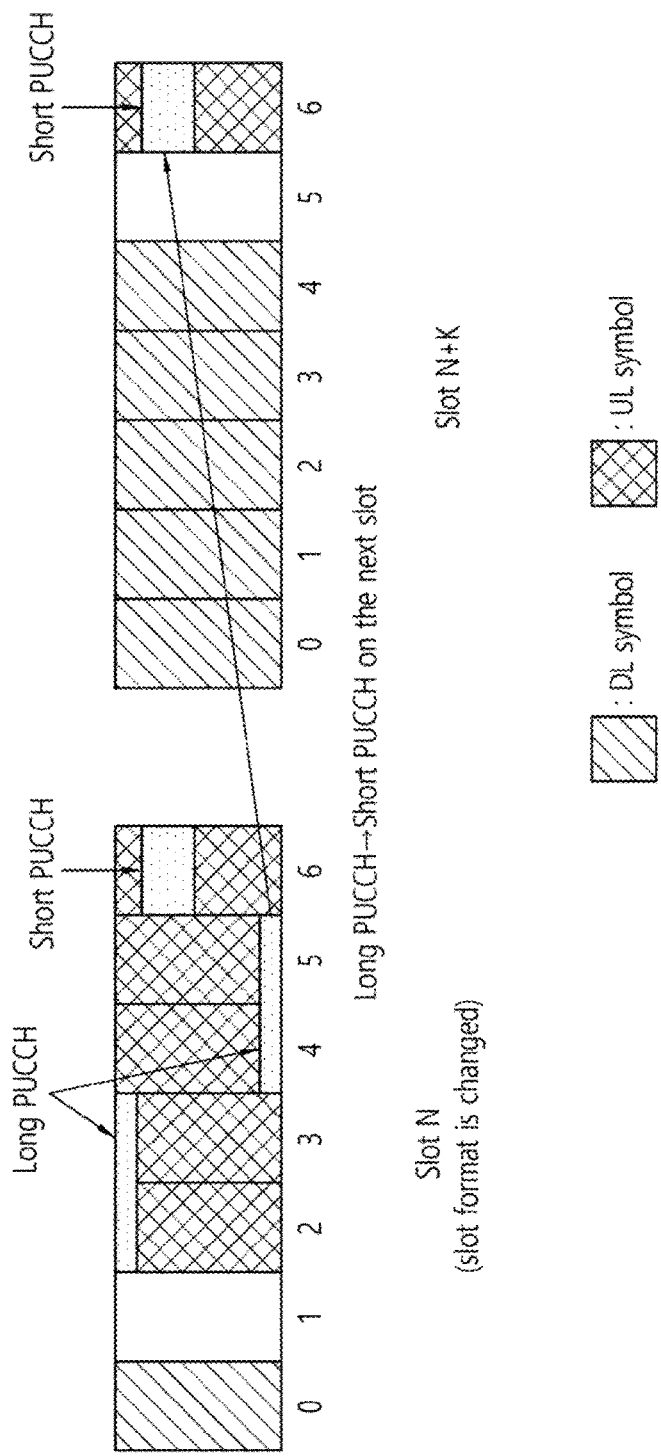

Meanwhile, referring to FIG. 14(b), the terminal may recognize that a UL symbol centric slot N to which a first type PUCCH (Long PUCCH) is allocated is changed to a slot configuration in which the first type PUCCH cannot be transmitted by a base station through reception of a group common PDCCH and/or UE-specific PDCCH indicating a slot configuration change. In this case, the terminal may transmit the second type PUCCH (Short PUCCH) in the slot N+K without transmitting the first type PUCCH in the slot N. In the deferred slot N+K, a second type PUCCH having a different type than the allocated first type PUCCH is transmitted. That is, in the deferred slot N+K, a second type PUCCH, which has a type changed from the allocated first type PUCCH, is transmitted. Here, the slot N+K may be a DL symbol centric slot as the closest slot that can transmit the second type PUCCH.

In other words, although the base station changes the configuration of the slot to which the first type PUCCH is allocated and the terminal succeeds in receiving the group common PDCCH and the UE-specific PDCCH including the slot configuration information, if the configuration of the slot is a slot that can not transmit the first type PUCCH, the terminal may not transmit the first type PUCCH in the slot and thereafter, may transmit the second type PUCCH in the closest slot that can transmit the second type PUCCH among the slots.

Here, the UCI transmitted through the second type PUCCH may include only a part of the UCI that is originally scheduled for transmission according to its importance, and may not include the remaining part.

In one aspect, the terminal may transmit some information of the UCI according to the importance of the UCI type that should be transmitted originally through the first type PUCCH. As an example, the importance or priority of the UCI type that can be transmitted in the first type PUCCH may be defined in the order of HARQ-ACK, Rank information (RI), Channel state information (CSI), beam-related information (BRI) (e.g., beam recovery request) (HARQ-ACK>RI>CSI>BRI). As another example, the importance or priority of the UCI type that can be transmitted in the first type PUCCH may be defined in the order of HARQ-ACK, beam related information, RI, and CSI (HARQ-ACK>BRI>RI>CSI). As another example, the importance or priority of the UCI type that can be transmitted in the first type PUCCH may be defined in the order of beam related information, HARQ-ACK, RI, and CSI (BRI>HARQ-ACK>RI>CSI).

In another aspect, the terminal may transmit some types of UCI of high importance through the second type PUCCH according to the amount of UCI that can be transmitted through the second type PUCCH.

In another aspect, when information to be transmitted in a first type PUCCH includes information of a primary cell PCell and a secondary cell SCell, the terminal may transmit some information according to the importance or priority between the primary cell and the secondary cell. As an example, the terminal may transmit only the UCI related to the primary cell through the second type PUCCH. As another example, when the information to be transmitted in the first type PUCCH includes information of a primary cell or a primary secondary cell PSCell, the terminal may transmit only the UCI related to the primary cell or the primary secondary cell through the second type PUCCH.

In another aspect, the terminal may preferentially transmit UCIs for DL associated with a PUCCH transmittable cell (e.g., SIB linked DL Cell) on each PUCCH group through the second type PUCCH.

In another aspect, the terminal may transmit the second type PUCCH based on the importance between the primary cell and the secondary cell and the importance of the UCI type. As an example, the terminal may transmit a type of UCI having a high priority among UCIs (HARQ-ACK, beam related information, RI, CSI, etc.) related to the primary cell through the second type PUCCH. This primarily considers a type of serving cell than a type of UCI to be transmitted through the second type PUCCH. Of course, a type of UCI to be transmitted through the second type PUCCH may be considered in preference to a type of serving cell. The priority between the serving cell and the UCI may be transmitted by the base station to the terminal by being included in configuration information such as RRC signaling or may be individually defined according to the payload size of the second type PUCCH.

In another aspect, the terminal may transmit only UCI up to a predetermined bit through the second type PUCCH according to the payload size of the UCI. For example, the terminal may be configured to transmit UCI up to X bits (where X is {2<=X<=tens of bits}) through the second type PUCCH.

In another aspect, the terminal may be configured to transmit HARQ-ACK or BRI up to X bits (where X is {2<=X<=tens of bits}) through the second type PUCCH based on a particular type of UCI (i.e., the number of bits of HARQ-ACK or BRI)

Method of Processing HARQ-ACK in Slot Different from Indicated Slot

The HARQ-ACK processing method according to one aspect includes changing, by the base station, the configuration of the slot N to which the PUCCH is allocated, receiving, by the terminal, a group common PDCCH and/or UE-specific PDCCH including information on the changed slot configuration, and if the allocated PUCCH cannot be transmitted under the changed slot configuration (i.e., the changed slot configuration is contradicted with the allocated PUCCH), transmitting, by the terminal, the allocated PUCCH after deferring HARQ-ACK information from the slot N by K slots (i.e., N+K) among the allocated PUCCHs.

Here, the "allocated PUCCH" according to the present embodiment may be a first type PUCCH or a second type PUCCH. In addition, the K value may be determined according to the time taken by the base station to the PUCCH feedback in PDSCH scheduling. No PUCCH for HARQ-ACK feedback of another terminal may be allocated in the slot that can transmit the PUCCH after the slot N+K. For example, when the terminal and the base station communicate with each other based on Frequency Division Duplex (FDD), the PUCCH for HARQ-ACK of other terminals may not be transmitted (or allocated) (common to 3GPP LTE, LTE-A, and NR) in the slot transmitted after 4 ms. The K value may be provided through an RRC signal.

A HARQ-ACK processing method according to another aspect may include changing, by the base station, the configuration of slot N to which the first type PUCCH is allocated, receiving, by the terminal, a group common PDCCH and/or UE-specific PDCCH including information on the changed slot configuration, and when the first type PUCCH cannot be transmitted under the changed slot configuration, but the second type PUCCH can be transmitted, waiting for, by the terminal, PUCCH reallocation of the base station without transmitting the first type PUCCH.

As an example, such a method of processing HARQ-ACK may further include retransmitting, by the base station, the PDSCH to the terminal that does not transmit the first type PUCCH including the HARQ-ACK of the PDSCH and allocating a resource for newly transmitting the first type PUCCH in the PDCCH scheduling the PDSCH.

A HARQ-ACK processing method according to another aspect includes changing, by the base station, the configuration of the slot N to which the PUCCH is allocated, and if the terminal does not receive the group common PDCCH transmitting the configuration information of the slot N but receives the UE-specific PDCCH scheduling the PDSCH (or PUSCH) to know the slot configuration of the slot N, selectively transmitting, by the terminal, the PUCCH based on the slot configuration. As an example, if the slot configuration is a slot configuration in which the allocated PUCCH can be transmitted, the terminal may transmit the PUCCH. As another example, if the slot configuration is a slot configuration in which the allocated PUCCH cannot be transmitted, the terminal may not transmit the PUCCH. Here, the allocated PUCCH may be a first type PUCCH or a second type PUCCH.

Another Embodiment

Another embodiment of the present disclosure relates to information on a slot configuration transmitted by a base station to a terminal and a method of operating a terminal and a base station based on the information. The base station may inform the terminal of the slot configuration using a variety of information and procedures. Information on the slot configuration may include various embodiments as follows.

Information on Slot Configuration

In one aspect, the information on the slot configuration includes semi-static DL/UL assignment information. As one example, the base station may transmit a default slot format or semi-static DL/UL assignment information (or semi-static slot-format information (SFI)) to the terminal cell-specifically, and additionally transmit semi-static DL/UL assignment information to the terminal through a UE-specific RRC message. Meanwhile, upon receiving the semi-static DL/UL assignment information (or default slot format), the terminal can know which slot configuration the slots have. Semi-static DL/UL assignment information (or default slot format) indicates information on whether each symbol in the slot is a DL symbol, a UL symbol, or a different symbol (or flexible symbol) other than the DL symbol and the UL symbol. Here, the terminal may assume that a symbol for which semi-static DL/UL allocation information (or default slot format) is not indicated is indicated as 'Unknown (or flexible)'.

In another aspect, the information on the slot configuration includes dynamic slot-format information (SFI) included and transmitted in a group common PDCCH. The dynamic slot format information indicates information on whether each symbol in the slot is a DL symbol, a UL symbol, and a different symbol (Unknown or flexible symbol) other than the DL symbol and the UL symbol. The flexible symbol may replace the gap and may be used for other purposes than the gap. The group common PDCCH in which dynamic slot format information is transmitted may be scrambled with SFI-RNTI. Whether the terminal monitors the dynamic slot format information may be configured or indicated by an RRC message. The terminal not indicated to monitor by the RRC message may not receive the dynamic slot format information.

In another aspect, the slot configuration information may be scheduling information included in downlink control information (DCI) mapped to the UE-specific PDCCH. For example, if there is information on a start position and a length of a PDSCH in DCI, it may be assumed that symbols scheduled for a corresponding PDSCH are DL symbols. In addition, if there is information on a start position and a length of a PUSCH in DCI, it may be assumed that symbols scheduled for a corresponding PUSCH are UL symbols. If there is information on a start position and a length of the PUCCH for HARQ-ACK transmission in DCI, it can be assumed that the symbols scheduled for the corresponding PUCCH are UL symbols.

Method of Determining Symbol Direction and Method of Processing PUCCH

Since there is a variety of information on the slot configuration as described above, the terminal may receive information on different types of slot configuration for the same slot. Then, information on each slot configuration may indicate different symbol directions in the same slot. In this case, how the terminal and the base station change or determine the symbol direction may follow the rules below.

In one aspect, DL symbols and UL symbols of semi-static DL/UL assignment information (or default slot format) are not changed in direction by dynamic slot configuration information or scheduling information. Therefore, if the PUCCH is located in UL symbols configured by semi-static DL/UL assignment information (or default slot format), the terminal may transmit the PUCCH regardless of dynamic slot configuration information or scheduling information. If at least one of the symbols to which the PUCCH is allocated overlaps the DL symbol of the default slot format, the terminal does not transmit the corresponding PUCCH or changes the length of the PUCCH to match the length of the remaining symbols except for the corresponding DL symbol and transmit the PUCCH. Here, the allocated PUCCH may be a first type PUCCH or a second type PUCCH.

In another aspect, the direction of the flexible symbol configured by the semi-static DL/UL assignment information (or default slot format) may be determined or changed by dynamic slot configuration information or scheduling information. If at least one of the symbols to which the PUCCH is allocated overlaps the flexible symbol of semi-static DL/UL assignment information (or default slot format), the terminal may determine whether to transmit the PUCCH according to the type (HARQ-ACK, RI, CSI, etc.) of the information (i.e., UCI) transmitted by the PUCCH. In the present embodiment, the PUCCH may be a first type PUCCH or a second type PUCCH.

As an example, if the information transmitted in the PUCCH includes the HARQ-ACK for the PDSCH, the terminal transmits the PUCCH at a predetermined location regardless of the dynamic slot configuration information indicated by the group common PDCCH. Here, the determined location is indicated in the DCI scheduling the PDSCH.

As another example, if the information transmitted in the PUCCH does not include HARQ-ACK for the PDSCH, the terminal transmits the PUCCH when the flexible symbol overlapping the PUCCH is indicated as the UL symbol by the dynamic slot configuration information.

As another example, if at least one of the symbols to which the PUCCH is allocated is indicated by dynamic slot configuration information as a symbol other than the UL symbol (for example, a DL symbol or a flexible symbol), the terminal does not transmit the PUCCH. Or, if the terminal fails to receive the dynamic slot configuration information for the symbol to which the PUCCH is allocated, the terminal does not transmit the PUCCH.

In another aspect, if at least one of the symbols to which the PUCCH is allocated overlaps the flexible symbol configured by semi-static DL/UL assignment, the terminal may determine whether to transmit the PUCCH according to the signaling that triggers the transmission of the PUCCH.

As an example, if the PUCCH is triggered through the DCI, the terminal transmits the PUCCH at a predetermined position regardless of the dynamic slot configuration information. Here, the determined position is indicated in the DCI.

As another example, if the PUCCH is triggered through the UE-specific RRC message, the terminal transmits the PUCCH when the symbols to which the PUCCH is allocated are indicated as the UL symbol by the dynamic slot configuration information.

As another example, if at least one of the symbols to which the PUCCH is allocated is indicated by dynamic slot configuration information as a symbol other than the UL symbol (for example, a DL symbol or a flexible symbol), the terminal does not transmit the PUCCH. Or, if the terminal fails to receive the dynamic slot configuration information for the symbol to which the PUCCH is allocated, the terminal does not transmit the PUCCH.

Method of Processing Repetition PUCCH

The terminal may repeatedly transmit the PUCCH over several slots. This PUCCH is hereinafter referred to as repetition PUCCH. In the present embodiment, the repetition PUCCH may be a first type PUCCH or a second type PUCCH. The base station may configure the number of slots in which the repetition PUCCH is transmitted to the terminal through an RRC message. Then, in each slot, the start symbol and the end symbol of the PUCCH may be the same for each repeated slot. Hereinafter, according to each case where DL symbols, UL symbols and flexible symbols are configured by RRC such as semi-static DL/UL assignment information (or default slot pattern) and the dynamic slot configuration information, the repetition PUCCH may or may not be transmitted. Hereinafter, a method of processing repetition PUCCH in each case will be described.

When Repetition PUCCH Overlaps UL Symbol

If repetition PUCCH is located in UL symbols configured with semi-static DL/UL assignment information (or default slot pattern) in each of the slots indicated to be transmitted, the terminal may transmit the PUCCH in the slot regardless of the reception of the dynamic slot configuration information or the scheduling information. Here, the DL and UL symbols according to the slot configuration configured by the RRC message such as semi-static DL/UL assignment information (or the default slot pattern) are not changed in direction by the dynamic slot configuration information or the scheduling information.

When Repetition PUCCH Overlaps DL Symbol

If at least one of the symbols allocated to the repetition PUCCH in each slot among the slots in which the repetition PUCCH is transmitted overlaps the DL symbol according to the semi-static DL/UL assignment information, the terminal does not transmit the PUCCH in the corresponding slot or transmits the PUCCH by changing the length of the remaining symbols except for the corresponding DL symbol. Or, if at least one of the symbols allocated to the repetition PUCCH in one of the slots indicated to transmit the repetition PUCCH overlaps the DL symbol configured with semi-static DL/UL assignment information (or default slot pattern), the terminal does not transmit the repetition PUCCH in the next slot as well as the corresponding slot.

When Repetition PUCCH Overlaps Flexible Symbol

If at least one of the symbols to which the repetition PUCCH is allocated in each slot among the slots in which the repetition PUCCH is transmitted overlaps the flexible symbol configured by semi-static DL/UL allocation, the terminal may determine whether to transmit the repetition PUCCH i) according to the type (HARQ-ACK, RI, CSI, etc.) of information (i.e., UCI) transmitted by the repetition PUCCH or ii) according to the signaling triggering PUCCH transmission, or iii) according to the dynamic slot configuration information. In the present embodiment, the repetition PUCCH may be a first type PUCCH or a second type PUCCH.

In one aspect, if at least one of the symbols to which the repetition PUCCH is allocated overlaps the flexible symbol configured by semi-static DL/UL allocation, the terminal may determine whether to transmit the repetition PUCCH according to the type (HARQ-ACK, RI, CSI, etc.) of the information (i.e., UCI) transmitted by the repetition PUCCH.

As an example, if the information transmitted through the repetition PUCCH includes HARQ-ACK for the PDSCH scheduled by the PDCCH, the terminal transmits a repetition PUCCH at a predetermined location regardless of the dynamic slot configuration information indicated by the group common PDCCH. Here, the determined location is indicated in the DCI scheduling the PDSCH.

As another example, if the information transmitted through the repetition PUCCH does not include HARQ-ACK for the PDSCH or includes HARQ-ACK for the PDSCH configured with RRC, the terminal transmits the repetition PUCCH when the flexible symbol overlapping the repetition PUCCH is indicated as the UL symbol by the dynamic slot configuration information.

As another example, if at least one of the symbols to which the repetition PUCCH is allocated is indicated by dynamic slot configuration information as a different symbol (for example, a DL symbol or a flexible symbol) other than the UL symbol, the terminal does not transmit the repetition PUCCH in the slot. Or, if the terminal fails to receive the dynamic slot configuration information on the symbol to which the repetition PUCCH is allocated, the terminal does not transmit the repetition PUCCH in the slot. Even if the repetition PUCCH is not transmitted in the corresponding slot, when a certain condition is satisfied in the next slot (when a flexible symbol overlapping a repetition PUCCH is indicated as a UL symbol by dynamic slot configuration information), the terminal transmits a repetition PUCCH in the next slot.

As another example, when the terminal does not transmit the repetition PUCCH in the slot for some reason (a contradiction in the symbol direction caused by the dynamic slot configuration information, or the terminal fails to receive the dynamic slot configuration information) in one of the slots indicated to transmit the repetition PUCCH, the terminal does not perform repeated transmission of the PUCCH even in the subsequent slot.

Meanwhile, in another aspect, if at least one of the symbols to which the repetition PUCCH is allocated overlaps the flexible symbol configured by semi-static DL/UL assignment, the terminal may determine whether to transmit the repetition PUCCH according to the signaling that triggers the transmission of the repetition PUCCH.

As an example, if the repetition PUCCH is triggered through the DCI, the terminal transmits the repetition PUCCH at a predetermined position regardless of the dynamic slot configuration information. Here, the determined position is indicated in the DCI.

As another example, if the repetition PUCCH is triggered through the UE-specific RRC message, the terminal transmits the repetition PUCCH when the symbols to which the repetition PUCCH is allocated are indicated as the UL symbol by the dynamic slot configuration information.

As another example, if at least one of the symbols to which the repetition PUCCH is allocated is indicated by dynamic slot configuration information as a different symbol (for example, a DL symbol or a flexible symbol) other than the UL symbol, the terminal does not transmit the repetition PUCCH in the slot. Or, if the terminal fails to receive the dynamic slot configuration information on the symbol to which the repetition PUCCH is allocated, the terminal does not transmit the repetition PUCCH in the slot. Even if the repetition PUCCH is not transmitted in the corresponding slot, when a certain condition is satisfied in the next slot (when a flexible symbol overlapping a repetition PUCCH is indicated as a UL symbol by dynamic slot configuration information), the terminal transmits a repetition PUCCH in the next slot.

As another example, when the terminal does not transmit the repetition PUCCH in the slot for some reason (a contradiction in the symbol direction caused by the dynamic slot configuration information, or the terminal fails to receive the dynamic slot configuration information) in corresponding the slot, the terminal does not perform repeated transmission of the PUCCH even in the subsequent slot.

Here, the number K of slots in which PUCCH transmission is repeated (or attempted) may be defined as follows.

As an example, K slots configured for transmission of a repetition PUCCH need not necessarily be consecutive. For example, when the terminal is configured to repeatedly transmit the PUCCH during the K slot, the PUCCH may be repeatedly transmitted until the count of the number of slots actually transmitted reaches K except for the slot in which the repetition PUCCH is not transmitted. (Repetition method 1)

As another example, K slots configured for transmission of a repetition PUCCH should be consecutive. For example, when the terminal is configured to repeatedly transmit the PUCCH during the K slot, the PUCCH may be repeatedly transmitted until the count of the number of slots (including slots in which repetition PUCCH is not transmitted) reaches K from the slot N indicated to transmit the repetition PUCCH. That is, the terminal that first attempts to transmit PUCCH in the slot N attempts to transmit the PUCCH up to the slot (N+K−1), and even if the number of times (or slots) that the PUCCH is repeatedly transmitted actually is less than K, the terminal no longer transmits the PUCCH in the slot (N+K). (Repetition method 2)

As another example, the terminal attempts to transmit the PUCCH from the slot N indicated to transmit the repetition PUCCH in K consecutive slots among the remaining slots except for slots in which PUCCH cannot be transmitted according to semi-static DL/UL assignment information. (Repetition method 3)

Figure 15A:
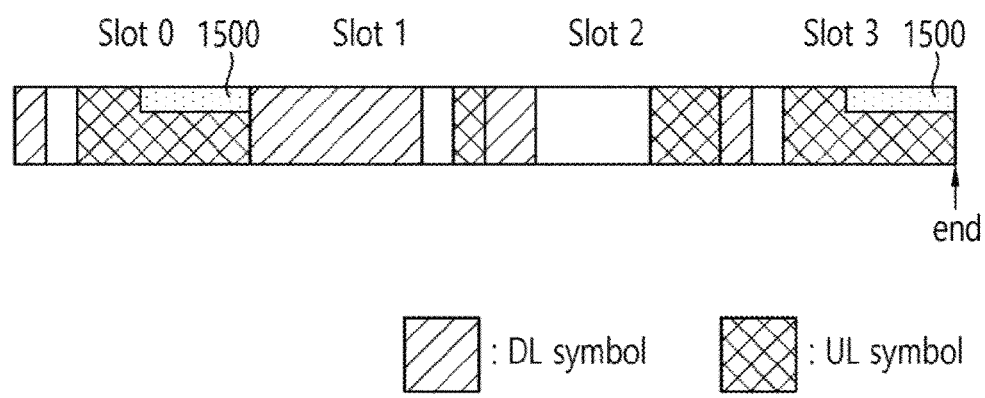
FIGS. 15A-15C are diagrams illustrating a slot in which a repetition PUCCH is transmitted according to a slot configuration.
Figure 15B:
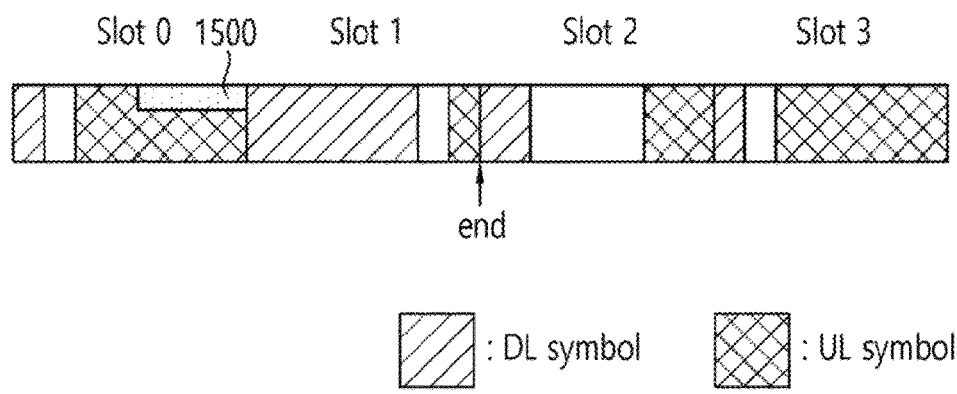
Figure 15C:
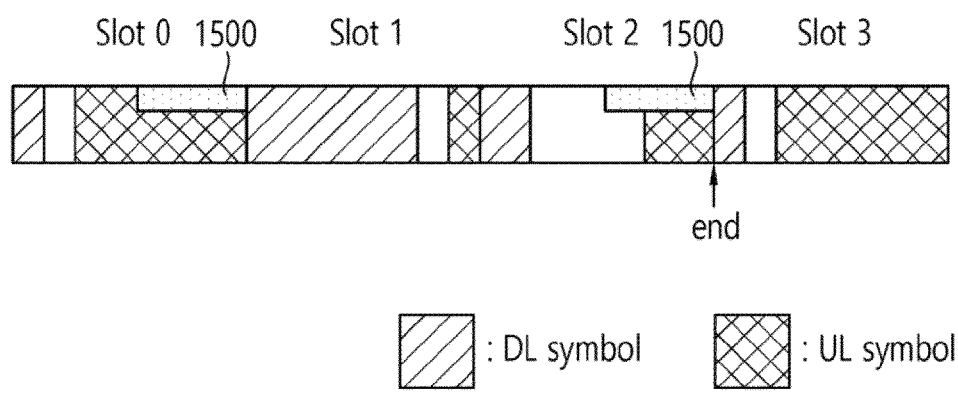

FIG. 15 is a diagram illustrating a slot in which a repetition PUCCH is transmitted according to a slot configuration.

Referring to FIG. 15(*a*), when the terminal is configured to transmit the first type PUCCH 1500 repeatedly over two slots (slot configuration according to semi-static DL/UL allocation), the terminal transmits the first type PUCCH 1500. In this case, the flexible symbols may be changed into DL symbols or UL symbols by dynamic slot configuration information or scheduling information of UE-specific DCI. A symbol in which the first type PUCCH 1500 is transmitted is assumed to be symbol 8 to symbol 13 in a slot. Here, 14 symbols are included in one slot, and the index of the symbols is from 0 to 13.

Looking at each slot configuration according to the semi-static DL/UL allocation, symbol 0 in the slot 0 is a DL symbol, and symbol 7 to symbol 13 are UL symbols. In slot 1, symbol 0 to symbol 10 are DL symbols, and symbol 12 to symbol 13 are UL symbols. In slot 2, symbols 0 to 1 are DL symbols, and symbol 10 to symbol 13 are UL symbols. In slot 3, symbol 0 is a DL symbol, and symbol 7 to symbol 13 are UL symbols. The remaining symbols except for the UL symbol and the DL symbol are flexible symbols.

Therefore, the first type PUCCH 1500 may be transmitted in the slot 0 and the slot 3 regardless of dynamic slot configuration information, and cannot be transmitted in the slot 1 regardless of dynamic slot configuration information, and if the symbol 8 and the symbol 9 are indicated as the UL symbol by the dynamic slot configuration information, may be transmitted, but otherwise, cannot be transmitted.

FIG. 15(*a*) illustrates a slot in which a terminal attempts to transmit a first type PUCCH 1500 according to the repetition method 1 described above. Here, it is assumed that symbols 8 and 9 of slot 2 are not indicated as UL symbols by the dynamic slot configuration information, so that the terminal cannot transmit the first type PUCCH. The terminal actually transmits the first type PUCCH 1500 twice in slot 0 and slot 3. Therefore, the terminal no longer repeatedly transmits the first type PUCCH 1500 after the slot 3.

FIG. 15(*b*) illustrates a slot for attempting to transmit the first type PUCCH 1500 using the above described repetition method 2. Since the first type PUCCH 1500 is configured to be repeatedly transmitted in two slots (K=2), the terminal attempts to transmit the first type PUCCH 1500 in slot 0 and slot 1. The terminal attempts to transmit the first type PUCCH in slot 1 but cannot transmit the first type PUCCH because the terminal overlaps the DL symbol according to the configuration of semi-static DL/UL assignment information.

FIG. 15(*c*) illustrates a slot for attempting to transmit the first type PUCCH 1500 using the above described repetition method 3. The first type PUCCH 1500 is configured to be repeatedly transmitted in two slots (K=2), but slot 1 is a slot in which the first type PUCCH 1500 cannot be transmitted due to semi-static DL/UL assignment information. Thus, the terminal attempts to transmit the first type PUCCH 1500 in slots 0 and 2. Here, slot 2 may or may not actually transmit the first type PUCCH 1500 as indicated by the dynamic slot configuration information.

Another Embodiment

Another embodiment of the present disclosure is a method of transmitting a physical channel by a terminal or a base station to improve physical channel coverage in a wireless communication system based on a slot configuration including a TDD-based DL symbol, a flexible symbol, and a UL symbol and a determination procedure relating thereto. The physical channel transmitted by the terminal is an uplink physical channel and includes a PRACH, a PUCCH, a PUSCH, an SRS, and the like. The physical channel transmitted by the base station is a downlink physical channel and includes a PDSCH, a PDCCH, a PBCH, and the like. Hereinafter, procedures for a terminal and a base station for repetitive transmission of a PUCCH are defined, procedures for a terminal and a base station for repetitive transmission of a PUSCH are defined, and procedures for a terminal and a base station for a repetitive transmission method for a PDSCH are defined. In the following embodiment, the PUCCH or repetition PUCCH may be a first type PUCCH or a second type PUCCH.

Terminal and Base Station Procedures for Repetitive Transmission of PUCCH

The number of slots in which PUCCH is transmitted or the number of repetitions of PUCCH transmission may be, for example, one of a plurality of predetermined values (i.e., 1, 2, 4, and 8), and a value configured to an actual terminal among the plurality of values is transmitted by RRC message. If the number of repetitions of the PUCCH transmission is set to 1, the general PUCCH is indicated instead of the repetition PUCCH.

The start and length of the symbol in which the PUCCH is transmitted in the slot are configured by being included in one PUCCH resource configured by the RRC parameter. A PUCCH resource set including at least one PUCCH resource may be configured or allocated to the terminal by RRC signaling. Meanwhile, the base station may indicate to the terminal the at least one PUCCH resource index in the PUCCH resource set by dynamic signaling (i.e., DCI). For example, the base station may indicate the PUCCH resource index to the terminal based on a PUCCH resource indicator (PRI) included in DCI or a combination of PRI and implicit mapping. Here, PRI may be 2 bits or 3 bits.

In such a manner, the configured PUCCH resource set or PUCCH resource index may be maintained the same over a plurality of slots in which PUCCH is repetitively transmitted. The terminal determines whether to transmit the PUCCH indicated by the DCI. This determination may be based on semi-static DL/UL assignment information. The semi-static DL/UL assignment information used for the determination may include at least one of UL-DL configuration common information TDD-UL-DL-Configuration-Common that can be indicated by RRC signaling, and additionally UL-DL configuration dedicated information TDD-UL-DL-ConfigDedicated that can be indicated to the terminal by RRC signaling.

As an example, the UL-DL configuration common information indicates a period in which semi-static DL/UL assignment information is applied, and the number of DL symbols, the number of UL symbols, and the number of flexible symbols configured over a plurality of slots included in the period.

As another example, the UL-DL configuration dedicated information may include information for overriding a flexible symbol in a semi-static DL/UL slot configuration provided by the UL-DL configuration common information with a UL symbol, a DL symbol, and a flexible symbol. That is, the terminal may override the flexible symbol in the slot format provided by the UL-DL configuration common information with another kind of symbol based on the UL-DL configuration dedicated information.

If the symbol in which the PUCCH is to be transmitted overlaps the symbol(s) indicated by semi-static UL/DL assignment information (at least one of UL-DL configuration common information and UL-DL configuration dedicated information) in the slot indicated by the base station for PUCCH transmission, the terminal determines whether to transmit the PUCCH based on the direction of the indicated symbol(s).

As an example, if the indicated symbol(s) is a DL symbol, the terminal defers the transmission of the PUCCH to the next slot, and if one of the indicated symbol(s) is a UL symbol(s) and a flexible symbol(s), the terminal transmits a PUCCH in the corresponding slot.

As another example, if the indicated symbol is a DL symbol or flexible symbol(s), the terminal defers the transmission of the PUCCH to the next slot, and if the indicated symbol is a UL symbol, the terminal transmits the PUCCH in the corresponding slot. PUCCH not transmitted in the corresponding slot can be deferred to the next slot.

The terminal repetitively transmits the PUCCH until the number of repetitions of the PUCCH transmission configured by the RRC message is reached on the multiple slots. In determining the slot for transmitting the PUCCH on the multiple slot, the terminal may consider the UL symbol and the Unknown (or flexible) symbol by the information transmitted in the RRC message. As an example, the terminal may determine a slot included in the UL symbol and the flexible symbol in which the PUCCH start position and the number of UL symbols are configured by the RRC message as a slot resource for performing PUCCH transmission. The base station may receive a PUCCH in which a terminal performs repetitive transmission through multiple slots based on at least one of UL-DL configuration common information and UL-DL configuration dedicated information.

If at least one of the symbols in which the PUCCH is transmitted in the first slot among the slots to which repetition PUCCH transmission is allocated overlaps the DL symbol, the terminal cancels the PUCCH transmission without transmitting the PUCCH in the slot. That is, if the symbols in which the PUCCH is transmitted in the first slot among the slots in which the repetition PUCCH transmission is allocated are composed of UL symbol(s) and a flexible symbol, the terminal may transmit the PUCCH in the corresponding slot. If at least one of the symbols in which the PUCCH is transmitted in the first slot among the slots to which repetition PUCCH transmission is allocated overlaps the DL symbol, the terminal cancels the PUCCH transmission without transmitting the PUCCH in the slot. That is, if the slot in which the PUCCH transmission is indicated by the base station in the slot after the first slot among the slots to which repetition PUCCH transmission is allocated and the symbols of the slot are configured with the UL symbol(s), that is, symbols indicated to transmit the PUCCH, the terminal may transmit the PUCCH in the corresponding slot.

Hereinafter, a PUCCH processing method associated with a gap symbol is disclosed.

There may be a gap for DL-UL switching between the DL symbol and the UL symbol. The gap may be located in the flexible symbol. That is, some symbol(s) of the flexible symbol(s) between the DL symbol and the UL symbol may be used for the DL-UL switching gap and may not be used for DL reception or UL transmission. Let G be the number of symbols for the gap. G may be fixed to a specific value such as 1 or 2, may be configured in the terminal by the RRC message, or may be obtained through a timing advance value.

If the symbol in which the PUCCH is to be transmitted overlaps the symbol(s) configured by semi-static UL/DL assignment information (at least one of UL-DL configuration common information and UL-DL configuration dedicated information) in each slot indicated by the base station for PUCCH transmission, the terminal determines whether to transmit the PUCCH based on the type (or direction) of the indicated symbol(s).

As an example, if the indicated symbol(s) are all UL symbols, the terminal transmits a PUCCH, and if at least one of the indicated symbol(s) consists of a DL symbol or one of the G consecutive flexible symbol(s) immediately after the DL symbol, the terminal does not transmit the PUCCH in the corresponding slot. The terminal may defer a PUCCH not transmitted in the corresponding slot to the next slot.

That is, in the slot indicated for PUCCH transmission by the base station, if the symbol in which the PUCCH is to be transmitted is a UL symbol, the terminal transmits the PUCCH, and if the symbol in which the PUCCH is to be transmitted overlaps a DL symbol or at least one of G consecutive flexible symbol(s) immediately after the DL symbol, the terminal does not transmit the PUCCH in the slot. The terminal may defer a PUCCH not transmitted in the corresponding slot to the next slot. That is, the PUCCH is not transmitted when overlapped with any one of the G symbols that can be used as a gap with the DL symbol, and transmission is deferred to the next slot.

Meanwhile, in relation to the PUCCH processing method in the multiple slot, the terminal repetitively transmits the PUCCH until the number of repetitions of the PUCCH transmission configured by the RRC message on the multiple slot is reached. The terminal may determine a slot for transmitting the PUCCH on the multiple slots based on the type and number of symbols by the information transmitted in the RRC message.

The terminal determines a slot for PUCCH transmission based on the number of UL symbols, the number of flexible symbols, and the number of gap symbols configured by semi-static UL/DL assignment information. For example, when "the number of UL symbols+the number of flexible symbols−the number of gap symbols" in a slot includes the start position of the PUCCH and the number of UL symbols in which the PUCCH is to be transmitted, the terminal may determine the corresponding slot as a slot for transmitting the PUCCH and transmit the PUCCH. Or, when considering that one slot includes 14 symbols, if "14−(the number of DL symbols in a slot+the number of gap symbols)" includes the start position of the PUCCH and the number of UL symbols in which the PUCCH is to be transmitted, the terminal may determine the corresponding slot as a slot for transmitting the PUCCH and transmit the PUCCH.

In this case, the base station may receive a PUCCH in which a terminal performs repetitive transmission through multiple slots based on at least one of UL-DL configuration common information and UL-DL configuration dedicated information.

FIG. 16 shows whether to transmit a PUCCH according to a slot configuration.

Referring to FIG. 16, a slot configuration configured according to semi-static DL/UL assignment information includes five DL symbols (denoted 'D'), three flexible symbols (denoted 'X'), and six UL symbols (denoted 'U') in sequence.

PUCCH allocation #0 is configured with PUCCH resources from 8th symbol to 14th symbol, PUCCH allocation #1 is configured with PUCCH resources from 7th symbol to 14th symbol, and PUCCH allocation #3 is configured with PUCCH resources from 6th symbol to 14th symbol.

Figure 16A:
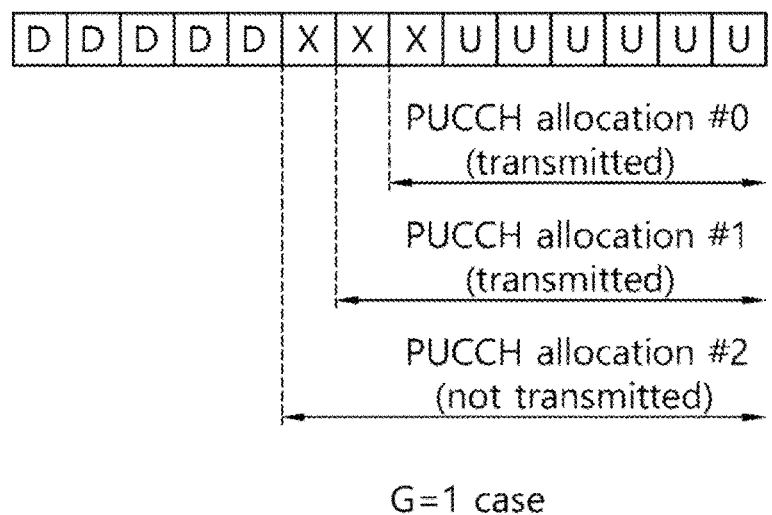
FIGS. 16A-16B show whether to transmit a PUCCH according to a slot configuration.

First, FIG. 16(a) illustrates a case where a symbol G=1 is provided as a gap. If G=1, PUCCH allocation #0 and PUCCH allocation #1 that do not overlap one flexible symbol immediately after DL symbols can be transmitted but PUCCH allocation #2 overlapping one flexible symbol immediately after DL symbols cannot be transmitted. In this case, transmission of PUCCH allocation #2 may be deferred to the next slot. Of course, the terminal also determines whether to transmit PUCCH allocation #2 in the next slot based on the same criteria.

Figure 16B:
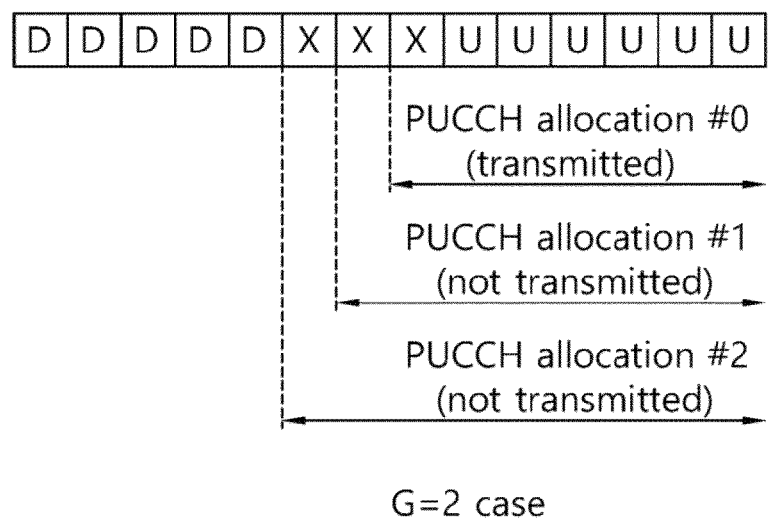

First, FIG. 16(b) illustrates a case where two symbols (G=2) are provided as a gap. If G=2, PUCCH allocation #0 that does not overlap two consecutive or flexible symbols immediately after the DL symbols can be transmitted but PUCCH allocation #1 and PUCCH allocation #2 overlapping two consecutive flexible symbols immediately after DL symbols cannot be transmitted. In this case, transmission of PUCCH allocations #1 and #2 may be deferred to the next slot. Of course, the terminal also determines whether to transmit PUCCH allocations #1 and #2 in the next slot based on the same criteria.

Terminal and Base Station Procedures for Repetitive Transmission of PUCCH

The number of slots in which PUSCH is transmitted or the number of repetitions of PUCCH transmission may be, for example, one of a plurality of predetermined values (i.e., 1, 2, 4, and 8), and a value configured to an actual terminal among the plurality of values is transmitted by RRC message. If the number of repetitions of the PUSCH transmission is set to 1, the general PUSCH is indicated instead of the repetition PUSCH.

In the case of the PUSCH, the PUSCH is transmitted only in a slot configuration suitable for the transmission of the PUSCH among K consecutive slots, and a postponing operation of the PUSCH transmission is not performed.

The start and length of a symbol in which a PUSCH is transmitted in a slot are indicated by the DCI, and can be maintained to be the same in all slots. The terminal determines whether to transmit the PUSCH indicated by the DCI. This determination may be based on semi-static DL/UL assignment information. The semi-static DL/UL assignment information used for the determination may include at least one of UL-DL configuration common information TDD-UL-DL-ConfigurationCommon that can be indicated by RRC signaling, and additionally UL-DL configuration dedicated information TDD-UL-DL-ConfigDedicated that can be indicated to the terminal by RRC signaling.

As one example, the UL-DL configuration common information indicates a period to apply semi-static DL/UL assignment information, and is used to configure the slot format configured with the number of UDL symbols per slot, the number of DL UL symbols per slot, and the number of flexible symbols per slot, configured over a plurality of slots included in the period, and the number of slots. That is, the terminal may configure a slot format for each slot over the number of slots indicated by the UL-DL configuration common information. As another example, the UL-DL configuration dedicated information may include information for overriding a flexible symbol in a semi-static DL/UL slot configuration provided by the UL-DL configuration common information with a UL symbol, a DL symbol, and a flexible symbol. That is, the terminal may override the flexible symbol in the slot format provided by the UL-DL configuration common information with another kind of symbol based on the UL-DL configuration dedicated information.

If the symbol in which the PUSCH is to be transmitted overlaps the symbol(s) indicated by semi-static UL/DL assignment information (at least one of UL-DL configuration common information and UL-DL configuration dedicated information) in each slot indicated by the base station for PSCCH transmission, the terminal determines whether to transmit the PUSCH based on the type (or direction) of the indicated symbol(s).

As an example, if at least one of the indicated symbol(s) is a DL symbol, the terminal does not transmit the PUSCH and cancels the transmission of the PUSCH. In addition, if the indicated symbol(s) are UL symbol(s) and flexible symbol(s), the terminal transmits a PUSCH in the corresponding slot.

As another example, if at least one of the indicated symbol(s) is a DL symbol or a flexible symbol(s), the terminal does not transmit the PUSCH and cancels the transmission of the PUSCH. In addition, if the indicated symbol(s) is a UL symbol, the terminal transmits a PUSCH in the slot.

If at least one of the symbols in which the PUSCH is transmitted in the first slot among the slots indicated for repetition PUSCH transmission overlaps the DL symbol, the terminal cancels the PUSCH transmission without transmitting the PUSCH in the slot. That is, if the symbols in which the PUSCH is transmitted in the first slot among the slots indicated for repetition PUSCH transmission are composed of UL symbol(s) and flexible symbols, the terminal may transmit the PUSCH in the corresponding slot. If at least one of the symbols in which the PUSCH is transmitted in a slot after a first slot among the slots indicated for repetition PUSCH transmission overlaps the DL symbol or the flexible symbol, the terminal cancels the PUSCH transmission without transmitting the PUSCH in the corresponding slot. That is, if the symbols indicated to transmit the PUSCH in a slot after the first slot among the slots indicated for repetition PUSCH transmission are configured with UL symbol(s), the terminal may transmit the PUSCH in the corresponding slot.

Hereinafter, a PUSCH processing method associated with a gap symbol is disclosed.

There may be a gap for DL-UL switching between the DL symbol and the UL symbol. The gap may be located in the flexible symbol. Some symbol(s) of the flexible symbol(s) between the DL symbol and the UL symbol may be used for the DL-UL switching gap and may not be used for DL reception or UL transmission. Let G be the number of symbols for the gap. G may be fixed to a specific value such as 1 or 2, may be configured in the terminal by the RRC message, or may be obtained through a timing advance value.

If the symbol in which the PUSCH is to be transmitted overlaps the symbol(s) indicated by semi-static UL/DL assignment information (at least one of UL-DL configuration common information and UL-DL configuration dedicated information) in each slot indicated by the base station for PSCCH transmission, the terminal determines whether to transmit the PUSCH based on the type (or direction) of the indicated symbol.

As an example, if the indicated symbols are all UL symbols, the terminal transmits a PUCCH, and if at least one of the indicated symbol(s) is a DL symbol or G consecutive flexible symbol(s) immediately after the DL symbol, the terminal does not transmit the PUSCH in the corresponding slot.

That is, in each slot indicated for PUSCH transmission by the base station, if the symbol in which the PUSCH is to be transmitted is a UL symbol, the terminal transmits the PUSCH, and if at least one symbol among symbols in which the PUSCH is to be transmitted overlaps a DL symbol or at least one of G consecutive flexible symbol(s) immediately after the DL symbol, the terminal cancels the transmission of the PUSCH without performing the transmission of the PUSCH. That is, the PUSCH is not transmitted when overlapped with any one of the G symbols that can be used as a gap with the DL symbol, and transmission of the PUSCH is canceled.

Terminal and Base Station Procedures for Repetitive Reception of PDSCH

The number of slots in which PDSCH is received or the number of repetitions of PDSCH reception may be, for example, one of a plurality of predetermined values (i.e., 1, 2, 4, and 8), and a value configured to an actual terminal among the plurality of values is transmitted by RRC message. If the number of repetitions of the PDSCH reception is set to 1, the general PDSCH is indicated instead of the repetition PDSCH.

The start and length of a symbol in which a PDSCH is received in a slot are indicated by the DCI, and can be maintained to be the same in all slots. The terminal determines whether to receive the PDSCH indicated by the DCI. This determination may be based on semi-static DL/UL assignment information. The semi-static DL/UL assignment information used for the determination may include at least one of UL-DL configuration common information TDD-UL-DL-ConfigurationCommon that can be indicated by RRC signaling, and additionally UL-DL configuration dedicated information TDD-UL-DL-ConfigDedicated that can be indicated to the terminal by RRC signaling.

As one example, the UL-DL configuration common information indicates a period to apply semi-static DL/UL assignment information, and is used to configure the slot format configured with the number of UDL symbols per slot, the number of DL UL symbols per slot, and the number of flexible symbols per slot, configured over a plurality of slots included in the period, and the number of slots. That is, the terminal may configure a slot format for each slot over the number of slots indicated by the UL-DL configuration common information. As another example, the UL-DL configuration dedicated information may include information for overriding a flexible symbol in a semi-static DL/UL slot configuration provided by the UL-DL configuration common information with a UL symbol, a DL symbol, and a flexible symbol. That is, the terminal may override the flexible symbol in the slot configuration provided by the UL-DL configuration common information with another kind of symbol based on the UL-DL configuration dedicated information.

If the symbol in which the terminal is to receive the PDSCH overlaps the symbol(s) indicated by semi-static UL/DL assignment information (at least one of UL-DL configuration common information and UL-DL configuration dedicated information) in a slot indicated by the base station for PDSCH reception, the terminal determines whether to receive the PDSCH based on the type (or direction) of the indicated symbol.

As an example, if at least one of the indicated symbol(s) is a UL symbol, the terminal does not perform the reception of the PDSCH. On the other hand, if the indicated symbol(s) are DL symbol(s) and flexible symbol(s), the terminal may receive the PDSCH in the corresponding slot.

As another example, if at least one of the indicated symbol(s) is a UL symbol or unknown (or flexible symbol (s)), the terminal does not receive the PDSCH. On the other hand, if the indicated symbol(s) is a DL symbol, the terminal receives the PDSCH in the corresponding slot.

If at least one of the symbols in which the PDSCH is received in the first slot among the slots indicated by the repetition PDSCH reception overlaps the UL symbol, the terminal does not receive the PDSCH in the corresponding slot. That is, if the symbols in which the PDSCH is received in the first slot among the slots indicated for repetition PDSCH reception are composed of DL symbol(s) and flexible symbols, the terminal may receive the PDSCH in the corresponding slot. In addition, if at least one of the symbols in which the PDSCH is received in the slot after the first slot among the slots indicated for repetition PDSCH overlaps the UL symbol or the flexible symbol, the terminal does not receive the PDSCH in the corresponding slot. That is, if the slot indicated to receive the PDSCH by the base station and the symbols indicating a symbol of the slot to receive the PDSCH include DL symbol(s) in a slot subsequent to the first slot among the slots indicated for repetition PDSCH reception, the terminal may receive the PDSCH in the corresponding slot. Meanwhile, the terminal may receive a PDSCH not additionally received in the deferred next slot.

Hereinafter, a PDSCH processing method associated with a gap symbol is disclosed.

There may be a gap for DL-UL switching between the DL symbol and the UL symbol. The gap may be located in the flexible symbol. Some symbol(s) of the flexible symbol(s) between the DL symbol and the UL symbol may be used for the DL-UL switching gap and may not be used for DL reception or UL transmission. Let G be the number of symbols for the gap. G may be fixed to a specific value such as 1 or 2, may be configured in the terminal by the RRC message, or may be obtained through a timing advance value.

If the symbol in which the PDSCH is to be received overlaps the symbol(s) indicated by semi-static UL/DL assignment information (at least one of UL-DL configuration common information and UL-DL configuration dedicated information) in a slot indicated by the base station for PDSCH reception, the terminal determines whether to receive the PDSCH based on the type (or direction) of the indicated symbol.

As an example, if the indicated symbol(s) are all DL symbols, the terminal receives a PDSCH, and if at least one of the indicated symbol(s) is a UL symbol or G consecutive flexible symbol(s) immediately before the UL symbol, the terminal does not receive the PDSCH.

That is, in the slot indicated for PDSCH reception by the base station, if the symbol to receive the PDSCH is a DL symbol, the terminal receives the PDSCH, and if a symbol to receive a PDSCH overlaps at least one of a UL symbol or G consecutive flexible symbol(s) preceding the UL symbol, the terminal does not perform the reception of the PDSCH. That is, the base station cancels the transmission of the PDSCH without transmitting the PDSCH when the symbol in which the PDSCH is to be transmitted overlaps any one of the G symbols that can be used as a gap with the UL symbol. Then, the base station defers transmission of the PDSCH to the next slot.

On the other hand, if the terminal cancels the reception of the PDSCH according to the semi-static DL/UL assignment information, since the HARQ-ARQ timing can be changed, a new HARQ-ARQ timing configuration method needs to be defined.

In one aspect, when reception of a PDSCH is canceled, a new HARQ-ARQ timing may be determined according to the received PDSCH without being canceled. In other words, in order to determine the slot in which the actual HARQ-ACK is transmitted, the terminal may use the last received PDSCH except for the HARQ-ACK timing and the canceled PDSCH included in the DCI indicating PDSCH reception. For example, a terminal indicated with 4 slots in the HARQ-ACK timing may transmit HARQ-ACK after 4 slots from the slot in which the last PDSCH is received.

In another aspect, even when reception of the PDSCH is canceled, HARQ-ARQ timing may be determined assuming that the PDSCH is received without being changed. In other words, in order to determine the slot in which the actual HARQ-ACK is transmitted, the terminal may perform calculation based on the HARQ-ACK timing included in the DCI indicating PDSCH reception and the last PDSCH before determining whether to cancel. For example, a terminal indicated with 4 slots according to HARQ-ACK timing may transmit HARQ-ACK after 4 slots from the last slot of the allocated PDSCH, even if reception of the PDSCH is cancelled.

Meanwhile, the terminal may be configured to perform inter-slot frequency hopping for frequency diversity. Therefore, even when the terminal repetitively transmits PUCCH (or PDSCH, or PUSCH) to a plurality of slots, it is necessary to define a method for the terminal to perform frequency hopping between slots. This embodiment discloses through which physical resource block (PRB) PUCCH (or PDSCH, or PUSCH) is transmitted in each slot during frequency hopping between slots. In addition, the present embodiment discloses an algorithm for determining a PRB according to a difference between a slot in which a PUCCH is first transmitted and a current slot regardless of the number of PUCCH repetitive transmissions.

In one aspect, the inter-slot frequency hopping method in PUCCH transmission includes determining, by a terminal, a resource block (RB) to transmit the PUCCH according to the index of the first slot and the index of the second slot in which the repetition PUCCH is first transmitted. Here, the starting RB index of the RB or RBs in which the PUCCH is transmitted in slot ns may be obtained by Equation 7.

$$RB(n_s) = \begin{cases} RB_1 & (n_s - n_{s,0}) \mod 2 = 0 \\ RB_2 & (n_s - n_{s,0}) \mod 2 = 1 \end{cases} \quad \text{[Equation 7]}$$

In Equation 7, $RB_1$ and $RB_2$ are signaled to the terminal through an RRC message as starting RB indexes of the first hop and the second hop, respectively, and are configured in the terminal. $n_{s,0}$ is the index of the slot in which the PUCCH is first transmitted. This scheme may be transmitted only through one hop while the PUCCH is repetitively transmitted according to the deferral of the repetition PUCCH.

In another aspect, the inter-slot frequency hopping method in PUCCH transmission includes hopping whenever the terminal actually transmits a repetition PUCCH. The RB may be determined by the slot index through which the PUCCH is transmitted and the actual number of repetitions. More specifically, the starting RB index of RB or RBs in which PUCCH is transmitted in slot ns may be obtained by Equation 8.

$$RB(n_s) = \begin{cases} RB_1 & n^{repeat}(n_s) \mod 2 = 0 \\ RB_2 & n^{repeat}(n_s) \mod 2 = 1 \end{cases} \quad \text{[Equation 8]}$$

In Equation 8, $RB_1$ and $RB_2$ are signaled to the terminal through an RRC message as starting RB indexes of the first hop and the second hop, respectively, and are configured in the terminal. $n_{repeat}(ns)$ is the number of repetitive transmissions of a PUCCH before slot $n_s$. In this method, PUCCH can be transmitted through two different hops regardless of the deferral of repetition PUCCH.

Another Embodiment

Another embodiment of the present disclosure discloses a method of determining in which slot among a plurality of slots PUCCH repetitive transmission is performed in addition to the method and determination procedure of repetitive transmission of the PUCCH over a plurality of slots to improve the coverage of the PUCCH.

Hereinafter, a method of determining a slot for PUCCH transmission by a terminal among a plurality of slots is disclosed.

In one aspect, the terminal may determine a slot for PUCCH transmission based on an SS/PBCH block including a synchronization signal for radio resource management (RRM) measurement and information on an initial cell connection. The SS/PBCH block may be transmitted at a predetermined location, and the configuration on the transmission of the SS/PBCH block may be configured in the terminal by being transmitted from the base station to the terminal through an RRC message (i.e., SSB_transmitted-SIB1 information or SSB_transmitted). In the slot indicated by configuration on the transmission of the SS/PBCH block, flexible symbols that can transmit the SS/PBCH block may exist. That is, the flexible symbol may be used not only for PUCCH transmission but also for transmission of an SS/PBCH block including information on synchronization and initial cell access. In this case, there may be a case where the flexible symbol(s) for transmitting the SS/PBCH block and the flexible symbol(s) for transmitting PUCCH overlap at least partially.

As an example, the terminal determines the slot for the repetition PUCCH in a manner that excludes the slot including the overlapping symbol from the slot for repetition PUCCH transmission, the collision can be prevented. As such, the terminal determines a plurality of slots for transmitting the PUCCH based on SSB_transmitted-SIB1 and SSB_transmitted, and if PUCCH is repeatedly transmitted over the plurality of slots, the base station may receive the repetition PUCCH from the terminal.

In another aspect, the terminal may determine a slot for PUCCH transmission based on semi-static DL/UL assignment information and a gap.

In the following description, it is assumed that a gap is located in a symbol immediately before symbols for PUCCH transmission, and it is assumed that a gap includes one or two symbols. However, the position of the DL-UL switching gap between the DL and the UL and the number of symbols may be variously configured according to the configuration of the base station and the terminal. For example, the gap may include two or more symbols, and the terminal may determine a slot for PUCCH transmission or determine whether to defer the PUCCH transmission in consideration of two or more gap symbols.

On the other hand, slot determination may be performed based on at least one of whether to allocate a PDSCH in a slot, whether to allocate a control resource set (CORESET) for monitoring PDCCH in a DL symbol in a slot, whether to allocate a CSI-RS in a slot, whether to allocate an SS/PBCH block in a slot, and semi-static DL/UL assignment information.

As an example, in order to determine the PUCCH transmission resource in the flexible symbol, if the symbol immediately before the flexible symbol is DL symbol(s) and PDSCH is allocated to the DL symbol(s), the terminal does not consider the flexible symbol as a resource for PUCCH transmission. Instead, the terminal may determine a slot including other UL symbols and flexible symbol(s) as a slot for PUCCH transmission. If the symbol immediately before the flexible symbol is DL symbol(s) and no PDSCH is allocated to the DL symbol(s), the flexible symbol becomes an un-allocated symbol. Therefore, the terminal does not regard the un-allocated symbol as a gap for DL-UL switching. Then, the terminal may determine the flexible symbol immediately after the DL symbol(s) as a resource capable of repetition PUCCH transmission and determine it as a slot for PUCCH transmission.

As another example, in order to determine a PUCCH transmission resource in a flexible symbol, if the symbol immediately before the flexible symbol is DL symbol(s) and CORESET or search space for PDCCH monitoring is allocated to the DL symbol(s), the terminal may exclude the slot including the flexible symbol from the slot for repetition PUCCH transmission in order to monitor the allocated PDCCH.

As another example, in order to determine a PUCCH transmission resource in a flexible symbol, if the symbol immediately before the flexible symbol is DL symbol(s) and CORESET or search space for PDCCH monitoring is allocated to the DL symbol(s), the terminal does not monitor the allocated PDCCH and may regard the flexible symbol as a resource capable of repetition PUCCH transmission and determine it as a slot for PUCCH transmission.

As another example, the terminal may determine a slot for PUCCH transmission using semi-static DL/UL assignment information. The terminal can know in which slot PUCCH should be transmitted through RRC message and dynamic signaling (e.g., PRI). If at least one of the symbols indicated for PUCCH transmission overlaps the flexible symbols indicated in the semi-static DL/UL assignment information and if the symbol immediately before the symbols indicated for PUCCH transmission is not the DL symbol indicated in the semi-static DL/UL assignment information, the terminal may determine a corresponding slot as a slot for repetition PUCCH transmission and transmit a PUCCH in the corresponding slot. On the other hand, if the symbol immediately before the symbols in which the PUCCH is transmitted is a DL symbol indicated in semi-static DL/UL assignment information, the terminal may defer the PUCCH transmission to the next available slot without transmitting the repetition PUCCH in the corresponding slot. In other words, if the terminal can know from the RRC message and/or dynamic signaling (e.g., PRI) the symbols in which the PUCCH is to be transmitted in every slot, and at least one of the symbols overlaps a DL symbol of semi-static DL/UL assignment information, or the symbol immediately before the symbols in which the PUCCH is to be transmitted is a DL symbol of semi-static DL/UL assignment information, the terminal does not transmit the PUCCH in the slot, and if not, the terminal transmits the PUCCH in the corresponding slot. This is because a switching gap between DL and UL may be needed. Here, the PUCCH not transmitted may be deferred to be transmitted in the next available slot.

As another example, the terminal may determine a slot for PUCCH transmission using information scheduled for the terminal. The terminal can know in which slot PUCCH should be transmitted through RRC message and dynamic signaling (e.g., PRI). If at least one of the symbols indicated to transmit the PUCCH overlaps the flexible symbols indicated in the semi-static DL/UL assignment information, and the PDSCH is not scheduled to a symbol immediately before the symbols indicated for the PUCCH transmission, the terminal may determine the corresponding slot as a slot for PUCCH transmission and transmit the PUCCH in the corresponding slot. On the other hand, if the PDSCH is scheduled in the symbol immediately before the symbols in which PUCCH is transmitted, the terminal may defer the PUCCH transmission to the next available slot without transmitting the PUCCH in the corresponding slot. In other words, if the terminal can know from the RRC message and/or dynamic signaling (e.g., PRI) the symbols in which the PUCCH is to be transmitted in every slot, and at least one of the symbols overlaps a DL symbol of semi-static DL/UL assignment information, or PDSCH is scheduled in a symbol immediately before the symbols in which the PUCCH is to be transmitted, the terminal does not transmit the PUCCH in the slot, and if not, the terminal transmits the PUCCH in the corresponding slot. This is because a switching gap between DL and UL may be needed. Here, the PUCCH not transmitted may be deferred to be transmitted in the next available slot.

As another example, the terminal may determine a slot for PUCCH transmission using CSI-RS information configured in the terminal. The terminal can know in which slot PUCCH should be transmitted through RRC message and dynamic signaling (e.g., PRI). If at least one of the symbols indicated to transmit the PUCCH overlaps the flexible symbols indicated in the semi-static DL/UL assignment information, and the CSI-RS reception is not configured in a symbol immediately before the symbols indicated for the PUCCH transmission, the terminal may determine the corresponding slot as a slot for PUCCH transmission and transmit the PUCCH in the corresponding slot. On the other hand, if the CSI-RS reception is scheduled in the symbol immediately before the symbols in which PUCCH is transmitted, the terminal may defer the PUCCH transmission to the next available slot without transmitting the PUCCH in the corresponding slot. In other words, if the terminal can know from the RRC message and/or dynamic signaling (e.g., PRIPRI) the symbols in which the PUCCH is to be transmitted in every slot, and at least one of the symbols overlaps a DL symbol of semi-static DL/UL assignment information, or CSI-RS reception is scheduled in a symbol immediately before the symbols in which the PUCCH is to be transmitted, the terminal does not transmit the PUCCH in the slot, and if not, the terminal transmits the PUCCH in the corresponding slot. This is because a switching gap between DL and UL may be needed. Here, the PUCCH not transmitted may be deferred to be transmitted in the next available slot.

As another example, the terminal may determine a slot for PUCCH transmission using PDCCH monitoring information configured in the terminal. The terminal can know in which slot PUCCH should be transmitted through RRC message and dynamic signaling (e.g., PRI). If at least one of the symbols indicated to transmit the PUCCH overlaps the flexible symbols indicated in the semi-static DL/UL assignment information, and the PDCCH monitoring is not configured (or allocated) in a symbol immediately before the symbols indicated to transmit the PUCCH, the terminal may determine the corresponding slot as a slot for PUCCH transmission and transmit the PUCCH in the corresponding slot. On the other hand, if the PDCCH monitoring is configured (or allocated) in a symbol immediately before the symbols in which the PUCCH is to be transmitted, the terminal may defer the PUCCH transmission to the next available slot without transmitting the PUCCH in the corresponding slot. In other words, if the terminal can know from the RRC message and/or dynamic signaling (e.g., PRI) the symbols in which the PUCCH is to be transmitted in every slot, and at least one of the symbols overlaps a DL symbol of semi-static DL/UL assignment information, or PDCCH monitoring is configured in a symbol immediately before the symbols in which the PUCCH is to be transmitted, the terminal does not transmit the PUCCH in the slot, and if not, the terminal transmits the PUCCH in the corresponding slot. This is because a switching gap between DL and UL may be needed. Here, the PUCCH not transmitted may be deferred to be transmitted in the next available slot.

As another example, the terminal can know in which slot PUCCH should be transmitted through RRC message and dynamic signaling (e.g., PRI). If at least one of the symbols indicated to transmit the PUCCH overlaps the flexible symbols indicated in the semi-static DL/UL assignment information, and the PUCCH does not overlap the SS/PBCH block immediately before the symbols indicated for transmission, the terminal may determine the corresponding slot as a slot for PUCCH transmission and transmit the PUCCH in the corresponding slot. On the other hand, if the symbol immediately before the symbols in which the PUCCH is transmitted overlaps the SS/PBCH block, the terminal may defer the PUCCH transmission to the next available slot without transmitting the PUCCH in the corresponding slot. In other words, if the terminal can know from the RRC message and/or dynamic signaling (e.g., PRI) the symbols in which the PUCCH is to be transmitted in every slot, and at least one of the symbols overlaps a DL symbol of semi-static DL/UL assignment information, or the symbol immediately before the symbols in which the PUCCH is transmitted overlaps the SS/PBCH block, the terminal does not transmit the PUCCH in the slot, and if not, the terminal transmits the PUCCH in the corresponding slot. This is because a switching gap between DL and UL may be needed. Here, the PUCCH not transmitted may be deferred to be transmitted in the next available slot.

In the present embodiment, if a symbol indicated as a DL symbol by dynamic signaling Dynamic SFI in one slot ends at a symbol immediately before the symbol for repetition PUCCH transmission, and the PUCCH resource is configured such that transmission for repetition PUCCH is performed from the next symbol, the terminal may defer the slot to a later slot without transmitting the PUCCH in the slot. The deferred slot may be the most advanced slot among the slots in which the PUCCH can be transmitted.

Hereinafter, a method of determining a slot for PUCCH transmission according to whether a terminal allocates a PDSCH in a slot will be described with a more specific example. In this case, it is assumed that one slot includes 14 symbols.

For example, it is assumed that a UL symbol resource for PUCCH is configured with the last 12 symbols of a slot, and a specific slot sequentially includes two DL symbols, two flexible symbols, and ten UL symbols. When PDSCH is allocated to two DL symbols immediately before the two flexible symbols, the terminal implicitly regards the first flexible symbol as the switching gap between DL and UL. Then, the terminal determines whether one flexible symbol and 10 UL symbols except for the first flexible symbol can be configured as PUCCH resources. However, since the UL symbol resource for the PUCCH is configured with the last 12 symbols of the slot, the terminal can exclude the slot from the slot resource for PUCCH transmission. In the above example, if the UL symbol resource for the PUCCH is configured with the last 11 symbols of the slot, the terminal may determine the slot as the slot resource for PUCCH transmission.

Also, for example, it is assumed that a UL symbol resource for PUCCH is configured with the last six symbols of a slot, and a specific slot sequentially includes eight DL symbols, two flexible symbols, and four UL symbols. When PDSCH is allocated to two DL symbols immediately before the two flexible symbols, the terminal implicitly regards the first flexible symbol as the switching gap between DL and UL. Then, the terminal determines whether one flexible symbol and 4 UL symbols except for the first flexible symbol can be configured as PUCCH resources. However, since the UL symbol resource for the PUCCH is configured with the last 6 symbols of the slot, the terminal can exclude the slot from the slot resource for PUCCH transmission. In the above example, if the UL symbol resource for the PUCCH is configured with the last 5 symbols of the slot, the terminal may determine the slot as the slot resource for PUCCH transmission.

Another Embodiment

Another embodiment of the present disclosure discloses a method of determining in which slot among a plurality of slots PUSCH repetitive transmission is performed in addition to the method and determination procedure of repetitive transmission of the PUSCH over a plurality of slots to improve the coverage of the PUSCH.

On the other hand, determining a slot to transmit PUSCH may be performed based on at least one of whether to allocate a PDSCH in a slot, whether to allocate a control resource set (CORESET) for monitoring PDCCH in a DL symbol in a slot, whether to allocate a CSI-RS in a slot, whether to allocate an SS/PBCH block in a slot, and semi-static DL/UL assignment information.

As an example, the terminal may determine a slot for PUSCH transmission using semi-static DL/UL assignment information. The terminal can know in which slot PUSCH should be transmitted through RRC message and dynamic signaling (e.g., PRI). If the symbols indicated for PUSCH transmission overlap the flexible symbols indicated in the semi-static DL/UL assignment information and if the symbol immediately before the symbols indicated for PUCCH transmission is not the DL symbol indicated in the semi-static DL/UL assignment information, the terminal may determine a corresponding slot as a slot for PUSCH transmission and transmit a PUSCH in the corresponding slot. On the other hand, if the symbol immediately before the symbols in which the PUSCH is transmitted is a DL symbol indicated in semi-static DL/UL assignment information, the terminal may defer the PUSCH transmission to the next available slot without transmitting the PUSCH in the corresponding slot. In other words, if the terminal can know from the RRC message and/or dynamic signaling (e.g., PRI) the symbols in which the PUSCH is to be transmitted in every slot, and at least one of the symbols overlaps a DL symbol of semi-static DL/UL assignment information, or the symbol immediately before the symbols in which the PUSCH is to be transmitted is a DL symbol of semi-static DL/UL assignment information, the terminal does not transmit the PUSCH in the slot, and if not, the terminal transmits the PUSCH in the corresponding slot. This is because a switching gap between DL and UL may be needed. Here, the PUSCH not transmitted may be deferred to be transmitted in the next available slot.

As another example, the terminal may determine a slot for PUSCH transmission using information scheduled for the terminal. The terminal can know in which slot PUSCH should be transmitted through RRC message and dynamic signaling (e.g., PRI). If at least one of the symbols indicated to transmit the PUSCH overlaps the flexible symbols indicated in the semi-static DL/UL assignment information, and the PDSCH is not scheduled to a symbol immediately before the symbols indicated for the PUSCH transmission, the terminal may determine the corresponding slot as a slot for PUSCH transmission and transmit the PUSCH in the corresponding slot. On the other hand, if the PDSCH is scheduled in the symbol immediately before the symbols in which PUSCH is transmitted, the terminal may defer the PUSCH transmission to the next available slot without transmitting the PUSCH in the corresponding slot. In other words, if the terminal can know from the RRC message and/or dynamic signaling (e.g., PRI) the symbols in which the PUSCH is to be transmitted in every slot, and at least one of the symbols overlaps a DL symbol of semi-static DL/UL assignment information, or PDSCH is scheduled in a symbol immediately before the symbols in which the PUSCH is to be transmitted, the terminal does not transmit the PUSCH in the slot, and if not, the terminal transmits the PUSCH in the corresponding slot. This is because a switching gap between DL and UL may be needed. Here, the PUSCH not transmitted may be deferred to be transmitted in the next available slot.

As another example, the terminal may determine a slot for PUSCH transmission using CSI-RS information configured in the terminal. The terminal can know in which slot PUSCH should be transmitted through RRC message and dynamic signaling (e.g., PRI). If at least one of the symbols indicated to transmit the PUSCH overlaps the flexible symbols indicated in the semi-static DL/UL assignment information, and the CSI-RS reception is not configured in a symbol immediately before the symbols indicated for the PUSCH transmission, the terminal may determine the corresponding slot as a slot for PUSCH transmission and transmit the PUSCH in the corresponding slot. On the other hand, if the CSI-RS reception is configured in the symbol immediately before the symbols to be transmitted, the terminal does not transmit the PUSCH in the corresponding slot. In other words, if the terminal can know from the RRC message and/or dynamic signaling (e.g., PRI) the symbols in which the PUSCH is to be transmitted in every slot, and at least one of the symbols overlaps a DL symbol of semi-static DL/UL assignment information, or CSI-RS reception is scheduled in a symbol immediately before the symbols in which the PUSCH is to be transmitted, the terminal does not transmit the PUSCH in the slot, and if not, the terminal transmits the PUSCH in the corresponding slot. This is because a switching gap between DL and UL may be needed. Here, the PUSCH not transmitted may be deferred to be transmitted in the next available slot.

As another example, the terminal may determine a slot for PUSCH transmission using PDCCH monitoring information configured in the terminal. The terminal can know in which slot PUSCH should be transmitted through RRC message and dynamic signaling (e.g., PRI). If at least one of the symbols indicated to transmit the PUSCH overlaps the flexible symbols indicated in the semi-static DL/UL assignment information, and the PDCCH monitoring is not configured (or allocated) in a symbol immediately preceding the symbols indicated to transmit the PUSCH, the terminal may determine the corresponding slot as a slot for PUSCH transmission and transmit the PUSCH in the corresponding slot. On the other hand, if the PDCCH monitoring is configured (or allocated) in the symbol immediately before the symbols to be transmitted, the terminal does not transmit the PUSCH in the corresponding slot. In other words, if the terminal can know from the RRC message and/or dynamic signaling (e.g., PRI) the symbols in which the PUSCH is to be transmitted in every slot, at least one of the symbols overlaps with a DL symbol of semi-static DL/UL assignment information, or PDCCH monitoring is configured in the symbol immediately before the symbols in which the PUSCH is to be transmitted, the terminal does not transmit the PUSCH in the corresponding slot, and if not, the terminal transmits the PUSCH in the corresponding slot. This is because a switching gap between DL and UL may be needed. Here, the PUSCH not transmitted may be deferred to be transmitted in the next available slot.

As another example, the terminal can know in which slot PUSCH should be transmitted through RRC message and dynamic signaling (e.g., PRI). If at least one of the symbols indicated to transmit the PUSCH overlaps the flexible symbols indicated in the semi-static DL/UL assignment information, and the PUSCH does not overlap the SS/PBCH block immediately before the symbols indicated for transmission, the terminal may determine the corresponding slot as a slot for PUSCH transmission and transmit the PUSCH in the corresponding slot. On the other hand, if the symbol immediately before the symbols in which PUSCH is to be transmitted overlaps the SS/PBCH block, the terminal does not transmit the PUSCH in the corresponding slot. In other words, if the terminal can know from the RRC message and/or dynamic signaling (e.g., PRI) the symbols in which the PUSCH is to be transmitted in every slot, and at least one of the symbols overlaps a DL symbol of semi-static DL/UL assignment information, or the symbol immediately before the symbols in which the PUSCH is transmitted overlaps the SS/PBCH block, the terminal does not transmit the PUSCH in the slot, and if not, the terminal transmits the PUSCH in the corresponding slot. This is because a switching gap between DL and UL may be needed. Here, the PUSCH not transmitted may be deferred to be transmitted in the next available slot.

Another Embodiment

Another embodiment of the present disclosure discloses a method of determining in which slot among a plurality of slots PUSCH repetitive transmission is performed in addition to the method and determination procedure of repetitive transmission of the PUSCH over a plurality of slots to improve the coverage of the PUSCH.

Meanwhile, the determination of the slot to receive the PDSCH is performed based on at least one of whether to allocate a PUSCH in a slot, whether to allocate a PUCCH, whether to allocate SRS transmission, whether to allocate PRACH transmission, and semi-static DL/UL assignment information.

As an example, the terminal may determine a slot for PDSCH reception using semi-static DL/UL assignment information. The terminal can know in which slot PDSCH should be received through RRC message and dynamic signaling (e.g., PRI). If at least one of the symbols indicated for PDSCH reception overlaps the flexible symbols indicated in the semi-static DL/UL assignment information and if the symbol immediately after the symbols indicated for PDSCH reception is not the UL symbol indicated in the semi-static DL/UL assignment information, the terminal may determine a corresponding slot as a slot for PDSCH reception and receive a PDSCH in the corresponding slot. On the other hand, if the symbol immediately after the symbols for receiving the PDSCH is a UL symbol indicated in the semi-static DL/UL assignment information, the terminal does not receive the PDSCH in the corresponding slot. In other words, if the terminal can know from the RRC message and/or dynamic signaling (e.g., PRI) the symbols in which the PDSCH is to be received in every slot, and at least one of the symbols overlaps a UL symbol of semi-static DL/UL assignment information, or the symbol immediately after the symbols in which the PDSCH is to be transmitted is a UL symbol of semi-static DL/UL assignment information, the terminal does not receive the PDSCH in the slot, and if not, the terminal receives the PUCCH in the corresponding slot.

As another example, the terminal may determine a slot for PDSCH reception using uplink information (PUSCH, PUCCH, PRACH, SRS, etc.) scheduled for the terminal. The terminal can know in which slot PDSCH should be received through RRC message and dynamic signaling (e.g., PRI). If at least one of the symbols indicated for PDSCH reception overlaps the flexible symbols indicated in the semi-static DL/UL assignment information and if the PDSCH is not scheduled with PUSCH or PUCCH or PRACH or SRS in the symbol immediately after the symbols indicated for reception, the terminal may determine a corresponding slot as a slot for PDSCH reception and receive a PDSCH in the corresponding slot. On the other hand, if a PUSCH or PUCCH or PRACH or SRS is scheduled in a symbol immediately after the symbols in which the PDSCH is to be received, the terminal does not receive the PDSCH in the corresponding slot. In other words, if the terminal can know from the RRC message and/or dynamic signaling (e.g., PRI) the symbols in which the PDSCH is to be received in every slot, and at least one of the symbols overlaps a UL symbol of semi-static DL/UL assignment information, or a PUSCH or PUCCH or PRACH or SRS is scheduled in a symbol immediately after the symbols in which the PDSCH is transmitted, the terminal does not receive the PDSCH in the slot, and if not, the terminal receives the PUCCH in the corresponding slot. Here, the PUCCH may be a PUCCH for transmitting HARQ-ACK. Alternatively, the PUCCH may be a PUCCH for transmitting a scheduling request (SR).

As another example, the terminal may determine a slot for PDSCH transmission using CSI-RS information configured in the terminal. The terminal can know in which slot PDSCH should be transmitted through RRC message and dynamic signaling (e.g., PRI). If at least one of the symbols indicated to receive the PDSCH overlaps the flexible symbols indicated in the semi-static DL/UL assignment information, and the CSI-RS reception is not configured in a symbol immediately before the symbols indicated for the PDSCH reception, the terminal may determine the corresponding slot as a slot for PDSCH transmission and transmit the PDSCH in the corresponding slot. On the other hand, if the CSI-RS reception is scheduled in the symbol immediately before the symbols in which PDSCH is transmitted, the terminal may defer the PDSCH transmission to the next available slot without transmitting the PDSCH in the corresponding slot. In other words, if the terminal can know from the RRC message and/or dynamic signaling (e.g., PRI) the symbols in which the PDSCH is to be transmitted in every slot, and at least one of the symbols overlaps a DL symbol of semi-static DL/UL assignment information, or CSI-RS reception is scheduled in a symbol immediately before the symbols in which the PDSCH is to be transmitted, the terminal does not transmit the PDSCH in the slot, otherwise the terminal transmits the PDSCH in the corresponding slot. This is because a switching gap between DL and UL may be needed. Here, the PDSCH not transmitted may be deferred to be transmitted in the next available slot.

As another example, the terminal may determine a slot for PDSCH transmission using PDCCH monitoring information configured in the terminal. The terminal can know in which slot PDSCH should be transmitted through RRC message and dynamic signaling (e.g., PRI). If at least one of the symbols indicated to receive the PDSCH overlaps the flexible symbols indicated in the semi-static DL/UL assignment information, and the PDCCH monitoring is not configured (or allocated) in a symbol immediately before the symbols in which the PUCCH is to be transmitted, the terminal may determine the corresponding slot as a slot for PDSCH transmission and transmit the PDSCH in the corresponding slot. On the other hand, if the PDCCH monitoring is configured (or allocated) in a symbol immediately before the symbols in which the PDSCH is to be transmitted, the terminal may defer the PDSCH transmission to the next available slot without transmitting the PDSCH in the corresponding slot. In other words, if the terminal can know from the RRC message and/or dynamic signaling (e.g., PRI) the symbols in which the PDSCH is to be transmitted in every slot, and at least one of the symbols overlaps a DL symbol of semi-static DL/UL assignment information, or PDSCH monitoring is configured in a symbol immediately before the symbols in which the PUCCH is to be transmitted, the terminal does not transmit the PDSCH in the slot, and if not, the terminal transmits the PDSCH in the corresponding slot. This is because a switching gap between DL and UL may be needed. Here, the PDSCH not transmitted may be deferred to be transmitted in the next available slot.

As another example, the SS/PBCH block may be configured to overlap a DL symbol, a flexible symbol, and a UL symbol of semi-static DL/UL assignment information on a terminal. In this case, the terminal may regard the symbol overlapping the SS/PBCH block as a semi-static DL symbol. That is, if a semi-static UL symbol is configured in the terminal and the SS/PBCH block overlaps the symbol, the terminal may assume that the symbol is configured as a semi-static DL symbol. Additionally, if the symbol immediately after the symbols overlapping the SS/PBCH block is a semi-static UL symbol, the terminal may assume that the semi-static UL symbol is semi-static flexible symbols.

Another Embodiment

According to another embodiment of the present specification, since the gap between the DL symbol requiring downlink reception and the UL symbol requiring uplink transmission is insufficient, it relates to a situation in which a terminal cannot perform downlink reception and uplink transmission. At least a DL-UL switching gap is required between the downlink reception and the uplink transmission of the terminal. Here, the DL-UL switching gap may be used interchangeably as a switching gap, or simply a gap, and all of them have equivalent meanings except for expressions.

The length of the DL-UL switching gap may vary depending on the carrier frequency. For example, when the frequency of the carrier is 6 GHz or less (hereinafter referred to as frequency range (FR) 1), the DL-UL switching gap may require 13 us. Alternatively, if the frequency of the carrier is 6 GHz or more (hereinafter referred to as FR2), the DL-UL switching gap may require 7 us.

The DL-UL switching gap is also affected by the timing advance (TA) value and the TA offset value. In addition, the DL-UL switching gap may be affected by subcarrier spacing. That is, the DL-UL switching gap may be determined based on the TA value and the TA offset value and/or subcarrier spacing. For example, when the duration of one symbol is X us, the symbol G necessary for the DL-UL switching gap may be given as $G=\text{ceil}((Rx2Tx+TA+TA\_offset)/X)$. Here, Rx2Tx may have a different value depending on the frequency of the carrier. For example, when the frequency of the carrier is 6 GHz or less (FR1), Rx2Tx may be 13 us, and when it is 6 GHz or more (FR2), Rx2Tx may be 7 us. The TA may be a TA value that the terminal is configured to receive from the base station or may be a maximum value among TA values that the terminal may be configured to receive as the base station. TA_offset may be $39936*Tc$ or $25600*Tc$ in FR1 and $13792*Tc$ in FR2. Here, $Tc=1/(480*103*4096)$. Here, the switching gap may be an RF interruption time.

Table 5 shows an example of the number of symbols required for the DL-UL switching gap according to the subcarrier spacing.

TABLE 5

| Subcarrier spacing configuration for the active UL BWP | G |
| --- | --- |
| 15 kHz or 30 kHz | 1 |
| 60 kHz or 120 kHz | 2 |

Table 6 shows another example of the number of symbols required for the DL-UL switching gap according to the subcarrier spacing.

TABLE 6

| Subcarrier spacing configuration for the active UL BWP | G |
| --- | --- |
| 15 kHz or 30 kHz | 2 |
| 60 kHz or 120 kHz | 2 |

Hereinafter, a method of processing transmission of an uplink channel or an uplink signal based on a downlink signal received by a terminal and a UL-DL switching gap G will be described. In the present embodiment, the downlink signal may include an SS/PBCH block, a PDSCH, a PDCCH, a periodic signal, a measurement signal, and the like. In addition, in the present embodiment, the uplink channel may include a PUSCH, a PUCCH, a PRACH, and the like, and the uplink signal may include an SRS, a periodic signal, a measurement signal, and the like.

Symbol for SS/PBCH Block Transmission and Uplink Transmission

In one aspect, a method of processing uplink transmission includes determining, by the terminal, whether at least one of the symbols indicated for transmission of the uplink channel or transmission of the uplink signal is configured to overlap (i.e., to be contradicted to) the symbols (or symbol for SS/PBCH block transmission) indicated to receive the SS/PBCH block from the base station, and transmitting an uplink channel or an uplink signal based on the determination. Here, if at least some of the symbols in which the SS/PBCH block is received is configured to overlap the transmission of the uplink channel or the transmission of the uplink signal, the terminal does not transmit the uplink channel or the uplink signal, and if not, the terminal transmits the uplink signal.

In another aspect, a method of processing uplink transmission includes determining, by the terminal, whether at least one of the symbols indicated for transmission of the uplink channel or transmission of the uplink signal is configured to overlap the symbol(s) to which the SS/PBCH block indicated to be received from the base station is allocated, and transmitting an uplink channel or an uplink signal based on the determination. Here, if at least some of the G symbol(s) are configured to overlap the transmission of the uplink channel or the transmission of the uplink signal, the terminal does not transmit the uplink channel or the uplink signal, and if not, the terminal transmits the uplink signal.

Symbol for Downlink Transmission and Uplink Transmission

In another aspect, a method of processing uplink transmission includes determining, by the terminal, whether at least one of the symbols indicated for transmission of an uplink channel or transmission of an uplink signal is configured to overlap the symbols (or symbols for downlink transmission) indicated to receive downlink transmission from a base station, and transmitting an uplink channel or an uplink signal based on the determination. Here, if at least some of the symbols receiving downlink transmission is configured to overlap the transmission of the uplink channel or the transmission of the uplink signal, the terminal does not transmit the uplink channel or the uplink signal, and if not, the terminal transmits the uplink signal.

In another aspect, a method of processing uplink transmission includes determining, by the terminal, whether at least one of the symbols indicated for transmission of an uplink channel or transmission of an uplink signal is configured to overlap the G symbol(s) after the symbol(s) indicated to receive downlink transmission from a base station, and transmitting an uplink channel or an uplink signal based on the determination. Here, if at least some of the G symbol(s) are configured to overlap the transmission of the uplink channel or the transmission of the uplink signal, the terminal does not transmit the uplink channel or the uplink signal, and if not, the terminal transmits the uplink signal.

On the other hand, the present embodiment may include performing, by the base station, the scheduling (i.e., dynamic scheduling of layer 1 L1) so that the symbols for the downlink transmission and the symbol for the uplink transmission do not overlap each other. That is, when the base station performs scheduling for the terminal, it is available to configure uplink transmission based on the G symbol. In this case, the terminal may not expect the base station to configure uplink transmission of the terminal in the G symbol.

Alternatively, in the present embodiment, a case where uplink transmission is configured based on the RRC configuration rather than the dynamic scheduling of L1 includes determining, by the terminal, whether the uplink transmission configured with RRC overlaps the G symbol and performing or not performing, by the terminal, transmission of an uplink channel or signal based on the determination.

Hereinafter, a method in which a terminal processes downlink reception and transmission of an uplink channel (or uplink signal) based on a UL-DL switching gap G is disclosed. In the present embodiment, the downlink signal may include an SS/PBCH block, a PDSCH, a PDCCH, a CSI-RS, and the like. Also, in the present embodiment, the uplink channel may include a PUSCH, a PUCCH, a PRACH, and the like, and the uplink signal may include an SRS.

Processing of Downlink Signals According to Whether Flexible Symbol and Uplink Signal Overlap In symbols configured by flexible symbols by semi-static DL/UL assignment information or symbols not configured by semi-static DL/UL assignment information, the terminal may or may not receive a downlink signal configured by a UE-specific RRC message (i.e., a downlink periodic signal or a measurement signal). In this case, the method for the terminal to process the configured downlink reception may be based on an arrangement relationship (e.g., overlapping relationship) between the UL-DL switching gap and the uplink signal.

In one aspect, a method for a terminal to process the configured downlink reception may include determining whether the terminal is configured to transmit an uplink signal within G symbol(s) after the last symbol of the configured downlink signal, and receiving the configured downlink signal based on the determination. Here, as a result of the determination, if the uplink signal does not overlap in the G symbol(s) after the last symbol of the configured downlink signal, the terminal may receive the configured downlink signal. On the contrary, if the uplink signal overlaps in the G symbol(s), the terminal does not receive the configured downlink signal. In other words, if there are no at least G gap symbols between the last DL symbol configured by semi-static DL/UL assignment information and the first symbol allocated to the uplink signal in one slot, the terminal drops the downlink signal.

Here, the uplink signal may include an uplink signal configured by a cell specific RRC message. For example, the uplink signal configured by the cell specific RRC message may include a PRACH.

Alternatively, the uplink signal may include an uplink signal indicated by L1 signaling. As an example, the uplink signal indicated by L1 signaling may include a PUSCH scheduled in DCI format 0_0 or 0_1. As another example, the uplink signal indicated by the L1 signaling may include a PUCCH including a HARQ-ACK response of a PDSCH scheduled in DCI format 1_0 or 1_1. As another example, the uplink signal indicated by L1 signaling may include an SRS signal indicated by DCI. As another example, the uplink signal indicated by L1 signaling may include a first transmission of uplink semi-persistent scheduled (SPS) PDSCH transmission indicated by DCI scrambled with CS-RNTI.

In addition, the downlink signal may include a CSI-RS configured by a UE-specific RRC message. As an example, the downlink signal may include a CORESET for PDCCH monitoring configured by the UE-specific RRC message. As another example, the downlink signal may include a downlink SPS PDSCH transmission (except the first transmission) scrambled with the CS-RNTI.

In another aspect, a method for a terminal to process the downlink reception may include determining, by the terminal, whether the UL symbol configured by the semi-static DL/UL assignment information overlaps in G symbol(s) after the last symbol of the downlink signal, and receiving a downlink signal based on the determination. As a result of the determination, if UL symbols configured by semi-static DL/UL assignment information overlap in the G symbol(s), the terminal does not receive the downlink signal, and if not, the terminal receives the downlink signal. In other words, if there are no at least G gap symbols between the last DL symbol configured by semi-static DL/UL assignment information and the first symbol allocated to the uplink signal in one slot, the terminal drops the downlink signal.

In another aspect, a method for a terminal to process the configured downlink reception may include determining, by the terminal, whether the UL symbol indicated by the dynamic SFI overlaps in the G symbol(s) after the last symbol of the configured downlink signal, and receiving the configured downlink signal based on the determination. As a result of the determination, when the UL symbol indicated by the dynamic SFI overlaps in the G symbol(s), the terminal does not receive the configured downlink signal, and if not, the terminal receives the downlink signal. In other words, if there are no at least G gap symbols between the last DL symbol configured by semi-static DL/UL assignment information and the first symbol allocated to the uplink signal in one slot, the terminal drops the downlink signal.

In another aspect, a method for a terminal to process the configured downlink reception may include determining, by the terminal, whether the DL symbol configured by the semi-static DL/UL assignment information overlaps in G symbol(s) before the first symbol of the downlink signal, and receiving the configured downlink signal based on the determination. As a result of the determination, if the DL symbols configured by semi-static DL/UL assignment information overlap in the G symbol(s), the terminal does not receive the configured downlink signal, and if not, the terminal receives the configured downlink signal. In other words, if there are no at least G gap symbols between the last DL symbol configured by semi-static DL/UL assignment information and the first symbol allocated to the uplink signal in one slot, the terminal drops the downlink signal.

In another aspect, a method for a terminal to process the configured downlink reception may include determining, by the terminal, whether the DL symbol indicated by the dynamic SFI overlaps in G symbol(s) before the first symbol of the uplink signal, and receiving the configured downlink signal based on the determination. As a result of the determination, when the DL symbol indicated by the dynamic SFI overlaps in the G symbol(s), the terminal does not receive the configured downlink signal, and if not, the terminal receives the configured downlink signal. In other words, if there are no at least G gap symbols between the last DL symbol configured by semi-static DL/UL assignment information and the first symbol allocated to the uplink signal in one slot, the terminal drops the downlink signal.

Here, a method for a terminal to process uplink transmission may include an operation that the terminal does not expect the uplink signal to be configured or indicated by the L1 signal during the G symbols after the downlink signal (downlink periodic signal or measurement signal) configured by the UE-specific RRC message in symbols configured by flexible symbols by semi-static DL/UL assignment information or symbols not configured by semi-static DL/UL assignment information.

Processing of Uplink Signals According to Whether Flexible Symbol and Downlink Signal Overlap In symbols configured by flexible symbols by semi-static DL/UL assignment information or symbols not configured by semi-static DL/UL assignment information, the terminal may or may not transmit an uplink signal configured by a UE-specific RRC message (i.e., an uplink periodic signal or a measurement signal). In this case, the method for the terminal to process the uplink transmission may be determined based on an arrangement relationship (e.g., overlapping relationship) between the UL-DL switching gap and the downlink signal.

In one aspect, a method for a terminal to process the configured uplink transmission may include transmitting the configured uplink signal based on whether the terminal receives the downlink signal in the G symbol(s) before the first symbol of the configured uplink signal. That is, if the downlink signal does not overlap in the G symbol(s) before the first symbol of the configured uplink signal, the terminal may transmit the configured uplink signal. On the contrary, if the downlink signal overlaps in the G symbol(s), the terminal does not transmit the configured uplink signal. In other words, if there are no at least G gap symbols between the first UL symbol configured by semi-static DL/UL assignment information and the last symbol allocated to the downlink signal in one slot, the terminal drops the uplink signal.

Here, the downlink signal may include a downlink signal configured by a cell specific RRC message. As an example, the downlink signal configured by the cell specific RRC message may include an SS/PBCH block. As another example, the downlink signal configured by a cell specific RRC message may include type-0 common search space. Here, the type-0 common search space is a search space for receiving remaining minimum scheduling information (RMSI). As another example, the downlink signal configured by the cell specific RRC message may include a type-0A common search space. Here, the type-0A common search space is a search space for receiving a response of the PRACH in a random access process.

Alternatively, the downlink signal may include a downlink signal indicated by L1 signaling. As an example, the uplink signal indicated by L1 signaling may include a PDSCH scheduled in DCI format 1_0 or 1_1. As another example, the uplink signal indicated by L1 signaling may include an aperiodic CSI-RS indicated by DCI. As another example, the uplink signal indicated by L1 signaling may include a first transmission of uplink semi-persistent scheduled (SPS) PDSCH transmission indicated by DCI scrambled with CS-RNTI.

Meanwhile, the uplink signal may include the SRS configured by the UE-specific RRC message. As an example, the uplink signal may include a periodic PUCCH and a PUSCH configured by a UE-specific RRC message. As another example, the uplink signal may include an SR configured by UE-specific RRC message.

In another aspect, a method for a terminal to process the configured uplink transmission may include determining whether the DL symbol configured by the semi-static DL/UL assignment information overlaps in G symbol(s) before the first symbol of the configured uplink signal, and transmitting, by the terminal, the configured uplink signal based on the determination. As a result of the determination, if the DL symbols configured by semi-static DL/UL assignment information do not overlap in the G symbol(s), the terminal transmits the configured uplink signal, and if not, the terminal does not transmit the configured uplink signal. In other words, if there are no at least G gap symbols between the first UL symbol configured by semi-static DL/UL assignment information and the last symbol allocated to the downlink signal in one slot, the terminal drops the uplink signal.

Here, a method for a terminal to process downlink reception may include an operation that the terminal does not expect the uplink signal to be configured or indicated by the L1 signaling during the G symbols after the downlink signal (downlink periodic signal or measurement signal) configured by the UE-specific RRC message in symbols configured by flexible symbols by semi-static DL/UL assignment information or symbols not configured by semi-static DL/UL assignment information.

In symbols configured by flexible symbols by semi-static DL/UL assignment information or symbols not configured by semi-static DL/UL assignment information, if the number of symbols between the last symbol of the downlink signal configured by a cell specific RRC message or indicated by L1 signaling and the first symbol of uplink signal configured by cell specific RRC message or indicated by L1 signaling is less than G, the operation of the terminal is as follows.

As an example, the terminal may receive the downlink signal configured by the cell-specific RRC message but may not transmit the uplink signal configured by the cell-specific RRC message or indicated by the L1 signaling.

As another example, the terminal may transmit an uplink signal configured by a cell specific RRC message and may not receive a downlink signal configured by the cell specific RRC message or indicated by L1 signaling.

As another example, the terminal may operate according to L1 signaling. That is, when the L1 signaling indicates the downlink reception and the cell-specific RRC message configures the uplink transmission, the terminal may perform the downlink reception and may not perform the uplink transmission. Conversely, if the L1 signaling indicates uplink reception and the cell-specific RRC message configures downlink transmission, the terminal may perform uplink transmission and not perform downlink reception.

Figure 17:
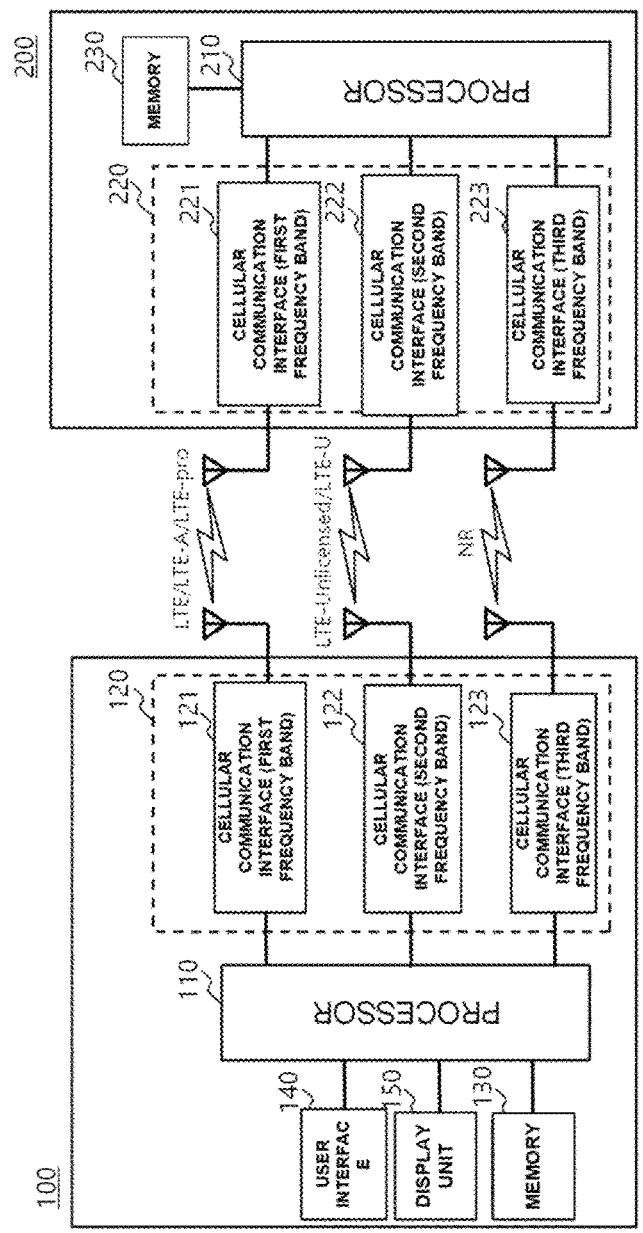
FIG. 17 is a block diagram showing the configurations a terminal and a base station according to an embodiment of the present invention, respectively.

FIG. 17 is a block diagram showing the configurations a terminal and a base station according to an embodiment of the present invention, respectively. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present invention may include a processor 110, a communication module 120, a memory 130, a user interface unit 140, and a display unit 150. The terminal 100 is a terminal described in the embodiments of the present specification, and may perform operations and procedures according to each embodiment of the present specification. Specifically, the communication module 120 performs an operation in which a terminal transmits or receives an object according to each embodiment of the present specification, and the processor 110 may perform operations such as generation, determination, and decision of other objects.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230. The base station 200 is a base station described in each embodiment of the present specification, and may perform operations and procedures of the base station corresponding to the operation and procedure of the terminal according to each embodiment of the present specification. Specifically, the communication module 220 performs an operation of receiving or transmitting an object by the base station according to each embodiment of the present specification, and the processor 210 may operations such as generation, determination, and decision of other objects.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 17 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary. The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

What is claimed is:

1. A terminal performing uplink transmission and downlink reception in a wireless communication system, the terminal comprising:
 a communication module configured to transmit an uplink radio signal to a base station or to receive a downlink radio signal from a base station; and
 a processor,
 wherein the processor is configured to:
 receive slot configuration information related to configuration a slot,
 determine a position and a number of at least one contiguous gap symbol based on receiving the slot configuration information,
 determine, based on the position and the number of the at least one contiguous gap symbol, whether transmission of an uplink radio signal or reception of a downlink radio signal is valid in the slot, the slot being configured with at least one of a downlink symbol for downlink transmission, a flexible symbol for downlink or uplink transmission, or an uplink symbol for uplink transmission, and
 perform transmission of the uplink radio signal or reception of the downlink radio signal according to the determination result.

2. The terminal of claim 1,
wherein whether the transmission of the uplink signal is impossible in the slot is identified based on a first symbol among symbols to which the uplink signal is allocated is located after the number of the at least one contiguous gap symbol from a last symbol of the downlink symbol.

3. The terminal of claim 2,
wherein the uplink signal comprises at least one of a physical uplink control channel, a physical uplink shared channel, a physical random access channel, and a sounding reference signal (SRS).

4. The terminal of claim 2,
wherein at least one of the symbols to which the uplink signal is allocated is a flexible symbol.

5. The terminal of claim 1,
wherein when a first symbol among symbols to which the uplink signal is allocated in the slot overlaps at least one of the downlink symbol, a symbol allocated for reception of the downlink signal, or the number of the at least one contiguous gap symbol after a last symbol of the downlink symbol, the transmission of the uplink signal is impossible.

6. The terminal of claim 5, wherein the downlink radio signal comprises at least one of a synchronization signal/physical broadcast channel (SS/PBCH) block, a physical downlink shared channel, a physical downlink control channel, or a channel state information reference signal (CSI-RS).

7. The terminal of claim 5, wherein the uplink radio signal for which transmission is not performed is a physical uplink control channel, and
wherein the processor converts the physical uplink control channel into another type of physical uplink control channel in which transmission is valid in the slot and transmits the other type of physical uplink control channel, or performs transmission in the first slot among slots in which transmission after the slot is valid.

8. The terminal of claim 5, wherein the uplink radio signal comprises at least one of a physical uplink control channel, a physical uplink shared channel, a physical random access channel, and a sounding reference signal (SRS).

9. The terminal of claim 5, wherein at least one of the symbols to which the uplink radio signal is allocated is a flexible symbol.

10. The terminal of claim 1,
wherein when a last symbol among symbols to which the downlink signal is allocated in the slot is located before the number of the at least one contiguous gap symbol the downlink signal is received.

11. The terminal of claim 10,
wherein the downlink signal comprises at least one of a physical downlink shared channel, a physical downlink control channel, or a channel state information reference signal (CSI-RS).

12. The terminal of claim 10,
wherein at least one of the symbols to which the downlink signal is allocated is a flexible symbol.

13. The terminal of claim 1,
wherein when a last symbol among symbols to which the downlink signal is allocated in the slot overlaps any symbol of at least one contiguous gap symbol, the reception of the downlink signal is impossible.

14. The terminal of claim 13,
wherein the uplink signal is a physical random access channel.

15. The terminal of claim 13, wherein the downlink radio signal comprises at least one of a physical downlink shared channel, a physical downlink control channel, or a channel state information reference signal (CSI-RS).

16. The terminal of claim 13, wherein at least one of the symbols to which the downlink radio signal is allocated is a flexible symbol.

17. The terminal of claim 1, wherein the slot is configured by information on a slot configuration provided by the base station, and
wherein the information on the slot configuration comprises at least one of a cell-specific RRC message generated in an RRC layer, a UE-specific RRC message, or dynamic slot format information generated in a physical layer.

18. The terminal of claim 1,
wherein the position is determined right after the downlink symbol or the last symbol for reception of the downlink radio signal, and the number of the at least one contiguous gap symbol is determined by higher layer signaling.

* * * * *